US008475255B2

(12) United States Patent
Wolf et al.

(10) Patent No.: US 8,475,255 B2
(45) **Date of Patent: *Jul. 2, 2013**

(54) MULTI-PLAY CARD GAME GAMING SYSTEM WITH PREDETERMINED GAME OUTCOMES

(75) Inventors: Bryan D. Wolf, Reno, NV (US); Lesley S. Swift, Reno, NV (US); Justin M. Krum, Reno, NV (US); John M. Montross, Reno, NV (US); Tracy L. Powell, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,738

(22) Filed: Jun. 7, 2012

(65) Prior Publication Data

US 2012/0244923 A1 Sep. 27, 2012

Related U.S. Application Data

(63) Continuation of application No. 12/683,233, filed on Jan. 6, 2010, now Pat. No. 8,197,321, which is a continuation of application No. 11/464,992, filed on Aug. 16, 2006, now Pat. No. 7,658,672.

(60) Provisional application No. 60/709,959, filed on Aug. 18, 2005.

(51) Int. Cl.
*A63F 9/24* (2006.01)
*A63F 13/00* (2006.01)
*G06F 17/00* (2006.01)

(52) U.S. Cl.
USPC ......... 463/13; 463/9; 463/10; 463/11; 463/22

(58) Field of Classification Search
USPC ..................................................... 463/13, 20
See application file for complete search history.

(56) References Cited

U.S. PATENT DOCUMENTS 2,228,180 A 1/1941 Pauli
2,474,573 A 6/1949 Cohen (Continued)

FOREIGN PATENT DOCUMENTS

WO WO 02097749 12/2002

OTHER PUBLICATIONS

Diamonopoly Advertisement by International Gamco, Inc. published 2002.

(Continued)

*Primary Examiner* — David L Lewis
*Assistant Examiner* — Werner Garner
(74) *Attorney, Agent, or Firm* — Neal, Gerber & Eisenberg LLP

(57) ABSTRACT

A gaming system which provides the player a plurality of playing cards to form an initial primary card hand and also displays one or more other card hands. The player selects one or more of the initially dealt cards in the primary card hand to hold or to discard. The held cards are also held in one, more or each of the other simultaneously displayed hands. The gaming device evaluates the held cards and determines which card game outcomes are possible based on the held cards and the remaining cards in the deck. The gaming device utilizes a stored table of different distributions of card game outcomes which would result in each payout amount and a table regarding which card game outcomes are possible based on the player's held cards to determine a distribution of outcomes that provides a total payout equal to the payout of the predetermined game outcome.

60 Claims, 29 Drawing Sheets

U.S. PATENT DOCUMENTS

| | | | |
|---|---|---|---|
| 3,589,729 | A | 6/1971 | Girard |
| 3,628,259 | A | 12/1971 | Kahn |
| 4,156,976 | A | 6/1979 | Mikun |
| 4,157,829 | A | 6/1979 | Goldman et al. |
| 4,332,389 | A | 6/1982 | Loyd et al. |
| 4,335,809 | A | 6/1982 | Wain |
| 4,339,798 | A | 7/1982 | Hedges et al. |
| 4,365,810 | A | 12/1982 | Richardson |
| 4,373,726 | A | 2/1983 | Churchill et al. |
| 4,448,419 | A | 5/1984 | Telnaes |
| 4,455,025 | A | 6/1984 | Itkis |
| 4,467,424 | A | 8/1984 | Hedges et al. |
| 4,494,197 | A | 1/1985 | Troy et al. |
| 4,527,798 | A | 7/1985 | Siekierski et al. |
| 4,582,324 | A | 4/1986 | Koza et al. |
| 4,624,462 | A | 11/1986 | Itkis |
| 4,636,951 | A | 1/1987 | Harlick |
| 4,652,998 | A | 3/1987 | Koza et al. |
| 4,669,730 | A | 6/1987 | Small |
| 4,689,742 | A | 8/1987 | Troy et al. |
| 4,798,387 | A | 1/1989 | Richardson |
| 4,805,907 | A | 2/1989 | Hagiwara |
| 4,815,741 | A | 3/1989 | Small |
| 4,817,951 | A | 4/1989 | Crouch et al. |
| 4,842,278 | A | 6/1989 | Markowicz |
| 4,848,771 | A | 7/1989 | Richardson |
| 4,856,787 | A | 8/1989 | Itkis |
| 4,861,041 | A | 8/1989 | Jones et al. |
| 4,880,237 | A | 11/1989 | Kishishita |
| 4,882,473 | A | 11/1989 | Bergeron et al. |
| 4,982,337 | A | 1/1991 | Burr et al. |
| 5,007,649 | A | 4/1991 | Richardson |
| 5,011,159 | A | 4/1991 | Fortunato et al. |
| 5,042,809 | A | 8/1991 | Richardson |
| 5,042,818 | A | 8/1991 | Weingardt |
| 5,092,598 | A | 3/1992 | Kamille |
| 5,100,137 | A | 3/1992 | Fulton |
| 5,118,109 | A | 6/1992 | Gumina |
| 5,119,295 | A | 6/1992 | Kapur |
| 5,154,429 | A | 10/1992 | LeVasseur |
| 5,158,293 | A | 10/1992 | Mullins |
| 5,165,693 | A | 11/1992 | Handlon, Sr. |
| 5,167,413 | A | 12/1992 | Fulton |
| 5,223,698 | A | 6/1993 | Kapur |
| 5,224,706 | A | 7/1993 | Bridgeman et al. |
| 5,265,874 | A | 11/1993 | Dickinson et al. |
| 5,265,882 | A | 11/1993 | Malek |
| 5,275,400 | A | 1/1994 | Weingardt et al. |
| 5,276,312 | A | 1/1994 | McCarthy |
| 5,280,915 | A | 1/1994 | Grossman |
| 5,282,620 | A | 2/1994 | Keesee |
| 5,288,081 | A | 2/1994 | Breeding |
| 5,294,120 | A | 3/1994 | Schultz |
| 5,294,128 | A | 3/1994 | Marquez |
| 5,297,802 | A | 3/1994 | Pocock et al. |
| 5,303,929 | A | 4/1994 | Sandeen |
| 5,320,356 | A | 6/1994 | Cauda |
| 5,324,035 | A | 6/1994 | Morris et al. |
| 5,326,104 | A | 7/1994 | Pease et al. |
| 5,328,189 | A | 7/1994 | Malek |
| 5,332,219 | A | 7/1994 | Marnell et al. |
| 5,348,299 | A | 9/1994 | Clapper, Jr. |
| 5,351,970 | A | 10/1994 | Fioretti |
| 5,356,140 | A | 10/1994 | Dabrowski et al. |
| 5,377,975 | A | 1/1995 | Clapper, Jr. |
| 5,377,993 | A | 1/1995 | Josephs |
| 5,393,061 | A | 2/1995 | Manship et al. |
| 5,398,932 | A | 3/1995 | Eberhardt et al. |
| 5,401,023 | A | 3/1995 | Wood |
| 5,407,199 | A | 4/1995 | Gumina |
| 5,417,430 | A | 5/1995 | Breeding |
| 5,452,899 | A | 9/1995 | Skratulia et al. |
| 5,476,259 | A | 12/1995 | Weingardt |
| 5,486,005 | A | 1/1996 | Neal |
| 5,487,544 | A | 1/1996 | Clapper, Jr. |
| 5,489,101 | A | 2/1996 | Moody |
| 5,496,038 | A | 3/1996 | Kangsanaraks |
| 5,511,781 | A | 4/1996 | Wood et al. |
| 5,531,448 | A | 7/1996 | Moody |
| 5,536,008 | A | 7/1996 | Clapper, Jr. |
| 5,542,669 | A | 8/1996 | Charron et al. |
| 5,544,892 | A | 8/1996 | Breeding |
| 5,562,284 | A | 10/1996 | Stevens |
| 5,564,701 | A | 10/1996 | Dettor |
| 5,570,885 | A | 11/1996 | Ornstein |
| 5,573,249 | A | 11/1996 | Johnson |
| 5,577,731 | A | 11/1996 | Jones |
| 5,580,053 | A | 12/1996 | Crouch |
| 5,580,311 | A | 12/1996 | Haste, III |
| 5,584,486 | A | 12/1996 | Franklin |
| 5,593,161 | A | 1/1997 | Boylan et al. |
| 5,595,538 | A | 1/1997 | Haste, III |
| 5,609,337 | A | 3/1997 | Clapper, Jr. |
| 5,628,684 | A | 5/1997 | Bouedec |
| 5,630,754 | A | 5/1997 | Rebane |
| 5,639,092 | A | 6/1997 | Macaisa |
| 5,645,485 | A | 7/1997 | Clapper, Jr. |
| 5,657,899 | A | 8/1997 | Stoken |
| 5,664,781 | A | 9/1997 | Feola |
| 5,674,128 | A | 10/1997 | Holch et al. |
| 5,678,001 | A | 10/1997 | Nagel et al. |
| 5,697,843 | A | 12/1997 | Manship et al. |
| 5,707,285 | A | 1/1998 | Place et al. |
| 5,711,715 | A | 1/1998 | Ringo et al. |
| 5,718,431 | A | 2/1998 | Ornstein |
| 5,720,483 | A | 2/1998 | Trinh |
| 5,722,891 | A | 3/1998 | Inoue |
| 5,725,428 | A | 3/1998 | Achmuller |
| 5,732,950 | A | 3/1998 | Moody |
| 5,735,432 | A | 4/1998 | Stoken et al. |
| 5,743,530 | A | 4/1998 | Sklad et al. |
| 5,749,784 | A | 5/1998 | Clapper, Jr. |
| 5,775,692 | A | 7/1998 | Watts et al. |
| 5,779,545 | A | 7/1998 | Berg et al. |
| 5,779,547 | A | 7/1998 | SoRelle et al. |
| 5,791,987 | A | 8/1998 | Chen et al. |
| 5,800,269 | A | 9/1998 | Holch et al. |
| 5,810,664 | A | 9/1998 | Clapper, Jr. |
| 5,813,911 | A | 9/1998 | Margolin |
| 5,816,915 | A | 10/1998 | Kadlic |
| 5,816,916 | A | 10/1998 | Moody |
| 5,823,873 | A | 10/1998 | Moody |
| 5,823,874 | A | 10/1998 | Adams |
| 5,830,067 | A | 11/1998 | Graves et al. |
| 5,848,932 | A | 12/1998 | Adams |
| 5,855,515 | A | 1/1999 | Pease et al. |
| 5,868,618 | A | 2/1999 | Netley et al. |
| 5,868,619 | A | 2/1999 | Wood et al. |
| 5,871,398 | A | 2/1999 | Schneier et al. |
| 5,876,283 | A | 3/1999 | Parra et al. |
| 5,879,233 | A | 3/1999 | Stupero |
| 5,882,258 | A | 3/1999 | Kelly et al. |
| 5,882,259 | A | 3/1999 | Holmes, Jr. et al. |
| 5,882,260 | A | 3/1999 | Marks et al. |
| 5,909,875 | A | 6/1999 | Weingardt |
| 5,915,588 | A | 6/1999 | Stoken et al. |
| 5,928,082 | A | 7/1999 | Clapper, Jr. |
| 5,934,675 | A | 8/1999 | Handelman et al. |
| 5,941,771 | A | 8/1999 | Haste, III |
| 5,944,606 | A | 8/1999 | Gerow |
| 5,949,042 | A | 9/1999 | Dietz, II et al. |
| 5,954,335 | A | 9/1999 | Moody |
| 5,954,582 | A | 9/1999 | Zach |
| 5,976,016 | A | 11/1999 | Moody et al. |
| 5,980,385 | A | 11/1999 | Clapper, Jr. |
| 5,984,779 | A | 11/1999 | Bridgeman et al. |
| 6,007,066 | A | 12/1999 | Moody |
| 6,007,424 | A | 12/1999 | Evers et al. |
| 6,012,720 | A | 1/2000 | Webb |
| 6,012,981 | A | 1/2000 | Fujioka et al. |
| 6,012,984 | A | 1/2000 | Roseman |
| 6,017,032 | A | 1/2000 | Grippo et al. |
| 6,024,640 | A | 2/2000 | Walker et al. |
| 6,045,129 | A | 4/2000 | Cooper et al. |
| 6,050,568 | A | 4/2000 | Hachquet |
| 6,056,289 | A | 5/2000 | Clapper, Jr. |
| 6,062,980 | A | 5/2000 | Luciano |

| | | | |
|---|---|---|---|
| 6,062,981 | A | 5/2000 | Luciano, Jr. |
| 6,079,710 | A | 6/2000 | Brown |
| 6,089,982 | A | 7/2000 | Holch et al. |
| 6,089,985 | A | 7/2000 | Morath et al. |
| 6,093,100 | A | 7/2000 | Singer et al. |
| 6,098,985 | A | 8/2000 | Moody |
| 6,102,400 | A | 8/2000 | Scott et al. |
| 6,120,024 | A | 9/2000 | Lind |
| 6,120,378 | A | 9/2000 | Moody et al. |
| 6,126,541 | A | 10/2000 | Fuchs |
| 6,126,542 | A | 10/2000 | Fier |
| 6,132,311 | A | 10/2000 | Williams |
| 6,135,882 | A | 10/2000 | Kadlic |
| 6,135,883 | A | 10/2000 | Hachquet |
| 6,146,271 | A | 11/2000 | Kadlic |
| 6,146,272 | A | 11/2000 | Walker et al. |
| 6,149,156 | A | 11/2000 | Feola |
| 6,149,521 | A | 11/2000 | Sanduski |
| 6,155,925 | A | 12/2000 | Giobbi et al. |
| 6,159,095 | A | 12/2000 | Frohm et al. |
| 6,168,521 | B1 | 1/2001 | Luciano et al. |
| 6,174,233 | B1 | 1/2001 | Sunaga et al. |
| 6,176,781 | B1 | 1/2001 | Walker et al. |
| 6,183,361 | B1 | 2/2001 | Cummings et al. |
| 6,190,255 | B1 | 2/2001 | Thomas et al. |
| 6,196,547 | B1 | 3/2001 | Pascal et al. |
| 6,203,429 | B1 | 3/2001 | Demar et al. |
| 6,210,275 | B1 | 4/2001 | Olsen |
| 6,210,276 | B1 | 4/2001 | Mullins |
| 6,217,448 | B1 | 4/2001 | Olsen |
| 6,220,961 | B1 | 4/2001 | Keane et al. |
| 6,241,606 | B1 | 6/2001 | Riendeau et al. |
| 6,254,480 | B1 | 7/2001 | Zach |
| 6,273,820 | B1 | 8/2001 | Haste, III |
| 6,280,325 | B1 | 8/2001 | Fisk |
| 6,280,328 | B1 | 8/2001 | Holch et al. |
| 6,302,791 | B1 | 10/2001 | Frohm et al. |
| 6,306,038 | B1 | 10/2001 | Graves et al. |
| 6,309,298 | B1 | 10/2001 | Gerow |
| 6,311,978 | B1 | 11/2001 | Moody |
| 6,312,334 | B1 | 11/2001 | Yoseloff |
| 6,315,289 | B1 | 11/2001 | Sakamoto et al. |
| 6,315,291 | B1 | 11/2001 | Moody |
| 6,325,716 | B1 | 12/2001 | Walker et al. |
| 6,334,613 | B1 | 1/2002 | Yoseloff |
| 6,358,150 | B1 | 3/2002 | Mir et al. |
| 6,358,151 | B1 | 3/2002 | Enzminger et al. |
| 6,364,313 | B1 | 4/2002 | Moody |
| 6,368,218 | B2 | 4/2002 | Angell, Jr. |
| 6,386,977 | B1 | 5/2002 | Hole |
| 6,402,614 | B1 | 6/2002 | Schneier et al. |
| 6,419,578 | B1 | 7/2002 | Moody et al. |
| 6,419,583 | B1 | 7/2002 | Crumby et al. |
| 6,425,824 | B1 | 7/2002 | Baerlocher et al. |
| 6,447,395 | B1 | 9/2002 | Stevens |
| 6,450,885 | B2 | 9/2002 | Schneier et al. |
| 6,454,648 | B1 | 9/2002 | Kelly et al. |
| RE37,885 | E | 10/2002 | Acres et al. |
| 6,471,591 | B1 | 10/2002 | Crumby |
| 6,475,086 | B2 | 11/2002 | Zach |
| 6,508,711 | B1 | 1/2003 | Ono |
| 6,517,074 | B1 | 2/2003 | Moody |
| 6,524,184 | B1 | 2/2003 | Lind et al. |
| 6,524,185 | B2 | 2/2003 | Lind |
| 6,527,638 | B1 | 3/2003 | Walker et al. |
| 6,533,664 | B1 | 3/2003 | Crumby |
| 6,537,150 | B1 | 3/2003 | Luciano et al. |
| 6,561,898 | B2 | 5/2003 | Moody |
| 6,568,680 | B1 | 5/2003 | Moody et al. |
| 6,569,017 | B2 | 5/2003 | Enzminger et al. |
| 6,599,187 | B2 | 7/2003 | Gerow |
| 6,607,439 | B2 | 8/2003 | Schneier et al. |
| 6,609,974 | B2 | 8/2003 | Mead et al. |
| 6,612,927 | B1 | 9/2003 | Slomiany et al. |
| 6,619,660 | B2 | 9/2003 | Schaefer et al. |
| 6,652,377 | B1 | 11/2003 | Moody |
| 6,656,040 | B1 | 12/2003 | Brosnan et al. |
| 6,656,044 | B1 | 12/2003 | Lewis |
| 6,672,959 | B2 | 1/2004 | Moody et al. |
| 6,676,126 | B1 | 1/2004 | Walker et al. |
| 6,685,562 | B1 | 2/2004 | Rantanen |
| 6,695,695 | B2 | 2/2004 | Angel |
| 6,729,961 | B1 | 5/2004 | Millerschone |
| 6,733,385 | B1 | 5/2004 | Enzminger et al. |
| 6,749,500 | B1 | 6/2004 | Nelson et al. |
| 6,964,418 | B2 | 11/2005 | Moody |
| 6,988,946 | B2 | 1/2006 | Michaelson et al. |
| 2002/0010013 | A1 | 1/2002 | Walker et al. |
| 2002/0039917 | A1 | 4/2002 | Armstrong et al. |
| 2002/0077173 | A1 | 6/2002 | Luciano et al. |
| 2002/0077174 | A1 | 6/2002 | Luciano et al. |
| 2002/0082070 | A1 | 6/2002 | Macke et al. |
| 2002/0082071 | A1 | 6/2002 | Riendeau et al. |
| 2002/0082085 | A1 | 6/2002 | Osterer |
| 2002/0090986 | A1 | 7/2002 | Cote et al. |
| 2002/0094871 | A1 | 7/2002 | Luciano et al. |
| 2002/0098882 | A1 | 7/2002 | Lind et al. |
| 2002/0098883 | A1 | 7/2002 | Packes, Jr. et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0196342 | A1 | 12/2002 | Walker et al. |
| 2003/0060257 | A1 | 3/2003 | Katz et al. |
| 2003/0060261 | A1 | 3/2003 | Katz et al. |
| 2003/0060276 | A1 | 3/2003 | Walker et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0134670 | A1 | 7/2003 | Kilby |
| 2003/0181231 | A1 | 9/2003 | Vancura et al. |
| 2003/0190943 | A1 | 10/2003 | Walker et al. |
| 2003/0211884 | A1 | 11/2003 | Gauselmann |
| 2004/0014515 | A1 | 1/2004 | Tracy et al. |
| 2004/0036212 | A1 | 2/2004 | Walker et al. |
| 2004/0038723 | A1 | 2/2004 | Schneier et al. |
| 2004/0063483 | A1 | 4/2004 | Wolf et al. |

OTHER PUBLICATIONS

Electronic Pull Tabs Advertisement by 21st Century Gaming, published prior to 2002.

Instant Winner Advertisement by Williams/WMS Gaming, published prior to 2002.

Lucky Times California Lottery Newsletter published 1996.

FIG. 3

120 122

| | Poker Hand Seed | Poker Hand Determined by Associated Poker Hand Seed | |
|---|---|---|---|
| 120a | 1666808625 | 2S 3S 4S 5S 6S | 122a |
| 120b | 56090177 | 2S 3S 4S 5S 7S | 122b |
| | ... | ... | |
| 120c | 2097814389 | QC QH 2D 3S 8C | 122c |
| 120d | 1107371101 | JC JH QH KH 2C | 122d |
| | ... | ... | |
| 120e | 15200681 | 9D 10D JD QD KD | 122e |
| 120f | 220921901 | 10D JD QD KD AD | 122f |

FIG. 4

| Poker Game Outcome | Payout Amount |
|---|---|
| Royal Flush | 250 |
| Straight Flush | 200 |
| Four-of-a-kind | 40 |
| Full House | 7 |
| Flush | 7 |
| Straight | 7 |
| Three-of-a-kind | 3 |
| Two Pair | 1 |
| Pair of Jacks or Better | 1 |
| Lose | 0 |

FIG. 8

| Win Amount | Poker Game Outcomes Used | | | | | | | | | | Distribution | | | | | | | | | |
|---|---|---|---|---|---|---|---|---|---|---|---|---|---|---|---|---|---|---|---|---|
| | Lose (0) | Jacks or Better (1) | Two Pair (1) | Three of a Kind (3) | Straight (7) | Flush (7) | Full House (7) | Four of a Kind (40) | Straight Flush (200) | Royal Flush (250) | Lose (0) | Jacks or Better (1) | Two Pair (1) | Three of a Kind (3) | Straight (7) | Flush (7) | Full House (7) | Four of a Kind (40) | Straight Flush (200) | Royal Flush (250) |
| 0 | Yes | | | | | | | | | | 5 | | | | | | | | | |
| 1 | Yes | Yes | | | | | | | | | 4 | 1 | | | | | | | | |
| 1 | Yes | | Yes | | | | | | | | 4 | | 1 | | | | | | | |
| 2 | Yes | Yes | | | | | | | | | 3 | 2 | | | | | | | | |
| 2 | Yes | | Yes | | | | | | | | 3 | | 2 | | | | | | | |
| 2 | Yes | Yes | Yes | | | | | | | | 3 | 1 | 1 | | | | | | | |
| ... | ... | ... | ... | ... | ... | ... | ... | ... | ... | ... | ... | ... | ... | ... | ... | ... | ... | ... | ... | ... |
| 5 | | Yes | | | | | | | | | | 5 | | | | | | | | |
| 5 | | | Yes | | | | | | | | | | 5 | | | | | | | |
| 5 | Yes | | Yes | Yes | | | | | | | 2 | | 2 | 1 | | | | | | |
| 5 | Yes | Yes | | Yes | | | | | | | 2 | 2 | | 1 | | | | | | |
| 5 | Yes | Yes | Yes | Yes | | | | | | | 2 | 1 | 1 | 1 | | | | | | |
| 5 | | Yes | Yes | | | | | | | | | 4 | 1 | | | | | | | |
| | | | | | | | | | | | | 3 | 2 | | | | | | | |
| | | | | | | | | | | | | 2 | 3 | | | | | | | |
| | | | | | | | | | | | | 1 | 4 | | | | | | | |
| ... | ... | ... | ... | ... | ... | ... | ... | ... | ... | ... | ... | ... | ... | ... | ... | ... | ... | ... | ... | ... |
| 7 | Yes | | | | Yes | | | | | | 4 | | | | 1 | | | | | |
| 7 | Yes | | | | | Yes | | | | | 4 | | | | | 1 | | | | |
| 7 | Yes | | | | | | Yes | | | | 4 | | | | | | 1 | | | |
| 7 | | Yes | | Yes | | | | | | | | 4 | | 1 | | | | | | |
| 7 | | | Yes | Yes | | | | | | | | | 4 | 1 | | | | | | |
| 7 | | Yes | Yes | Yes | | | | | | | | 2 | 2 | 1 | | | | | | |
| | | | | | | | | | | | | 1 | 3 | 1 | | | | | | |
| | | | | | | | | | | | | 3 | 1 | 1 | | | | | | |
| 7 | Yes | Yes | | Yes | | | | | | | 2 | 1 | | 2 | | | | | | |
| 7 | Yes | | Yes | Yes | | | | | | | 2 | | 1 | 2 | | | | | | |
| ... | ... | ... | ... | ... | ... | ... | ... | ... | ... | ... | ... | ... | ... | ... | ... | ... | ... | ... | ... | ... |
| 35 | | | | | | Yes | | | | | | | | | | 5 | | | | |
| ... | ... | ... | ... | ... | ... | ... | ... | ... | ... | ... | ... | ... | ... | ... | ... | ... | ... | ... | ... | ... |
| 87 | | Yes | | Yes | | | | Yes | | | | 1 | | 2 | | | | 2 | | |
| 87 | | | Yes | Yes | | | | Yes | | | | | 1 | 2 | | | | 2 | | |
| 1000 | | | | | | | | | Yes | | | | | | | | | | 5 | |
| 1250 | | | | | | | | | | Yes | | | | | | | | | | 5 |

FIG. 11

| PAYOUT | SEED (HAND DEALT) |
|---|---|
| 5 | 2097814389 (Hand Dealt : QC QH 2D 3S 8C ) |
| 7 | 2097814389 (Hand Dealt : QC QH 2D 3S 8C ) |
| 9 | 2097814389 (Hand Dealt : QC QH 2D 3S 8C ) |
| 11 | 2097814389 (Hand Dealt : QC QH 2D 3S 8C ) |
| 35 | 56090177 (Hand Dealt : 2S 3S 4S 5S 7S ) |
| 35 | 2097814389 (Hand Dealt : QC QH 2D 3S 8C ) |
| 87 | 2097814389 (Hand Dealt : QC QH 2D 3S 8C ) |
| 1000 | 1866808625 (Hand Dealt : 2S 3S 4S 5S 6S ) |
| 1000 | 15200681 (Hand Dealt : 9D TD JD QD KD ) |
| 1250 | 220921901 (Hand Dealt : TD JD QD KD AD ) |

FIG. 17

| | Hands | | |
|---|---|---|---|
| Award | 1 | 2 | 3 |
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 18

| | Hands | | |
|---|---|---|---|
| Award | 1 | 2 | 3 |
| 0 | 1 | 0 | 0 |
| 1 | 1 | 0 | 0 |
| 2 | 0 | 0 | 0 |
| 3 | 1 | 0 | 0 |
| 4 | 0 | 0 | 0 |
| 5 | 0 | 0 | 0 |
| 6 | 0 | 0 | 0 |
| 7 | 1 | 0 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 19

| | Hands | | |
|---|---|---|---|
| Award | 1 | 2 | 3 |
| 0 | 1 | 1 | 0 |
| 1 | 1 | 1 | 0 |
| 2 | 0 | 0 | 0 |
| 3 | 1 | 1 | 0 |
| 4 | 0 | 0 | 0 |
| 5 | 0 | 0 | 0 |
| 6 | 0 | 0 | 0 |
| 7 | 1 | 1 | 0 |
| 8 | 0 | 0 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 20

| | Hands | | |
|---|---|---|---|
| Award | 1 | 2 | 3 |
| 0 | 1 | 1 | 0 |
| 1 | 1 | 1 | 0 |
| 2 | 0 | 1 | 0 |
| 3 | 1 | 1 | 0 |
| 4 | 0 | 1 | 0 |
| 5 | 0 | 0 | 0 |
| 6 | 0 | 0 | 0 |
| 7 | 1 | 1 | 0 |
| 8 | 0 | 1 | 0 |
| 9 | 0 | 0 | 0 |
| 10 | 0 | 0 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 21

| | Hands | | |
|---|---|---|---|
| Award | 1 | 2 | 3 |
| 0 | 1 | 1 | 0 |
| 1 | 1 | 1 | 0 |
| 2 | 0 | 1 | 0 |
| 3 | 1 | 1 | 0 |
| 4 | 0 | 1 | 0 |
| 5 | 0 | 0 | 0 |
| 6 | 0 | 1 | 0 |
| 7 | 1 | 1 | 0 |
| 8 | 0 | 1 | 0 |
| 9 | 0 | 0 | 0 |
| 10 | 0 | 1 | 0 |
| 11 | 0 | 0 | 0 |
| 12 | 0 | 0 | 0 |
| 13 | 0 | 0 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 22

| | Hands | | |
|---|---|---|---|
| Award | 1 | 2 | 3 |
| 0 | 1 | 1 | 0 |
| 1 | 1 | 1 | 0 |
| 2 | 0 | 1 | 0 |
| 3 | 1 | 1 | 0 |
| 4 | 0 | 1 | 0 |
| 5 | 0 | 0 | 0 |
| 6 | 0 | 1 | 0 |
| 7 | 1 | 1 | 0 |
| 8 | 0 | 1 | 0 |
| 9 | 0 | 0 | 0 |
| 10 | 0 | 1 | 0 |
| 11 | 0 | 0 | 0 |
| 12 | 0 | 0 | 0 |
| 13 | 0 | 0 | 0 |
| 14 | 0 | 1 | 0 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |
| 20 | 0 | 0 | 0 |
| 21 | 0 | 0 | 0 |

FIG. 23

| | Hands | | |
|---|---|---|---|
| Award | 1 | 2 | 3 |
| 0 | 1 | 1 | 1 |
| 1 | 1 | 1 | 1 |
| 2 | 0 | 1 | 1 |
| 3 | 1 | 1 | 1 |
| 4 | 0 | 1 | 1 |
| 5 | 0 | 0 | 1 |
| 6 | 0 | 1 | 1 |
| 7 | 1 | 1 | 1 |
| 8 | 0 | 1 | 1 |
| 9 | 0 | 0 | 1 |
| 10 | 0 | 1 | 1 |
| 11 | 0 | 0 | 1 |
| 12 | 0 | 0 | 0 |
| 13 | 0 | 0 | 1 |
| 14 | 0 | 1 | 1 |
| 15 | 0 | 0 | 1 |
| 16 | 0 | 0 | 0 |
| 17 | 0 | 0 | 1 |
| 18 | 0 | 0 | 0 |
| 19 | 0 | 0 | 0 |
| 20 | 0 | 0 | 0 |
| 21 | 0 | 0 | 1 |

MULTI-PLAY CARD GAME GAMING SYSTEM WITH PREDETERMINED GAME OUTCOMES

PRIORITY CLAIM

This application is a continuation of, claims priority to and the benefit of U.S. patent application Ser. No. 12/683,233, filed on Jan. 6, 2010, which is a continuation of, claims priority to and the benefit of U.S. patent application Ser. No. 11/464,992, filed on Aug. 16, 2006, now U.S. Pat. No. 7,658,672, which claims priority to and the benefit of U.S. Provisional Patent Application Ser. No. 60/709,959, filed on Aug. 18, 2005, the entire contents of each are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present disclosure relates in general to a multi-play poker gaming system which provides the player a predetermined game outcome.

The majority of the contemporary wagering gaming devices or gaming terminals, such as slot machines or poker games, randomly generate awards and other outcomes. Such gaming terminals typically include a relatively low probability associated with obtaining the highest award, relatively medium probabilities associated with obtaining medium range awards and relatively higher probabilities associated with obtaining low range awards. These gaming terminals also include probabilities associated with obtaining losses or no award at all. The probabilities of obtaining the awards and the amount of the awards determine the average expected pay out percentage of these wagering gaming terminals. Because the outcomes of these gaming terminals are completely randomly determined, there is no certainty that a player will ever obtain any particular award. No matter how many times a player plays the game, since the gaming terminal generates outcomes randomly or completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays.

For example, a probability-based $1 poker machine gaming terminal may be programmed to payback, on average, 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based poker machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos can attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the actual payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Alternatively, each electronic ticket could be assigned to a random number or game play seed which is deterministic of a predetermined outcome. In this embodiment, the gaming terminal utilizes the random number or game play seed in a selected deterministic random number generating algorithm to generate random numbers that the gaming terminal then uses to determine and provide the predetermined outcome. In an instant-type lottery gaming terminal, as the predetermined outcome for each electronic ticket is revealed to a player on the gaming terminal, the ticket is removed (i.e., flagged as used) from the finite pool or set of electronic tickets. Once removed from the pool or set, a ticket cannot be used again to determine another game outcome. This type of gaming terminal provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

It should be appreciated that even though a pool may contain more than one of the same game outcome (i.e., the loss or the win and if a win, the value), the presentation to the player (such as the cards dealt or drawn in the case of simulated card games) is preferably varied for each sequential game outcome. For example, in the twenty ticket pool described above, while three game outcomes may each determine a win game outcome with a value of $1, in a poker game machine each game outcome will be preferably presented to the player as one of a plurality of different card combinations that all yield the same $1 win outcome.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, a game outcome is randomly generated based on probability data by the central controller. The generated game outcome and how the game outcome is to be presented or displayed to the player are communicated from the central controller to the individual gaming terminal and then provided to the player. It should be appreciated that one central processor may continuously run hundreds or thousands of individual gaming terminals at once. Additionally, each individual gaming terminal may include a plurality of different types of games played at a plurality of different denominations.

In order to comply with the above mentioned regulatory rules that do not permit the use of probability-based gaming terminals, central determination gaming systems have been implemented wherein the central system maintains one or more predetermined pools or sets of game outcomes. Each game outcome in each set or pool includes a game outcome component (i.e., a win, a loss, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming terminal. The individual gaming terminal displays or presents the game presentation component and provides the player the game outcome component with the associated value, if any, for the selected game outcome. Additionally, certain central determination gaming systems have also been implemented wherein the central system maintains one or more predetermined pools or sets of random number or game outcome seeds.

Central production or control can assist a casino or other entity in maintaining appropriate records, controlling gaming, reducing and preventing cheating or electronic or other errors, reducing or eliminating win-loss volatility and the like. However, it should be appreciated that some existing central determination gaming systems involve minimal to no player interaction other than initiating a game play at a gaming terminal. That is, similar to an instant type lottery game, the central controller selects a game outcome from the pool and the selected game outcome is provided to the player with the player unable to influence the provided game outcome. Therefore, a need exists for central determination gaming systems that provide an increased level of player interaction while still providing a predetermined game outcome to a player.

As described above, in addition to central determination gaming systems, other known gaming devices are operable to provide a player a predetermined outcome. In these gaming devices, rather than receiving an outcome from a central controller, the gaming device stores a plurality of predetermined outcomes in a memory device. Upon a player initiating a game at the gaming device, the predetermined outcome which will ultimately be provided to the player is selected and flagged or marked as used. The gaming device then proceeds with one or more game sequences and upon the conclusion of the game sequences, the selected predetermined outcome is provided to the player. In another embodiment, a predetermined game outcome is determined based on the results of a bingo or keno game. In this embodiment, a plurality of individual gaming device each utilizes one or more bingo or keno games to determine the predetermined game outcome which will be provided to the player for any game played at that gaming device.

Poker games such as draw poker games are also well known. In a typical draw poker game, a gaming device initially deals five cards all face up from a conventional virtual deck of fifty-two playing cards. The player selects the cards, if any, to hold via one or more input devices, such as pressing related hold buttons or via the touch screen. The player then presses the deal button and each of the unwanted or discarded cards, if any, are removed from the display and replaced with another card dealt from the remaining cards in the deck. This results in a five-card hand which is evaluated or compared to a payout table which utilizes conventional poker hand rankings to determine the winning hands. The player is provided with an award, if any, based on a winning hand and the credits the player wagered on the hand.

Another known poker game includes multiple hands of poker played simultaneously. In one such game, the player is dealt a plurality of hands of cards, such as three, five, ten, fifty or one-hundred individual hands of cards. In alternative versions, (i) the same cards are initially dealt or displayed for each of the individual hands of cards, or (ii) playing cards are only dealt or displayed for a primary hand and the remaining simultaneously played hands do not initially display any individual playing cards. The player chooses the cards to hold, if any, in a primary hand. The held cards in the primary hand are also held in each of the remaining hands of cards. After holding zero, one or more cards in the primary hand (and thus holding zero, one or more of the same cards in each of the remaining hands), the gaming device removes the remaining non-held playing cards from each of the hands of cards. For each hand of cards, a replacement card is independently dealt for each removed, non-held playing card, wherein each hand of cards is associated with its own deck of cards. Each individual poker hand is compared, hand by hand, to a payout table which utilizes conventional poker hand rankings to determine the award, if any, associated with each of the individual poker hands. A total award based on any of the determined awards is provided to the player.

Some known gaming devices have attempted to provide a poker game wherein the outcome is predetermined. In these known games, a player is shown a first group of cards and invited to select one or more cards to be discarded. The player is then shown a second group of cards and a payoff is provided if the second group of cards is a winning hand according to a predetermined payout schedule. In these games, the initial group of cards and the second group of cards are both predetermined prior to the time the game is started. For this reason, there can often be an inconsistency between the player's selection of cards that are to be discarded and the transition from the initial group of cards to the second group of cards. This inconsistency can interfere with the desired simulation of a card game which provides a predetermined outcome.

One known gaming device described in U.S. Pat. No. 6,729,961 includes a poker game wherein an initial hand of cards is displayed to a player. The player designates which of the initial hand of cards are to be held and which are to be discarded and the game displays an intermediate hand generated in accordance with the player-specified designations. In this gaming device, a second hand which is associated with a value equal to the value associated with the predetermined game outcome is shown and in those cases where the player-specified designation (Hold/Discard) is inconsistent with a transition from the intermediate hand to the second hand, an entertaining display is shown and the predetermined game outcome is provided to the player.

Additionally, if there is an inconsistency between the award provided for the player's second hand which is based on the player's selections of cards to be discarded and the award associated with the predetermined outcome, other known gaming devices employ a mystery win card to increase the provided win amount up to the win amount associated with the predetermined game outcome. In other known gaming devices, any inconsistency between the award provided for the player's second hand which is based on the player's selections of cards to be discarded and the award associated with the predetermined outcome is held in an escrow or progressive pool to be subsequently provided to a player.

Moreover, to provide a predetermined game outcome to a player that is simultaneously playing a plurality of poker hands, the predetermined game outcome must be divided over one or more of the simultaneously played poker hand (and is often divided over a plurality of simultaneously played poker hands) while taking into account the different amounts wagered on the different simultaneously played poker hands. That is, the gaming device must find a distribution of outcomes which adds up to the predetermined award amount. For example, in a ten-play poker gaming device, there must be exactly ten individual payout amounts (i.e., one payout amount for each poker hand simultaneously played), which each match a payout from an applicable paytable of poker game outcomes, such that all ten payouts add up to the predetermined game outcome. However, in this example, a ten-play poker game with ten possible payout amounts includes 92,378 possible distributions of poker game outcomes wherein not all payout amounts have an associated distribution. For example, using only the payout values of 0, 1, 2, 3, 4, 6, 9, 25, 50 and 250, the ten individual payout amounts may be combined in one or more distributions to add up to the following values:

747: There is exactly 1 distribution:
250, 250, 50, 50, 50, 50, 25, 9, 9, 4
748: There is no distribution.
749: There is exactly 1 distribution:
250, 250, 50, 50, 50, 50, 25, 9, 9, 6
750: There are 5 distributions:
250, 250, 250, 0, 0, 0, 0, 0, 0, 0
250, 250, 50, 50, 50, 50, 50, 0, 0, 0
250, 250, 50, 50, 50, 50, 25, 25, 0, 0
250, 250, 50, 50, 50, 25, 25, 25, 25, 0
250, 250, 50, 50, 25, 25, 25, 25, 25, 25
993: There is 1 distribution:
250, 250, 250, 50, 50, 50, 50, 25, 9, 9
994-999: There is no distribution.
1000: There are 4 distributions:
250, 250, 250, 250, 0, 0, 0, 0, 0, 0
250, 250, 250, 50, 50, 50, 50, 50, 0, 0
250, 250, 250, 50, 50, 50, 50, 25, 25, 0
250, 250, 250, 50, 50, 50, 25, 25, 25, 25

This problem is only magnified if more poker hands are simultaneously played. For example, a twenty-play poker game with ten possible payout amounts includes 10,015,005 possible distributions of poker game outcomes and a fifty-play poker game with ten possible payout amounts includes 12,565,671,261 possible distributions of poker game outcomes. It should be appreciated that since the player is enabled to play a variable number of simultaneously played poker hands (i.e., the player may play one to ten poker hands in a ten-play poker game), each different number of played poker hands includes a different number of possible distributions of poker game outcomes. For example, if a player is simultaneously playing seven poker hands (out of a possible ten poker hands in a ten-play poker game), the gaming device must utilize a different set of possible distributions than if the player were simultaneously playing six or eight poker hands. It should be further appreciated that each set of possible distributions is specific to the number of possible payout amounts and the value of each possible payout amount, wherein if the number of possible payout amounts and/or the value of each possible payout amount changes, so may the set of possible distributions. Accordingly, it is not practical for a gaming device to try all possible distributions to determine an appropriate distribution of poker game outcomes or to determine that no solution or appropriate distribution exists. Therefore, since the gaming device must react quickly to the player's choice, a need exists for a gaming system and method to quickly and accurately select an appropriate distribution or determine that no solution exists.

Accordingly, many challenges exist in providing a predetermined game outcome to a player simultaneously playing a plurality of poker hands. The gaming device or gaming system must first determine which playing cards may be initially dealt to the player for the primary poker hand. Depending on the number of poker hands simultaneously played and the predetermined game outcome, certain poker hands should not be initially dealt to the player for the primary poker hand. For example, if a player is simultaneously playing ten poker hands, the predetermined game outcome is associated with a value or payout of twenty and the playing cards which result in a royal flush (associated with a payout of two-hundred-fifty) are initially dealt to the player for the primary poker hand, the player would presumably hold all of the initially dealt playing cards. In this example, each of the ten simultaneously played poker hands would result in a royal flush poker hand associated with a payout of two-hundred-fifty (for a total payout of two-thousand-five-hundred) which is inconsistent with the value of twenty associated with the predetermined game outcome and which must be provided to the player. Accordingly, to decrease or eliminate such inconsistencies, a gaming system or gaming device must determine which playing cards may be initially dealt to the player for the primary poker hand.

The second challenge which must be overcome in providing a predetermined game outcome to a player that is simultaneously playing multiple hands of poker is determining which playing cards to draw in each of the simultaneously played poker hands to produce a total payout amount for all of the played poker hands equal to the value or payout associated with the predetermined game outcome. After determining the payout associated with the predetermined game outcome, the gaming device must determine (based on the playing cards the player designated to hold and discard as well as the amount wagered on each of the simultaneously played poker hands) one or more distribution of poker game outcomes for the simultaneously played poker hands which would result a total payout for all of the simultaneously played poker hands equaling the payout associated with the predetermined game outcome.

A need exists for a central determination gaming system wherein a player may play a plurality of simultaneous hands and a predetermined game outcome is provided to the player.

SUMMARY

The present disclosure relates to a central determination multi-play poker game gaming system and method wherein the player is provided a predetermined game outcome.

In one embodiment, prior to a player initiating game play of a multi-hand poker game at a gaming device, a plurality of different databases or tables are generated. A first database includes data representing a plurality of different playing card combinations (i.e., poker hands) and the different poker game outcomes possible for each poker hand in the first table if each poker hand were played according to a conventional auto-hold strategy. For example, the first database may include an entry for an initial poker hand including the nine of spades, ten of spades, the jack of spades, the queen of spades and the king of spades. For this entry, the first database may include an indication that, according to the auto-hold strategy, all of the playing cards should be held for this initial poker hand and when all of the playing cards are held for this initial poker hand, a straight-flush poker hand is the only poker game outcome possible. For example, the first database may also include an entry for an initial poker hand including the jack of spades, the jack of diamonds, the three of clubs, the seven of hearts and the ten of spades. For this entry, the first database may include an indication that, according to the auto-hold strategy, the jack of spades and the jack of diamonds should be held for this initial poker hand and when these playing cards are held, a jacks or better poker game outcome, a two pair poker game outcome, a three-of-a-kind poker game outcome, a full house poker game outcome and a four-of-a-kind poker game outcome are each possible based on the held jack of spades and jack of diamonds playing cards. It should be appreciated that while this database includes data or information representing such playing cards and poker game outcomes, for convenience, this database may be referred to herein as including such playing cards and such poker game outcomes.

A second database includes data representing a plurality of different payout amounts for the multi-hand poker game (i.e., a payout of zero to a maximum possible payout amount) and the distributions of possible poker game outcomes which correlate to each of the payout amounts. The distribution of possible poker game outcomes for this second database is based on an applicable paytable and the number of simultaneously played poker hands. For example, assuming five poker hands will be simultaneously played and according to the applicable paytable, the payout amount associated with a poker game outcome of a straight-flush is two-hundred, the second database may include an entry that for the payout amount of one-thousand, the only distribution of poker game outcomes which corresponds to that payout amount is five straight-flush poker hand outcomes (i.e., five straight-flush poker hands which payout two-hundred each equals the total payout amount of one-thousand). It should be appreciated that while this database includes data or information representing a plurality of different payout amounts and the distributions of possible poker game outcomes which correlate to each of these payout amounts, for convenience, this database may be referred to herein as including such payout amounts and such distributions of poker game outcomes.

The generated databases are used to determine the different payout amount(s) which may be provided to a player for each of the different initial poker hands from the first database. For example, by comparing the entries for the first and second databases, it is determined that the payout amount of one-thousand may be provided for (i.e., is associated with) the initial poker hand including the nine of spades, ten of spades, the jack of spades, the queen of spades and the king of spades.

When a player initiates game play of the multi-hand poker game at a gaming device, a predetermined game outcome (which is associated with a payout amount) is selected. An initial poker hand which is previously associated with that payout amount of the predetermined game outcome is selected accordingly. For example, if the payout amount of eighty-seven is associated with the predetermined game outcome, an initial poker hand from one or a plurality of different poker hands which are each previously associated with the payout amount of eighty-seven (e.g., an initial poker hand including the jack of spades, the jack of diamonds, the three of clubs, the seven of hearts and the ten of spades) may be selected. The gaming device displays an initial poker hand which includes the playing cards of the selected initial poker hand. In addition to the initial displayed poker hand; in one embodiment, the gaming device simultaneously displays at least one and preferably a plurality of secondary poker hands, wherein each simultaneously displayed secondary poker hand includes equivalent playing cards as the initial poker hand. The gaming device enables a player to select one or more of the dealt playing cards from the initial poker hand to hold or to discard. The held playing cards in the initial poker hand are also held in one, more or each of the plurality of simultaneously displayed secondary poker hands.

The gaming device evaluates the set of cards selected by the player to hold and determines, based on one or more of the generated databases, a compatible distribution of poker game outcomes that provides a total payout (i.e., the sum of the payouts for each of the simultaneously played poker hands) equal to the payout of the predetermined game outcome. That is, the gaming device determines what poker game outcomes may be formed from the set of actually held playing cards (wherein each played poker hand includes the same set of held playing card) and determines an appropriate distribution of these possible poker game outcomes which correlates to the payout associated with the predetermined game outcome. The determined distribution represents the payout which each of the simultaneously played poker hands must result in to yield a total payout equal to the payout of the predetermined game outcome. If a compatible distribution is not determined, the gaming device replaces one or more of the player's held playing cards with different playing cards and determines, as described above, a compatible distribution which provides a total payout equal to the payout of the predetermined game outcome. For example, if the initial poker hand dealt to the player includes the jack of spades, the jack of diamonds, the three of dubs, the seven of hearts and the ten of spades and the player designated to hold the pair of jack playing cards, the gaming device would determine that a jacks or better poker game outcome, a two pair poker game outcome, a three-of-a-kind poker game outcome, a full house poker game outcome and a four-of-a-kind poker game outcome are each possible based on the held jack of spades and jack of diamonds playing cards. Based on these possible poker game outcomes, the gaming device determines that a possible distribution of one jacks or better poker game outcome (associated with a payout of one), two three-of-a-kind poker game outcomes (each associated with a payout of three) and two four-of-a-kind poker game outcome (each associated with a payout of forty) would correlate to a payout of eighty-seven which is equal to the payout associated with the selected predetermined game outcome.

After determining the appropriate distribution of poker game outcomes to be provided to the player, the gaming device assigns each one of the simultaneously played poker hands one of the poker game outcomes of the determined distribution. The gaming device subsequently causes (by any suitable method) each of the simultaneously played poker hands to draw, if necessary, the appropriate playing cards which would result in the assigned poker game outcome for that played poker hand. It should be appreciated that the total of the payouts provided to the player for each of the simultaneously played poker hands equals the payout amount associated with the selected predetermined game outcome.

Determination of Possible Poker Hands

In one embodiment, as described above, prior to the play of any of the multi-play poker games, a first table or database is generated wherein the first table includes a plurality of different poker hands (represented as random number generator poker hand seeds) and the different poker game outcomes possible for each poker hand if that poker hand were played according to an auto-hold strategy. As described below, the first table or database is created by the gaming system or gaming system developer generating or compiling a set or list of every possible poker hand which may be formed utilizing different combinations of the playing cards in a set or deck of playing cards. For example, a first poker hand includes the playing cards of the three of clubs, the five of spades, the nine of diamonds, the ace of hearts and the ace of spades, while a second poker hand includes the playing cards of the two of spades, the three of spades, the four of spades, the five of spades and the six of spades. R should be appreciated that the set or list of possible poker hands includes only one of each different playing card combination possible. Thus, if the gaming system generates a previously generated poker hand, that poker hand is not added to the set or list of possible poker hands and the gaming system continues with generating possible poker hands.

In one embodiment, each different possible poker hand is associated with or represented by a different random number generator poker hand seed. Each different poker hand seed, when applied to or used by one or more selected deterministic random number generating algorithms, is deterministic of a different one of the possible poker hands which may be dealt. For example, the first poker hand described above is associated with a first poker hand seed and the second poker hand described above is associated with a second different poker hand seed. In this example, if the first poker hand seed is selected, the first poker hand seed is applied to or used by one or more selected deterministic random number generating algorithms to yield a combination of playing cards including the three of clubs, the five of spades, the nine of diamonds, the ace of hearts and the ace of spades. In this embodiment, the gaming system generates a poker hand seed, determines the poker hand associated with or otherwise determined by the generated poker hand seed and then determines if the determined poker hand is already included in the list or set of possible poker hands which may be formed based on the different playing cards available. It should be appreciated that in one embodiment, each different arrangement or order of the same playing cards is considered a different possible poker hand which is associated with a different poker hand seed.

After a set of each possible poker hand is generated, for each generated possible poker hand (i.e., for each generated poker hand seed), the gaming system and method disclosed herein determines which playing cards to hold based on a suitable auto-hold algorithm or strategy. The gaming system's auto-hold strategy takes an appropriate paytable into account in determining which playing cards should be held and which playing cards should be discarded for each of the possible poker hands. For example, for the first generated poker hand of the three of clubs, the five of spades, the nine of diamonds, the ace of hearts and the ace of spades, the gaming system determines that based on the auto-hold strategy, the ace of hearts and the ace of spades should be held and the remaining cards should be discarded. Moreover, for the second generated poker hand of the two of spades, the three of spades, the four of spades, the five of spades and the six of spades, the gaming system determines that based on auto-hold strategy, all of the cards should be held and none of the cards should be discarded. It should be appreciated that since the auto-hold strategy is based on an applicable paytable, any alterations or modifications to the applicable paytable may alter the auto-hold algorithm's recommendation of which playing cards to hold and which playing cards to discard for each generated poker hand.

After determining which playing cards to hold for each of the possible poker hands, the gaming system determines if the auto-hold strategy recommended to forgo a winning hand (i.e., a poker hand that is associated with a payout greater than zero prior to any draw) for a non-winning hand (i.e., a poker hand associated with a payout of zero prior to any draw) for any of the generated possible poker hands. In this embodiment, because the auto-hold strategy recommends which playing cards to hold and which playing cards to discard based on the long term expected payout, the auto-hold strategy may recommend converting a winning poker hand associated with a guaranteed payout amount to a non-winning poker hand (which is not associated with a guaranteed payout amount) due to the non-winning poker hand having a higher average expected payout than the previous winning poker hand.

After such determination, the gaming system removes from the set or list of generated poker hands each determined winning poker hand (i.e., each poker hand seed deterministic of a winning poker hand) which the auto-hold strategy recommends to alter into a non-winning poker hand. For example, the generated poker hand of the jack of clubs, the jack of hearts, the queen of hearts, the king of hearts and the two of clubs is a winning poker hand because the pair of jacks is associated with a payout. However, the gaming system's auto-hold strategy determines that discarding the jack of clubs and the two of clubs and holding the jack of hearts, the queen of hearts and the king of hearts for a chance at a royal flush has a better average expected payout than keeping the guaranteed winning poker hand of the pair of jacks. Thus, in this example, the auto-hold strategy recommends forgoing a winning hand (i.e., the pair of jacks) for a potential losing hand (i.e., the held jack of hearts, queen of hearts and king of hearts). Accordingly, the gaming system removes the generated possible poker hand (or poker hand seed deterministic of this possible poker hand) of the jack of clubs, the jack of hearts, the queen of hearts, the king of hearts and the two of clubs from the set or list of possible poker hands (or poker hand seeds).

For each of the remaining possible poker hands (i.e., each of the poker hands which are determined from one of the poker hand seeds in the generated set or list), the gaming system determines what outcomes are possible based on the playing cards the auto-hold strategy recommended to hold and the playing cards the auto-hold strategy recommended to discard. In one embodiment, the gaming system determines, based on the auto-hold strategy recommendation and the different outcomes possible according to an appropriate paytable, all of the different outcomes which may be generated if the player were to follow the auto-hold strategy's recommendations. For example, for the first generated poker hand of the three of dubs, the five of spades, the nine of diamonds, the ace of hearts and the ace of spades, the gaming system determines that the poker game outcomes of a pair of jacks or better, two-pair, three-of-a-kind, a full house or four-of-a-kind are all possible based on the auto-hold strategy recommendation to hold the ace of hearts and the ace of spades. Additionally, for the second generated poker hand of the two of spades, the three of spades, the four of spades, the five of spades and the six of spades, the gaming system determines that a straight-flush is the only poker game outcome possible based on the auto-hold strategy to hold all of the cards. In one embodiment, the results of these determinations (i.e., the poker hand, the auto-hold strategy recommendations and the different poker game outcomes possible for each poker hand seed) are categorized and stored in one or more appropriate tables or databases (i.e., the first table or database described above).

Generation of Distribution Table

In addition to determining the different poker game outcomes possible for each of the possible poker hands in the set or list of possible poker hands (i.e., each remaining poker hand seed), the gaming system determines and stores, as described above, a second table or database which includes for each available payout amount (i.e., from zero to the maximum payout), the different configurations or distributions of poker game outcomes which would result in that payout amount. This determination is based on the payout amounts associated with each poker game outcome (as designated by an appropriate paytable) as well as by the number of poker hands simultaneously played. For example, Table 1 below illustrates all of the different configurations of poker game outcomes possible for a five-play game which would result in a payout amount of eleven.

TABLE 1

| | Poker Game Outcomes Used (Payouts of Each Outcome in parentheses) | | | | | | |
|---|---|---|---|---|---|---|---|
| Win Amount | Lose (0) | Jacks or Better (1) | Two-pair (1) | Three-of-a-kind (3) | Straight (7) | Flush (7) | Full House (7) |
| 11 | 2 | 1 | | 1 | 1 | | |
| 11 | 2 | 1 | | 1 | | 1 | |
| 11 | 2 | 1 | | 1 | | | 1 |
| 11 | 2 | | 1 | 1 | 1 | | |
| 11 | 2 | | 1 | 1 | | 1 | |
| 11 | 2 | | 1 | 1 | | | 1 |
| 11 | | 1 | 1 | 3 | | | |
| 11 | | 2 | | 3 | | | |
| 11 | | | 2 | 3 | | | |
| 11 | | 1 | 3 | | 1 | | |
| 11 | | 1 | 3 | | | 1 | |
| 11 | | 1 | 3 | | | | 1 |
| 11 | | 2 | 2 | | 1 | | |
| 11 | | 2 | 2 | | | 1 | |
| 11 | | 2 | 2 | | | | 1 |
| 11 | | 3 | 1 | | 1 | | |
| 11 | | 3 | 1 | | | 1 | |
| 11 | | 3 | 1 | | | | 1 |
| 11 | | 4 | | | 1 | | |
| 11 | | 4 | | | | 1 | |
| 11 | | 4 | | | | | 1 |
| 11 | | | 4 | | 1 | | |
| 11 | | | 4 | | | 1 | |
| 11 | | | 4 | | | | 1 |

As illustrated in Table 1, the gaming system determines that, based on the payout associated with each possible poker game outcome and the number of hands simultaneously played, there are twenty-four different configurations of poker game outcomes possible which would result in the payout amount of eleven. For example, the combination of two losing outcomes (paying zero credits each), one two-pair poker game outcome (paying one credit), one three-of-a-kind poker game outcome (paying three credits) and one straight poker game outcomes (paying seven credits) would result in a total payout amount of eleven. Additionally, the combination of one jacks-or-better poker game outcome (paying one credit), one two-pair poker game outcome (paying one credit) and three three-of-a-kind poker game outcomes (paying three credits each) would also result in a total payout amount of eleven.

It should be appreciated that as the above described poker game outcomes configuration determination is dependent on the specific paytable used as well as the number of hands simultaneously played, if the specific paytable used and/or the number of hands simultaneously played changes, any generated distribution table must be modified to account for any changes. That is, each different number of simultaneously played poker hands may require a separate distribution table which must be determined and stored for each applicable paytable which may be utilized. Moreover, as the player may wager different amounts on each of the simultaneously played poker hands, such different wager amounts may correspond to different pay tables used for the different simultaneously played poker hands which may each require a separate distribution table to be determined and appropriately stored.

Assigning Seeds to Win Amounts

In one embodiment, after determining the possible poker game outcome configurations or distributions for each available payout amount, the gaming system or method disclosed herein compares the previously stored poker game outcomes which are possible for each poker hand to the determined different distributions of poker game outcomes which would result in each payout amount to determine which poker hands are appropriate for each payout amount. This determination includes selecting each poker hand, one at a time, and comparing the poker game outcomes possible for the selected poker hand (based on the auto-hold strategy) to each of the different poker game outcome distributions which form each payout amount.

These determinations yield a table or database which includes data representing each possible poker hand from the list or set of possible poker hands (represented as a random number generator poker hand seed) and each of the different payout amounts which, according to an auto-hold strategy, are possible based on the poker hand. The gaming system stores the determinations of which poker hand seeds may be utilized for each payout amount and communicates such determinations to one or more gaming devices. It should be appreciated that each payout amount may have one or more poker hand seeds associated with it and some poker hand seeds may be associated with more than one payout amount. Moreover, some payout amounts may be omitted form the table or database, either because they are impossible to attain, because no known poker hand seed produces them or because they are intentionally omitted to improve game dynamics or aesthetics. It should be appreciated that while this database includes data or information representing each possible poker hand and each of the different payout amounts, for convenience, this database may be referred to herein as including such poker hands and such payout amounts.

For example, after previously determining that only the combination of five straight-flush poker game outcomes (paying two-hundred credits each) would result in a total payout amount of one-thousand and that the poker hand seed deterministic of the second generated poker hand of the two of spades, the three of spades, the four of spades, the five of spades and the six of spades (when held in accordance with the auto-hold strategy) may only yield a straight-flush poker game outcome, the gaming system determines that the poker hand seed deterministic of the second generated poker hand is only suitable for a payout amount of one-thousand. Accordingly, the gaming system associates the poker hand seed which is deterministic of the second generated poker hand with the payout amount of one-thousand.

In another example, the gaming system determines that the first generated poker hand of the three of clubs, the five of spades, the nine of diamonds, the ace of hearts and the ace of spades could yield (based on the possible poker game outcomes of a pair of jacks or better, two-pair, three-of-a-kind, a full house or four-of-a-kind as determined by the auto-hold strategy recommendation to hold the ace of hearts and the ace of spades) a plurality of different payout amounts, such as five, seven, nine, eleven etc. It should be appreciated that one or more poker hand seeds may yield a plurality of different payout amounts because each poker hand seed may be used for any payout amount that corresponds to a poker game outcome configuration using the possible poker game outcomes determined for that poker hand seed.

In one embodiment, since one or more poker hand seeds may each yield a plurality of different payout amounts, the gaming system selects which payout amounts to associate with which poker hand seeds based on a predetermined setting of probabilities of obtaining each payout amount. In this embodiment, the payout amounts and their frequencies of occurrence may be selected to reflect their actual probabilities of occurrence in a probability-based multi-hand poker gaming system.

Game Play

After determining which poker hand seeds may be utilized for each payout amount, the gaming system is adapted for game play of a multi-play poker game. In one embodiment, a player selects a number of simultaneous poker hands to play (i.e., from one poker hand to a designated number, such as one-hundred poker hands) and an amount to wager on each simultaneously played hand. In this embodiment, upon a player making such a wager, a predetermined game outcome is selected. The selected predetermined game outcome represents the outcome which will ultimately be provided to the player. It should be appreciated that the predetermined payout or value associated with the selected predetermined game outcome must be provided to the player over the selected number of simultaneously played poker hands while taking into account the amount wagered on (and thus the applicable paytable) each of the simultaneously played poker hands.

In one embodiment, the predetermined game outcomes are stored in a central controller. In this embodiment, upon a player initiating game play at the gaming device, the initiated gaming device communicates a game outcome request to the central server or controller. Upon receiving the game outcome request, the central controller independently selects one of the game outcomes from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming device to be utilized in the initiated multi-play poker game. In another embodiment, the predetermined game outcome is stored in a memory device of the gaming device. In this embodiment, the gaming device selects a game outcome from a set or pool of stored game outcomes and flags the selected game outcome as used.

In one embodiment, each predetermined game outcome includes an outcome component, such as a win, a lose, a secondary game triggering or other suitable outcome which is associated with a predetermined value or predetermined payout amount, if any (i.e., predetermined game outcome value). For example, a predetermined game outcome of win $11 is selected. In this embodiment, the predetermined game outcome also includes or is otherwise associated with a poker hand seed. As described above, the poker hand seed is deterministic of a plurality of playing cards and is associated with or otherwise based on the predetermined payout amount of the predetermined game outcome.

In one embodiment, the gaming device provides the player five initial playing cards to form an initial primary poker hand. In this embodiment, the gaming device utilizes one or more selected deterministic random number generating algorithms to determine a plurality of playing cards based on the selected poker hand seed. This plurality of determined playing cards is provided to the player as the five initial playing cards which form the initial primary poker hand. For example, the gaming device may deal or display the playing cards of the three of clubs, the five of spades, the nine of diamonds, the ace of hearts and the ace of spades to the player based on the selected poker hand seed.

In one embodiment, in addition to the initial primary poker hand, the gaming device simultaneously displays at least one and preferably a plurality of secondary poker hands. In one embodiment, the simultaneously displayed secondary poker hands each include the same playing cards as or equivalent playing cards to the initial primary poker hand. For example, if the initial primary poker hand includes the ten of hearts playing card and ten of diamonds playing cards, a first secondary poker hand may include the ten of clubs playing card and ten of spades playing card. In this example, another secondary poker hand may includes the eight of hearts playing card and eight of spades playing card. It should be appreciated that in this embodiment, as long as the same poker game outcomes are possible on the draw for each secondary poker hand, the actual playing cards displayed in each of the secondary poker hands does not matter. In another embodiment, the simultaneously displayed poker hands do not initially include any playing cards.

For example, in a five-hand poker game, the gaming device enables the player to simultaneously play five poker hands wherein the held cards from the primary poker hand are held, carried over or replicated into each of the four other simultaneously played poker hands. It should be appreciated that even though zero, one or more cards may be carried over from one or more simultaneously played poker hands, each simultaneously played poker hand is played independent of the remaining simultaneously played poker hands.

After the player is provided an initial poker hand, the player is enabled to select one or more of the initially dealt playing cards in the primary poker hand to hold or to discard. As described above, the held playing cards in the primary hand are also held in one, more or each of the other simultaneously displayed hands of playing cards. In the example described above, the player may designate to hold the ace of hearts and the ace of spades while designating to discard the three of clubs, the five of spades and the nine of diamonds. Thus, each of the five simultaneously played poker hands will initially include the ace of hearts and the ace of spades.

The gaming device evaluates the set of cards selected by the player to hold and determines which poker game outcomes are possible based on the held playing cards and the remaining playing cards in the deck. The gaming device then utilizes a stored table of different distributions of poker game outcomes which would result in each payout amount and the previous determination regarding which poker game outcomes are possible based on the player's held playing cards. In this embodiment, the gaming device utilizes the stored distribution table which corresponds to the applicable pay table, the number of simultaneously played poker hands and the amount wagered on each of the simultaneously played poker hands. The gaming device utilized the appropriate distribution table to determine a distribution of outcomes that provides a total payout equal to the payout of the predetermined game outcome. That is, the distribution table is sorted by payout amount and by win categories used within each payout amount. Accordingly, given a predetermined payout amount and a set of win categories possible (as determined by the cards held by the player), the gaming device first searches the table for the entries with the matching payout amount and then searches those entries for win categories used that are compatible with the determined win categories possible. If more than one matching distribution is found, in one embodiment, the gaming device chooses the first match. In alternative embodiment, if more than one matching distribution is found, the gaming device randomly chooses a match. In this embodiment, the different entries may be weighted (i.e., associated with probabilities) such that some entries are chosen more frequently than others. For example, given a payout amount of seven-hundred-fifty, there may be five ways to distribute outcomes. One uses three royal flushes while another uses two royal flushes, two straight flushes and six four-of-a-kinds. In this example, the distribution with three royal flushes may have a lower probability associated with it to make the frequency of three royal flushes much rarer than the frequency of two royal flushes. It should be appreciated that regardless of if the player plays the poker game according to an auto-hold strategy, the gaming device is adapted to utilize the distribution table, the held playing cards and the remaining playing cards in the deck to search for one or more entries of distributions of outcomes that each provide a total payout equal to the payout of the predetermined game outcome.

For example, utilizing the previously created distribution table, the gaming device determines the poker game outcomes of a pair of jacks or better, two-pair, three-of-a-kind, full house and four-of-a-kind are all possible based on the player's held playing cards of the ace of hearts and the ace of spades. Thus any of the distributions from Table 1 which do not include a straight poker game outcome or a flush poker game outcome are compatible with providing the player the selected predetermined game outcome of $11.

If the gaming device is unable to determine a compatible distribution utilizing the stored table of different distributions of poker game outcomes which would result in each payout amount and the previous determination regarding which poker game outcomes are possible based on the player's held playing cards, the gaming device must replace one or more of the player's held playing cards with different playing cards, different embodiments, the replaced playing cards are predetermined, randomly determined, determined based on the player's wager, determined based on the player's status (e.g., determined through a player tracking system), determined from the occurrence of one or more symbols or determined based on any other suitable method. After replacing one or more of the player's held playing cards with different playing cards, the gaming device repeats the process described above in determining a compatible distribution of poker game outcomes with payouts that total the payout associated with the selected predetermined game outcome.

After determining a compatible distribution utilizing the stored table of different distributions of poker game outcomes which would result in each payout amount and the previous determination regarding which poker game outcomes are possible based on the player's held playing cards, the gaming device selects one of the compatible distributions and utilizes the selected distribution to determine which poker game outcomes need to be produced in each of the simultaneously played hands. After selecting a compatible distribution, the gaming device randomly assigns each one of the simultaneously played poker hands one of the poker game outcomes of the selected compatible distribution. The selected distribution designates the payout which each of the played hands of poker must result in to yield a total payout equal to the payout of the predetermined game outcome. It should be appreciated that if a plurality of compatible distributions of poker game outcomes are available based on the predetermined game outcome and the held playing cards, the gaming device may randomly select one of the compatible distributions or select one of the compatible distributions based on a probability of occurrence associated with each compatible distribution.

For example, the gaming device may select a compatible distribution of two losing poker game outcomes, one two-pair poker game outcome, one three-of-a-kind poker game outcome and one full-house poker game outcome. In this example, the gaming device determines that the cards provided after the draw to two of the simultaneously played poker hands must yield losing poker game outcomes with a payout of zero, the cards provided after the draw to one of the simultaneously played poker hands must yield a two-pair poker game outcome with a payout of one, the cards provided after the draw to one of the simultaneously played poker hands must yield a three-of-a-kind poker game outcome with a payout of three and the cards provided after the draw to one of the simultaneously played poker hands must yield a full-house poker game outcome with a payout of seven. In this example, the payouts associated with each of the provided final poker hands add up to the payout of eleven which is the predetermined game outcome.

After selecting the appropriate payout for each of the played hands of poker, the gaming device causes each of the simultaneously played poker hands to display or draw playing cards which would result in the assigned poker game outcome for that played poker hand. For example, as one of the simultaneously played poker hands must yield a full-house poker game outcome, the gaming device provides zero, one or more playing cards for that played poker hand to result in a full-house poker game outcome. As described below, any suitable manner of providing zero, one or more playing cards to each of the played poker hands may be implemented.

Accordingly, one embodiment of the gaming system disclosed herein provides a multi-play poker game which provides a predetermined game outcome to a player wherein a player is enabled to make one or more choices or decisions during the multi-play poker game while the predetermined game outcome is still provided to the player.

Additional features and advantages are described in, and will be apparent from, the following Detailed Description and the figures.

BRIEF DESCRIPTION OF THE FIGURES

FIG. 3 is a chart of one embodiment disclosed herein illustrating a plurality of poker hand seeds and the poker hand each of the poker hand seeds is deterministic of when the poker hand seed is applied to or used by one or more selected deterministic random number generating algorithms.

FIG. 4 is a paytable of one embodiment disclosed herein illustrating the different possible poker game outcomes and the payout amounts associated with each of the poker game outcomes.

FIG. 8 is a chart of one embodiment disclosed herein illustrating a generated distribution table including a plurality of possible payout amounts and the different outcome configurations which may be generated to result in the payout amounts.

FIG. 11 is a chart of one embodiment disclosed herein illustrating a plurality of different poker game seeds and the payout amounts associated with each poker game seed.

FIGS. 17, 18, 19, 20, 21, 22 and 23 are charts of one alternative embodiment disclosed herein illustrating an example of filling in a generated bitfield.

DETAILED DESCRIPTION

The present disclosure provides a central determination gaming system wherein one or more gaming devices are operable to each play a separate multi-play poker game that provides a predetermined game outcome to the player.

Figure 1:
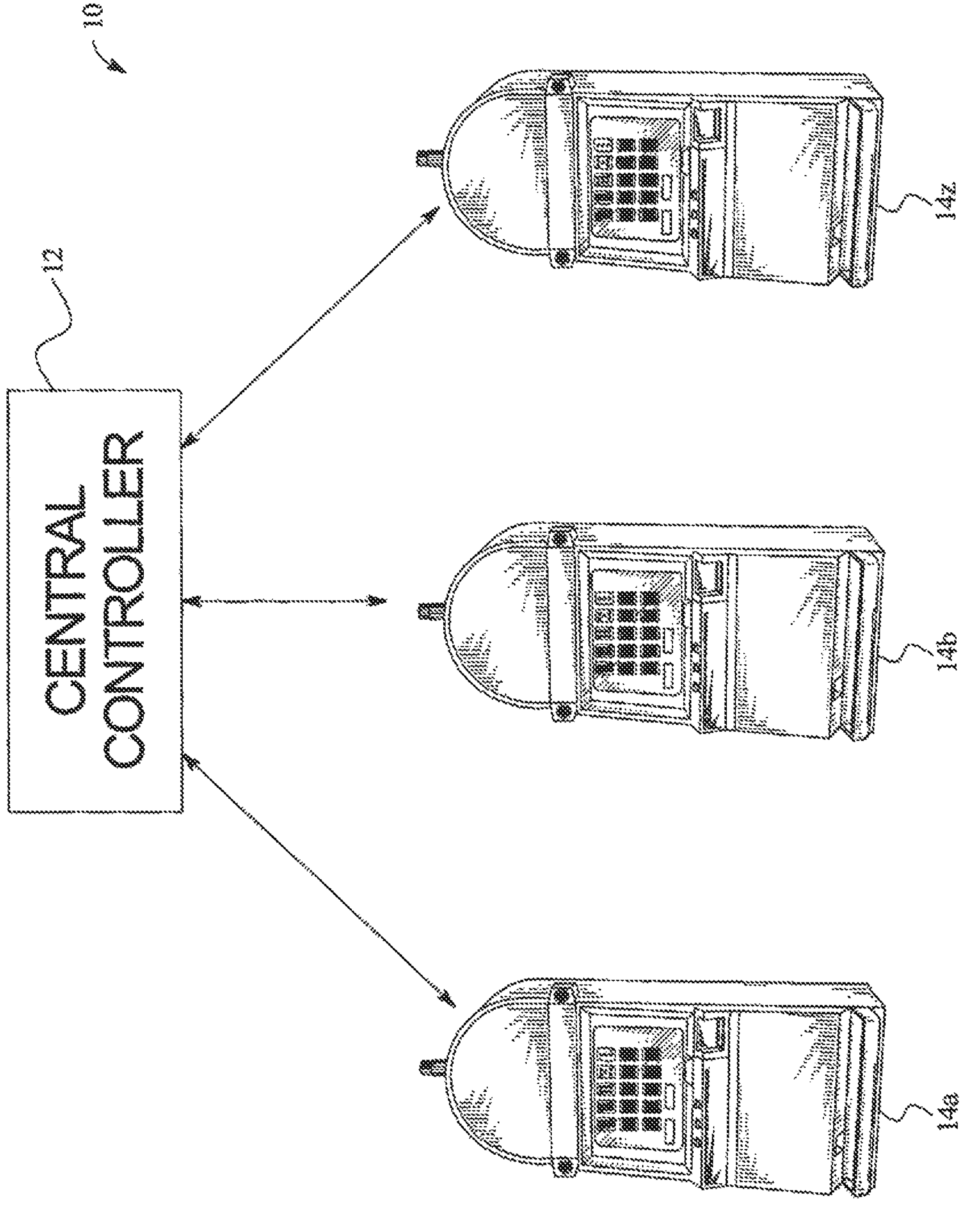
FIG. 1 is a schematic diagram of the central controller in communication with a plurality of gaming machines in accordance with one embodiment disclosed herein.

Referring to FIG. 1, one embodiment of the gaming system 10 includes a central server, central controller or remote host 12 and a plurality of gaming machines or gaming devices 14*a*, 14*b* . . . 14*z* in communication with or linked to the central server or processor 12. The number of gaming machines in the gaming system can vary as desired by the implementer of the gaming system. These gaming machines are referred to herein alternatively as the group of gaming machines, the linked gaming machines or the system gaming machines. The play of each of the gaming machines 14*a*, 14*b* . . . 14*z* in the group is monitored by the central server 12. The central server, central controller or remote host may be any suitable server or computing device which includes a processor and a memory or storage device. In alternative embodiments, the central server is a progressive controller or another gaming machine in the gaming system.

Determination of Possible Poker Hands

Figure 2:
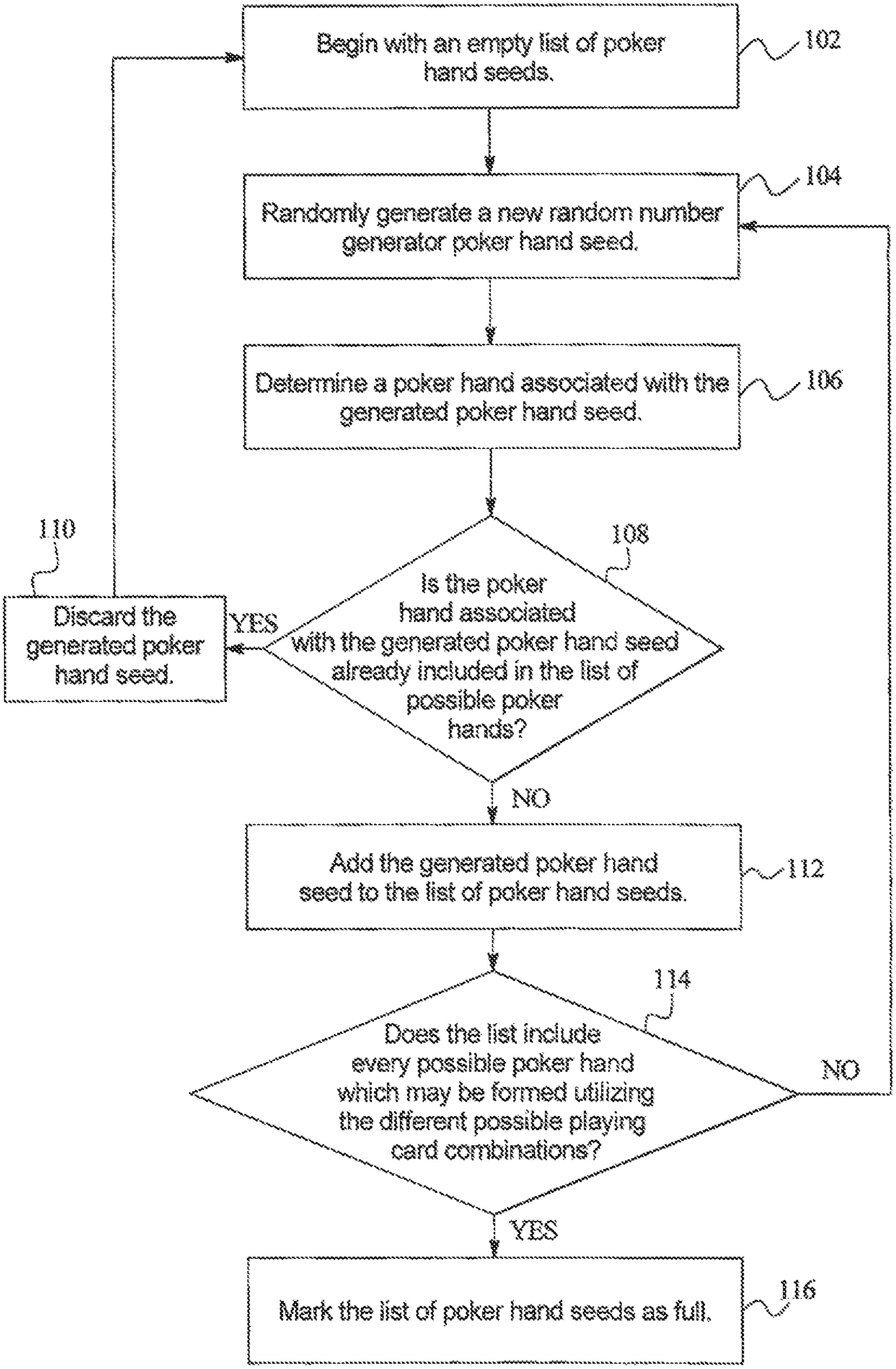
FIG. 2 is a flowchart of one embodiment disclosed herein illustrating the generation of a list of poker hand seeds which are deterministic of every possible poker hand which may be formed.

Referring to FIG. 2, in one embodiment, prior to the play of any of the multi-play poker games, a set or list of poker hand seeds is generated or compiled, wherein the set or list initially includes poker hand seeds which are deterministic of every possible poker hand which may be formed utilizing different playing card combinations. The number of possible poker hands which may be formed is based on the number of playing cards in a deck or set of playing cards as well as the number of playing cards in each poker hand. For example, for a five card poker hand dealt out of a standard fifty-two playing card deck there are 2,598,960 different possible poker hands which may be formed using different combinations of the available playing cards. In different embodiments, this set or list is generated by the game developer, the game development system, the central controller, an individual gaming machine, a casino or gaming machine operator or any other suitable method. In one embodiment, each different arrangement or order of the same playing cards is considered a different possible poker hand which is associated with a different poker hand seed. Accordingly, in this embodiment, the number of different possible poker hands which may be formed using different combinations of the available playing cards is significantly increased.

In this embodiment, after beginning with an empty list of poker hand seeds as indicated in block 102, the gaming system randomly generates a new random number generator poker hand seed as indicated in block 104. Each poker hand seed, when applied to one or more selected deterministic random number generating algorithms, is deterministic of a different one of the possible poker hands which may be dealt based on deck or set of available playing cards.

In one embodiment, the available playing cards from a single fifty-two card deck are utilized. In another embodiment, the playing cards from a plurality of fifty-two card decks are utilized. In another embodiment, the playing cards from a predetermined set of player cards are utilized. In another embodiment, the playing cards from a deck of more than fifty-two playing cards, such as a deck including one or more “joker” or wild playing cards, are utilized. It should be appreciated that any suitable deck or set of playing cards may be utilized in accordance with the present disclosure.

After generating a poker hand seed, the gaming system determines a poker hand associated with the generated poker hand seed as indicated in block 106. In this embodiment, the gaming system applies the generated poker hand seed to one or more selected deterministic random number generating algorithms to determine the poker hand associated with the generated poker hand seed. For example, when a designated poker hand seed is applied to one or more selected deterministic random number generating algorithms, the designated poker hand seed yields an associated first poker hand or combination of playing cards including the three of clubs, the five of spades, the nine of diamonds, the ace of hearts and the ace of spades. It should be appreciated that as each poker hand seed is deterministic of a specific poker hand, each time a specific poker hand seed is applied or used by one or more selected deterministic random number generating algorithms, the poker hand seed will yield the same playing cards to generate the same poker hand.

The gaming system next determines if the poker hand associated with (i.e., determined by) the generated poker hand seed is already included in the list of possible poker hands as indicated in diamond 108. Since the set or list of possible poker hands includes only one of each different playing card combination possible, if the poker hand associated with the generated poker hand seed is already included in the list of possible poker hands, the generated poker hand seed is discarded as indicated in block 110 and the gaming system proceeds to block 104 as described above. If the poker hand associated with the generated poker hand seed is not already included in the list of possible poker hands, the gaming system adds the generated poker hand seed to the list as indicated in block 112.

After adding the generated poker hand seed to the list, the gaming system determines if the list includes every possible poker hand which may be formed utilizing the different possible playing card combinations as indicated in diamond 114. If the list does not include every possible poker hand, the gaming system proceeds to block 104 as described above. If the list includes every possible poker hand, the gaming system marks or flags the list of poker hand seeds as full as indicated in block 116. It should be appreciated that since the different possible poker hands which may be formed is based on the types of available playing cards, the number of available playing cards and the number of playing cards in each poker hand, if the types of available playing cards, the number of available playing cards and/or the number of playing cards in each poker hand are altered or otherwise modified, the list of possible poker hands available would also be altered or modified and thus the list of poker hand seeds would require appropriate alterations or modifications.

FIG. 3 illustrates a sampling of a full list of poker hand seeds. As seen in FIG. 3, each poker hand seed 120 is deterministic or otherwise associated with a poker hand 122. For example, a first poker hand seed 120*a* is deterministic or otherwise associated with a first poker hand 122*a* of the two of spades, the three of spades, the four of spades, the five of spades and the six of spades. A second poker hand seed 120*b* is deterministic of otherwise associated with a second poker hand 122*b* of the two of spades, the three of spades, the four of spades, the five of spades and the seven of spades. In this example, a third poker hand seed 120*c* is deterministic of or otherwise associated with a third poker hand 122*c* of the queen of clubs, the queen of hearts, the two of diamonds, the three of spades and the eight of clubs and a fourth poker hand seed 120*d* is deterministic of or otherwise associated with a fourth poker hand 122*d* of the jack of clubs, the jack of hearts, the queen of hearts, the king of hearts and the two of clubs.

Figure 5:
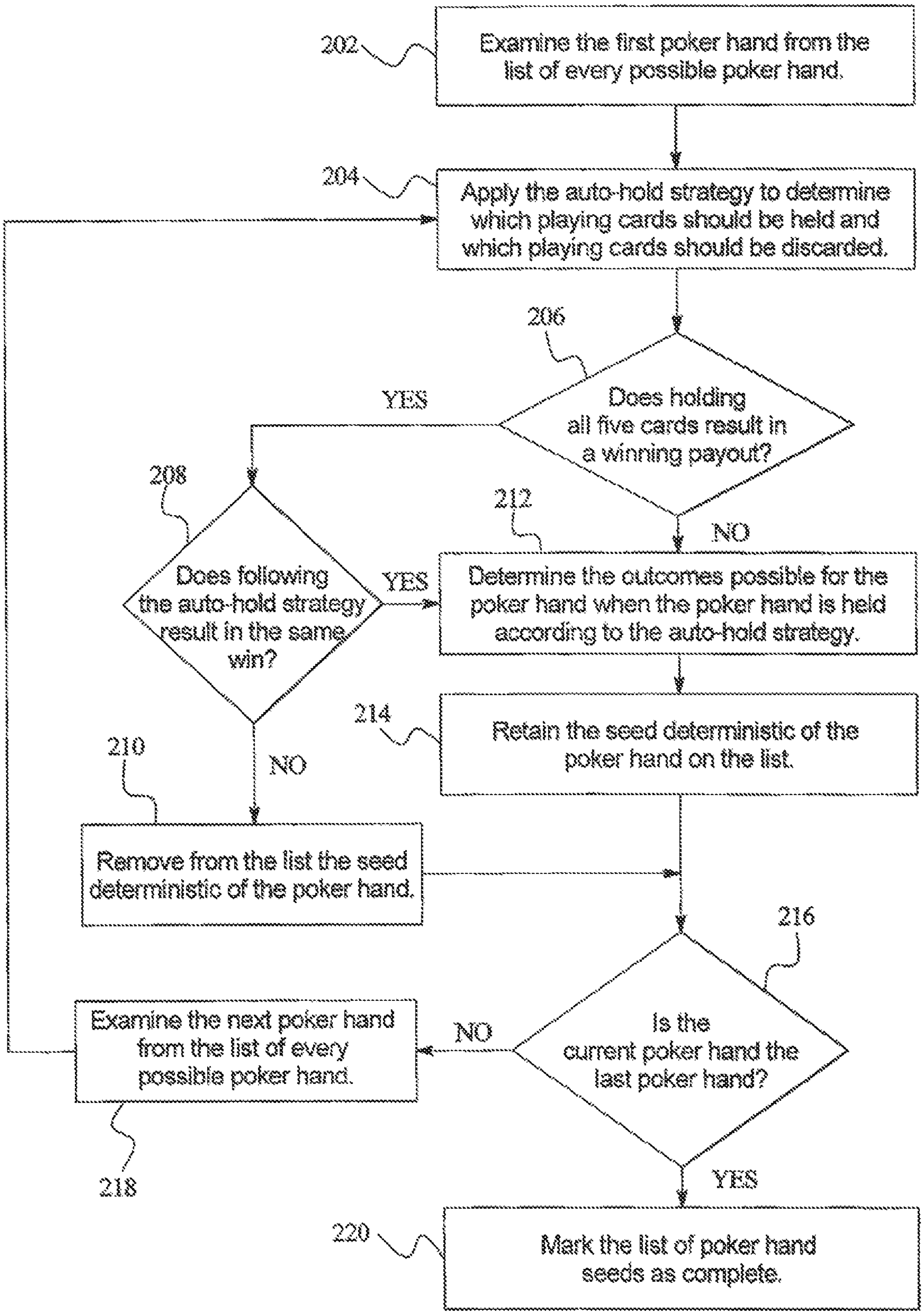
FIG. 5 is a flowchart of one embodiment disclosed herein illustrating a modification of the list of available poker hand seeds.

In one embodiment, after filling the list of poker hand seeds such that each possible poker hand is represented by an associated poker hand seed, the gaming system examines each possible poker hand (i.e., determined by each generated poker hand seed) to determine which playing cards to hold and which playing cards to discard based on a suitable auto-hold algorithm or auto-hold strategy. As illustrated in FIG. 5, the gaming system examines the first poker hand from the list of every possible poker hand as indicated in block 202.

Figure 6:
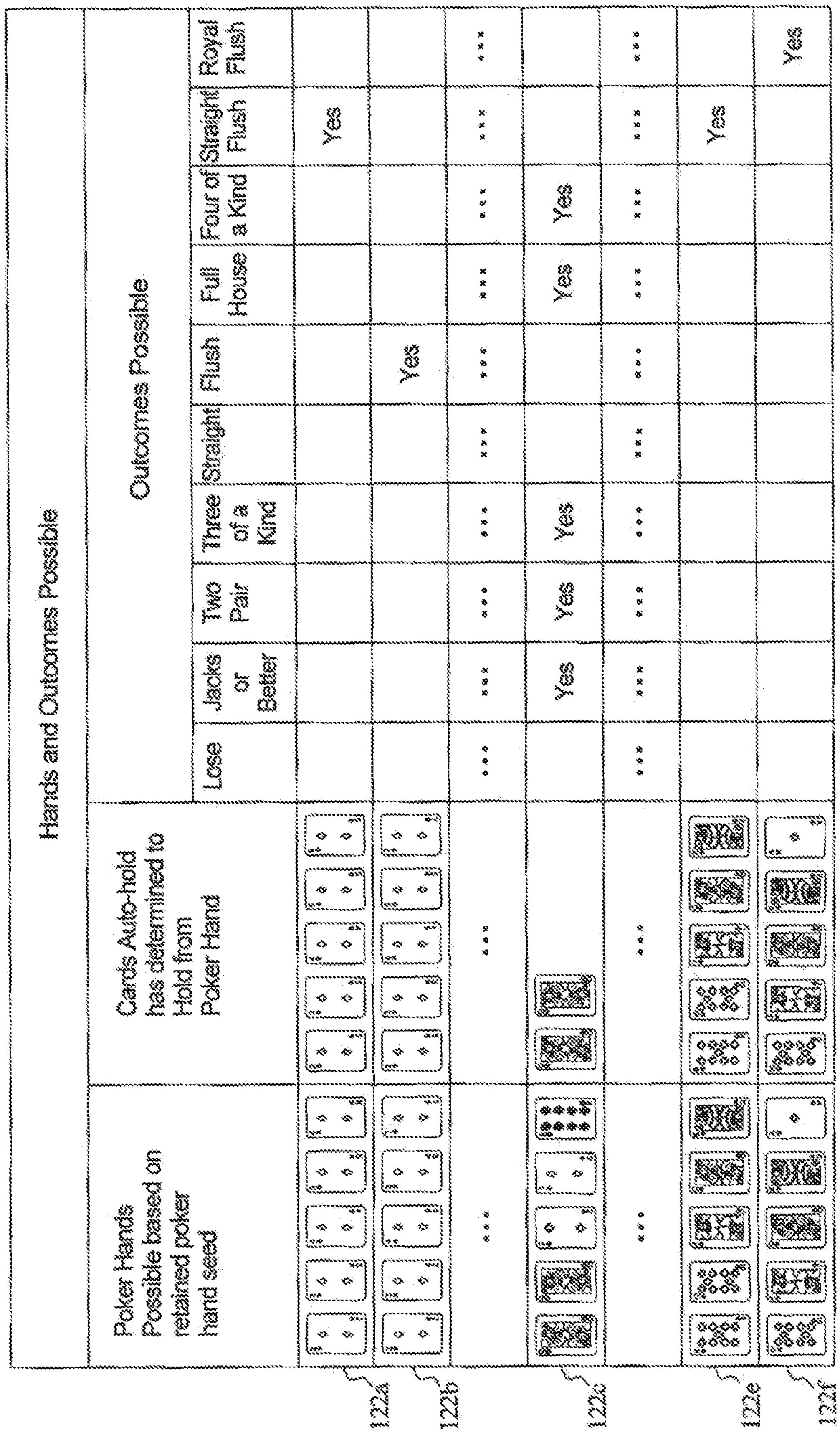
FIG. 6 is a chart of one embodiment disclosed herein illustrating a plurality of the different poker hand seeds and the playing cards an auto-hold algorithm would recommend to hold and discard as well as the different poker game outcomes possible based on the recommended held and discarded playing cards for each of the different poker hand seeds.

The gaming system applies the auto-hold strategy to determine which playing cards should be held and which playing cards should be discarded as indicated in block 204. For example, as illustrated in FIG. 6, for the first generated poker hand 122*a* of the two of spades, the three of spades, the four of spades, the five of spades and the six of spades, the gaming system determines that, based on the auto-hold strategy for the paytable of FIG. 4, each of the playing cards should be held and none of the playing cards should be discarded.

In this embodiment, the auto-hold strategy or algorithm takes an appropriate paytable (as seen in FIG. 4) into account when determining which playing cards should be held and which playing cards should be discarded for each of the possible poker hands. Moreover, the auto-hold strategy determines which playing cards to hold and which playing cards to discard based on maximizing the long term expected payout for the player. It should be appreciated that as the auto-hold strategy is based on the appropriate paytable, any alterations or modifications to an existing paytable may alter the auto-hold algorithm's recommendation of which playing cards to hold and which playing cards to discard for each generated poker hand.

After determining which playing cards to hold for the examined poker hand, the gaming system determines if the auto-hold strategy recommended to forgo a winning hand (i.e., a poker hand that is associated with a payout greater than zero prior to any draw) for a non-winning hand (i.e., a poker hand associated with a payout of zero prior to any draw) for the examined poker hand. That is, as the auto-hold strategy is based on the long term average expected payout, the gaming system determines if the auto-hold strategy recommended discarding of one or more cards from a winning hand with one payout for another hand with a higher expected payout even though such other hand is no longer a guaranteed winning hand but a potential losing hand.

In one embodiment, the gaming system determines if holding all five playing cards result in a winning payout as indicated in diamond 206. If holding all five playing cards results in a winning payout, the gaming system determines if following the auto-hold strategy results in the same win (i.e., the auto-hold strategy is to hold the same playing cards associated with the win) as indicated in diamond 208. If holding all five playing cards does not result in the same win, the gaming system removes the seed deterministic of the examined poker hand from the list of possible poker hands as indicated in block 210. It should be appreciated that removing one or more poker hand seeds reduces the chances that the gaming device will need to override a player's choice (i.e., replace one or more of the player's held playing cards) as described in more detail below.

If holding all five cards does not result in a winning poker hand or if holding all five playing cards results in a winning payout (and following the auto-hold strategy results in the same win), the gaming system determines the outcomes possible for the poker hand when the poker hand is held according to the auto-hold strategy as indicated in block 212. After determining the outcomes possible, the gaming system retains the seed deterministic of the examined poker hand on the list of possible poker hands as indicated in block 214.

In one embodiment, as illustrated in FIG. 6, the results of these determinations (i.e., the poker hand, the auto-hold strategy recommendations and/or the different poker game outcomes possible for each poker hand seed) are categorized and stored in one or more appropriate lists or databases. In another embodiment, the possible poker game outcomes for each possible poker hand are stored with the seed that is deterministic of such possible poker hand. It should be appreciated that for readability, the list or database illustrated in FIG. 6 may only indicate if a poker game outcome is possible based on the held playing cards, wherein any blank entry represents that that specific poker game outcome is not possible for a specific set of held playing cards.

For example, for the first generated poker hand 122*a* of the two of spades, the three of spades, the four of spades, the five of spades and the six of spades, since holding all five cards results in a winning payout (i.e., a straight flush), the gaming system determines if following the auto-hold strategy of holding each of the cards and discarding none of the cards results in the same win as holding all five playing cards. In this example, as the auto-hold strategy results in the same win (i.e., a straight flush), the gaming system determines that when holding each of the playing cards, the only possible outcome for the examined poker hand is a straight flush outcome. After determining each of the possible outcomes for the first generated poker hand, the gaming system retains the seed associated with the first poker hand in the set or list of possible poker hands which are available for game play as described in more detail below.

In another example, for the third generated poker hand 122*c* of the queen of clubs, the queen of hearts, the two of diamonds, the three of spades and the eight of clubs, since holding all five cards results in a winning payout (i.e., a pair of queens), the gaming system determines if following the auto-hold strategy of holding the pair of queens and discarding the remaining three cards results in the same win. In this example, as the auto-hold strategy results in the same win (i.e., a pair of queens), the gaming system determines that when holding the pair of queens as recommended by the auto-hold strategy, as illustrated in FIG. 6, a pair of jacks or better, two pair, three-of-a-kind, a full house and four-of-a-kind are all possible outcomes for the third generated poker hand. Accordingly, the gaming system retains the seed associated with the third generated poker hand in the set or list of possible poker hands.

In another example, for the fourth generated poker hand 122*d* of the jack of clubs, the jack of hearts, the queen of hearts, the king of hearts and the two of clubs, since holding all five cards results in a winning payout (i.e., a pair of jacks), the gaming system determines if following the auto-hold strategy of holding the jack of hearts, the queen of hearts, the king of hearts and discarding the jack of clubs and the two of clubs results in the same win. In this example, as the auto-hold strategy does not result in the same win (i.e., a pair of jacks), the gaming system removes the seed associated with the fourth generated poker hand from the set or list of possible poker hands (i.e., the fourth generated poker hand is not included in the list of FIG. 6). In this example, because the gaming system's auto-hold strategy determined that discarding the jack of clubs and the two of clubs from a guaranteed winning poker hand of a pair of jacks and holding the jack of hearts, the queen of hearts and the king of hearts for a chance at a royal flush (i.e., with a better average expected payout than keeping the guaranteed winning poker hand of the pair of jacks), the gaming system removed the seed deterministic of this generated poker hand.

After either removing or retaining the seed deterministic of the examined poker hand from the list of possible poker hands, the gaming system determines if the currently examined poker hand is the last poker hand on the list of possible poker hands as indicated in diamond 216. If the currently examined poker hand is not the last poker hand on the list of possible poker hands, the gaming system examines the next poker hand from the list of possible poker hands as indicated in block 218 and then proceeds to block 204 as described above. If the currently examined poker hand is the last poker hand on the list of possible poker hands, the gaming system marks the list of possible poker hands (represented as associated poker hand seeds) as complete as indicated in block 220.

Generation of Distribution Table

In addition to determining the different poker game outcomes possible for each of the possible poker hands in the set or list of possible poker hands (i.e., each remaining poker hand seed), the gaming system determines and stores for each available payout amount (i.e., from zero to the maximum payout), the different configurations or distributions of poker game outcomes which would result in that payout amount. This determination is based on the payout amounts associated with each poker game outcome (as designated by an appropriate paytable) as well as by the number of poker hands simultaneously played.

Figure 7:
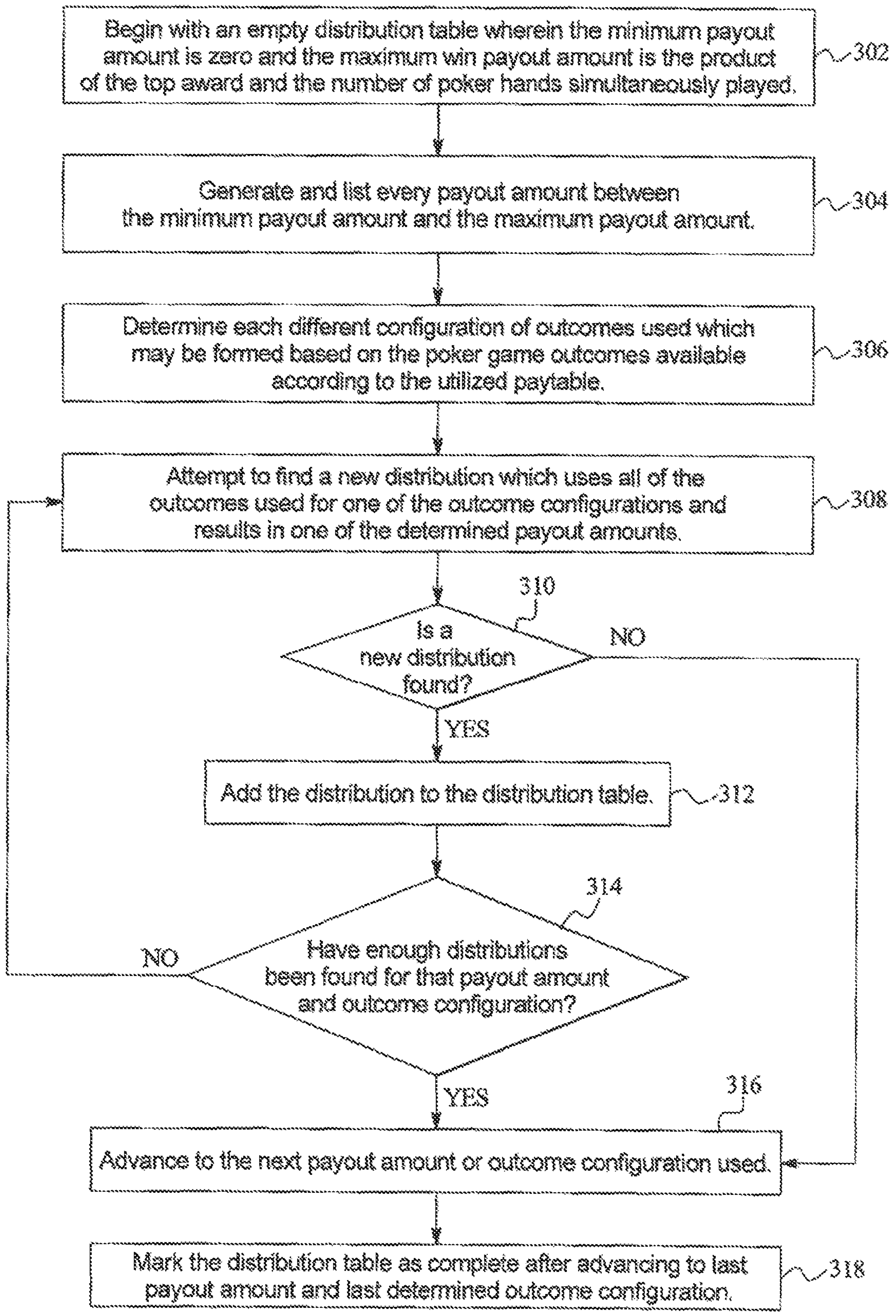
FIG. 7 is a flowchart of one embodiment disclosed herein illustrating the generation of a distribution table.

Referring to FIG. 7, in one embodiment, the gaming system begins with an empty distribution table wherein the minimum payout amount is zero and the maximum win or payout amount is the product of the top award and the number of poker hands simultaneously played as indicated in block 302. For example, as illustrated in the distribution table of FIG. 8, if the top award according to the paytable of FIG. 4 is two-hundred-fifty and the five poker hands are simultaneously played, the maximum win or payout amount is one-thousand-two-hundred-fifty.

After setting the minimum payout amount and the maximum win or payout amount, the gaming system generates and lists every win or payout amount between the minimum payout amount and the maximum payout amount as indicated in block 304 of FIG. 7. For example, as seen in FIG. 8, if the minimum payout amount is zero and the maximum win or payout amount is one-thousand-two-hundred-fifty, the gaming system lists every payout amount between the minimum payout amount and the maximum payout amount. It should be appreciated that for illustration purposes. FIG. 8 displays a sampling of the different payout amounts listed for this generated distribution.

After listing every possible payout amount, as indicated in block 304 of FIG. 7, the gaming system and method disclosed herein determines each different configuration of outcomes used which may be formed based on the poker game outcomes available according to the utilized paytable. In this embodiment, each different configuration of outcomes used represents the different poker game outcomes which are utilized over the plurality of simultaneously played poker hands played. This determination is based on the number of simultaneously played poker hands as well as the number of different poker game outcomes available to be provided to the player. For example, for a poker game with ten different outcomes possible (i.e., the ten different poker game outcomes listed in the paytable of FIG. 4) there are $2^{10}$ or 1024 different possible configurations of outcomes used which the gaming system determines.

The Outcomes Used columns of FIG. 8 displays a sampling of the different outcome configurations possible based on five simultaneously played poker hands which utilizes the outcome possible as listed in the paytable of FIG. 4. For example, one configuration of outcomes requires that only losing game outcomes (i.e., losing poker hands) are used over the plurality of simultaneously played poker hands played (i.e., each of the plurality of poker hands must be a losing poker hand). Another configuration of outcomes requires that losing game outcomes and poker game outcomes of jacks or better are the only outcomes which may be utilized over the plurality of simultaneously played poker hands played (i.e., each of the plurality of poker hands must be either a losing poker hand or a jacks or better poker hand). It should be appreciated that if a configuration of outcomes requires that a specific poker game outcome be utilized, then at least one of the simultaneously played poker hands must result in that specific poker game outcome.

After listing every possible payout amount and determining each of the different possible configurations of outcomes used, the gaming system determines, for each different configuration of outcomes used if it is possible, utilizing an appropriate paytable, to form a distribution of outcomes which pays one of the listed win or payout amounts. In this embodiment, the gaming system selects, one at a time, each determined outcome configuration and determines, for the selected outcome configuration, which possible payout amounts may result from different distributions of the outcomes used in the selected outcome distribution. In one embodiment, the gaming system attempts to find a new distribution which uses all of the outcomes used for the selected outcome configuration and results in one of the determined win amounts as indicated in block 308 of FIG. 7. If a new distribution is found, the gaming system adds the distribution to the distribution table as indicated in diamond 310 and block 312. The gaming system then determines if enough distributions have been found for that win amount and selected outcome configuration as indicated in diamond 314.

The determination of when enough distributions have been found is a balance between game play aesthetics and available storage space. That is, more distributions means more solutions to choose from for each situation (i.e., more variety of poker hand distributions to display to the player). However, more stored distributions equates to a larger distribution table and more memory or storage space necessary to hold the larger distribution table. Accordingly, for multi-hand poker games with lower numbers of simultaneously played poker hands (e.g., three played hands or five played hands), at least five distributions for each win amount and outcome configuration is considered enough distributions. For multi-hand poker games with larger or greater numbers of simultaneously played poker hands (e.g., ten played hands, fifty played hands or one-hundred played hands), at least one distribution for each win amount and outcome configuration is considered enough distributions. In these embodiments, if fewer than a target or designated number of distributions are found after a designated number of attempts (e.g., ten or fifteen attempts), the distribution table will include a lower number of distributions found, wherein the distribution table will include at least one distribution, if any are possible.

If not enough distributions have been found for that win amount and selected outcome configuration, the gaming system proceeds to block 308 as described above. If enough distributions have been found for that win amount and outcome configuration used (or no new distributions have been found after the designated number of attempts), the gaming system advances to the next, if any, win amount, or the next, if any, outcome configuration as indicated in block 316. After the last win amount for the last determined outcome configuration has been examined, the marks the distribution table as complete as indicated in block 318. In one embodiment, the determined distribution table is communicated to each of the gaming devices of the gaming system. As described below, since it is necessary for each gaming device to determine what distribution of wins or payouts to use once the player is dealt an initial hand and designated which playing cards to hold and discard, each gaming device must store the determined distribution table. In another embodiment, the determined distribution table is stored by the central controller. In one such embodiment, once the player is dealt an initial hand and the player has designated which playing cards to hold and discard, the central controller determines what distribution of wins or payouts to use and communicates such determined information to the appropriate gaming device.

For example, based on the paytable listed in FIG. 4 and as seen in FIG. 8, for a five play poker game, if the selected configuration of outcomes used requires that each outcome used is a losing outcome, then the gaming system determines that the only possible payout amount which may be formed utilizing the available losing outcomes is a payout amount of zero (i.e., a losing game outcome). In another example, if selected configuration of outcomes used requires that each outcome must be a losing game outcome or a jacks or better poker game outcome, then the gaming system determines that the possible payout amounts of one (i.e., one jacks or better poker hand and four losing poker hands), two (i.e., two jacks or better poker hands and three losing poker hands), three (i.e., three jacks or better poker hands and two losing poker hands), and four (i.e., four jacks or better poker hands and one losing poker hand) may each be formed utilizing the available losing game outcomes and jacks or better poker game outcomes.

As seen in the distribution table of FIG. 8, a plurality of the different win or payout amounts each have a number of different outcome configurations which may be used to result in that win amount. For example, eight different outcome configurations may each be utilized to result in a payout or win amount of seven. Moreover, one outcome configuration may be distributed a plurality of different ways and still result in the same payout or win amount. For example, as seen in FIG. 8, for the outcome configuration including jacks or better poker hands and two pair poker hands, four different distributions of this outcome configuration may be utilized and still result in the payout amount of five. It should be appreciated that as the above described poker game outcomes configuration determination is dependent on the specific paytable used as well as the number of hands simultaneously played, if the specific paytable used and/or the number of hands simultaneously played changes, the above described sequence must be again determined to account for any changes.

In an alternative embodiment, one or more entries in a first distribution table (configured for a first number of simultaneously played poker hands) may be used for a second distribution table (configured for a lower number of simultaneously played poker hands) if the same specific paytable is utilized for each distribution table. In this embodiment, for a first distribution table, the gaming system indexes each entry or solution by the associated win amount and the number of losing outcomes (i.e., outcomes with a payout of zero). The gaming system compares the first distribution to a second distribution table (with less simultaneously played poker hands than the first distribution table) to determine any entries or solution with losing outcomes in the first distribution table which may be carried over or utilized in the second distribution table. It should be appreciated that entries with losing outcomes may be carried over because one losing outcome may be associated with one poker hand which is no longer played when the number of simultaneously poker hands is reduced. For example, if a distribution table configured for ten simultaneously played poker hands includes an entry for a payout of $750 which includes three losing outcomes, then that same entry for a payout of $750 may be used in distribution tables configured for seven, eight or nine simultaneously played poker hands. In this example, one losing outcome may be associated with the one less poker hand which is played when the number of simultaneously played poker hands is reduced from ten to nine, two losing outcomes may be associated with the two less poker hands which are played when the number of simultaneously played poker hands is reduced from ten to eight and three losing outcomes may be associated with the three less poker hands which are played when the number of simultaneously played poker hands is reduced from ten to seven.

Assigning Seeds to Win Amounts

After determining the possible poker game outcome configurations or distributions for each available payout amount, the gaming system compares the previously stored poker game outcomes which are possible for each poker hand to the determined different distributions of poker game outcomes which would result in each payout amount to determine which poker hands (represented as poker hand seeds) are appropriate for each payout amount. This determination includes selecting each poker hand, one at a time, and comparing the poker game outcomes possible for the selected poker hand (based on the auto-hold strategy) to each of the different poker game outcome distributions which form each payout amount.

Figure 9:
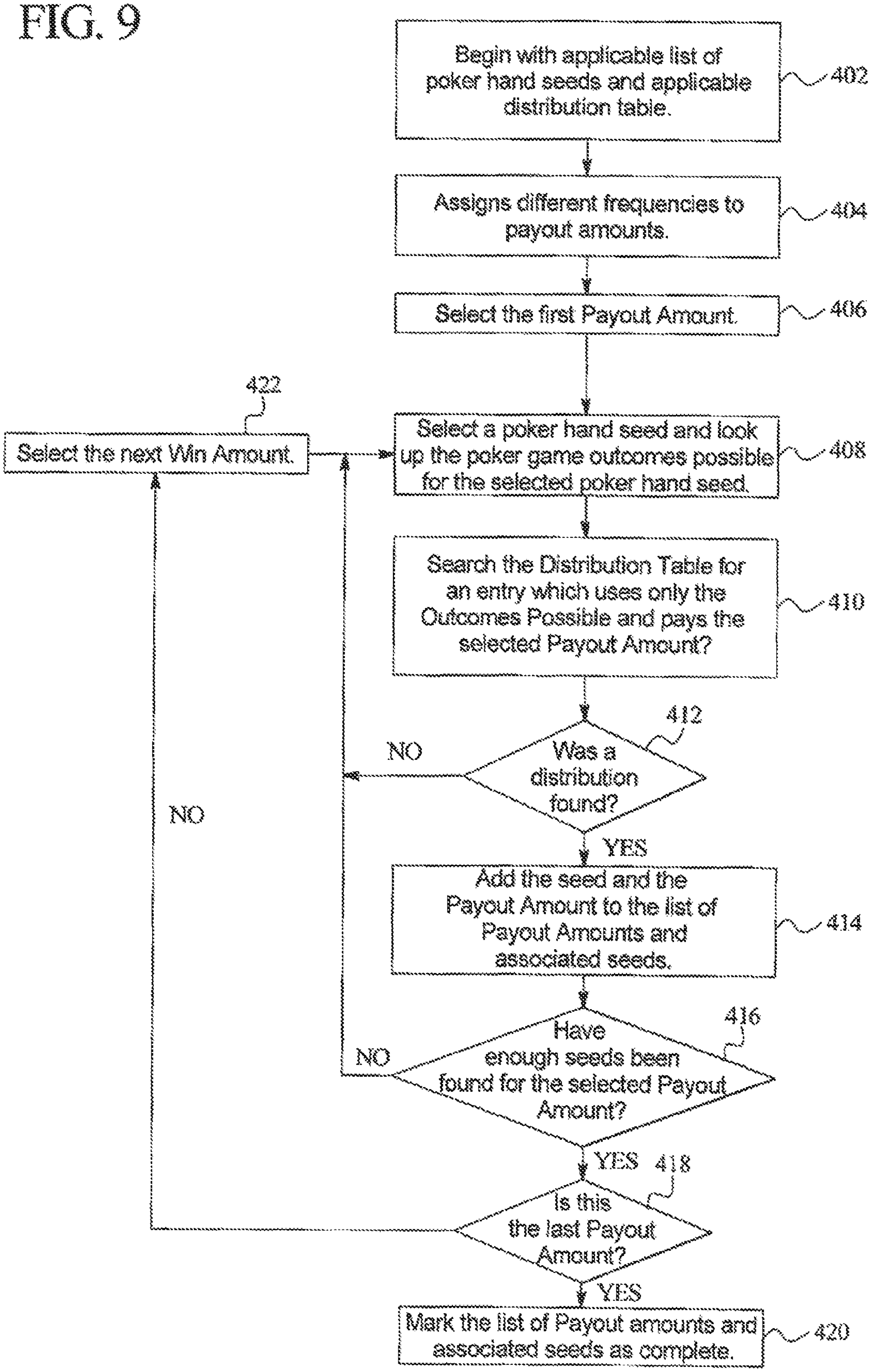
FIG. 9 is a flowchart of one embodiment disclosed herein illustrating assigning each of the seeds to one or more different payout amounts.

In one embodiment, as illustrated in FIG. 9, the gaming system begins with an applicable list of poker hand seeds (including the different poker game outcomes possible for each of the poker hands which each of the seeds is deterministic of) and an applicable distribution table as indicated in block 402. The gaming system assigns different frequencies or probabilities to the win amounts of each poker hand seed as indicated in block 404. In one embodiment, the gaming system determines and assigns the desired payouts and probabilities to mirror or otherwise reflect the natural probabilities of occurrence present in a probability-based gaming system.

After determining the frequencies of the different win or payout amounts, the gaming system selects the first payout or win amount as indicated in block 406. The gaming system selects a first of the poker hand seeds and looks up or otherwise examines the different poker game outcomes possible for the selected poker hand seed as indicated in block 408. As described above, each poker hand seed is deterministic of a poker hand and based on an appropriate auto-hold strategy, that determined poker hand is associated with one or more different poker hand outcomes possible. As indicated in block 410 and as described in more detail below, the gaming system searches the distribution table for an entry which uses only the outcomes possible for the selected poker hand seed and which pays the selected win or payout amount.

The gaming system determines if an appropriate distribution is found as indicated in diamond 412. That is, the gaming system determines if an entry exists on the distribution table which uses only the outcomes possible for the selected poker hand seed and which pays the selected win or payout amount. If a distribution is not found, the gaming system returns to block 408 and proceeds as described above.

If an appropriate distribution is found, the gaming system adds the poker hand seed and the selected win or payout amount to a list of payout or win amounts and associated seeds as indicated in block 414. The gaming system determines if a designated number of poker hand seeds have been found for the selected payout or win amount as indicated in diamond 416. If less than the designated number of poker hand seeds have been found for the selected payout or win amount, the gaming system returns to block 408 and proceeds as described above. In this embodiment, the determination of when enough poker hand seeds have been found (i.e., when the designated number of poker hand seeds have been found) is a balance between game play aesthetics and available storage space. That is, the memory or storage device stores a limited number of seeds (i.e., usually 64,000 or 100,000) and thus certain seeds will be eliminated if their associated outcomes are overrepresented and certain seeds will be added if their associated outcomes are underrepresented. Accordingly, if 20% of the outcomes are wins of two credits, then 20% of the seeds should be dedicated to two credit payouts. This gives the greatest game variety to the player while still ensuring that the gaming system includes the seeds for all the necessary payout amounts. In an alternative embodiment, when selecting seeds to associate with payout amounts, the gaming system is programmed to prefer to select seeds associated with winning poker hands.

If enough poker hand seeds have been found for the selected payout or win amount, the gaming system determines if the selected payout or win amount is the last payout or win amount as indicated in diamond 418. If the selected payout or win amount is the last payout or win amount, the list of payout or win amounts and associated poker hand seeds is complete as indicated in block 420. If the selected win amount is not the last win amount, the gaming system selects the next payout or win amount as indicated in block 422 and returns to block 408 and proceeds as described above.

Figure 10:
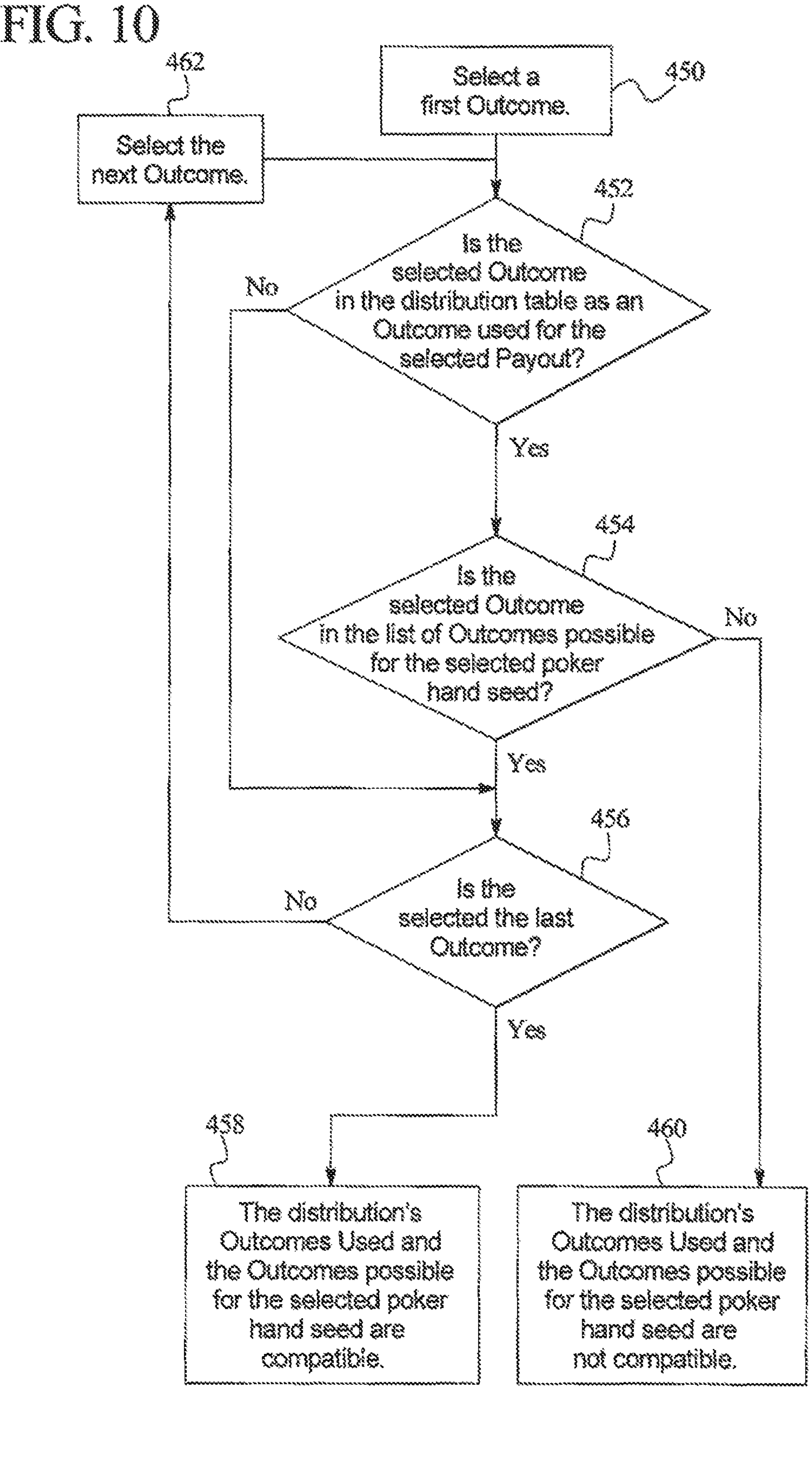
FIG. 10 is a flowchart of one embodiment disclosed herein illustrating searching the generated distribution table for an entry which uses one or more designated poker game outcomes and pays a designated payout amount.

FIG. 10 illustrates one embodiment by which the gaming system searches the distribution table for an entry which uses only the outcomes possible for the selected poker hand seed and which pays the selected win or payout amount. In this embodiment, the gaming system selects the first outcome and determines if the selected outcome is in the distribution table as an outcome used for the selected payout or win amount as indicated in block 450 and diamond 452. If the selected outcome is in the distribution's outcomes used list, the gaming system next determines if the selected outcome is in the list of outcomes possible for the selected poker hand seed as indicated in diamond 454.

If the selected outcome is not in the distribution's outcomes used list or the selected outcome is in the list of outcomes possible for the selected seed, the gaming system determines if the selected outcome is the last outcome as indicate in diamond 456. If the selected outcome is not the last outcome, the gaming system select the next outcome as indicated in block 462 and proceeds to diamond 452 as described above. If the selected outcome is the last outcome, the distribution's outcomes used and the outcomes possible for the selected poker hand seed are compatible as indicated in block 458. Thus, an appropriate entry on the distribution table which uses only the outcomes possible for the selected poker hand seed and which pays the selected win or payout amount is found. In one embodiment, the found entry is stored for the distribution table.

If the selected outcome is not in the list of outcomes possible for the selected poker hand seed, the distribution's outcomes used and the outcomes possible for the selected poker hand seed are not compatible and thus an appropriate entry on the distribution table which uses only the outcomes possible for the selected poker hand seed and which pays the selected win or payout amount is not found as indicated in block 460.

For example, after previously determining that only the combination of five straight-flush poker game outcomes (paying two-hundred credits each) would result in a total payout amount of one-thousand and that the poker hand seed deterministic of the second generated poker hand of the two of spades, the three of spades, the four of spades, the five of spades and the six of spades (when held in accordance with the auto-hold strategy) may only yield a straight-flush poker game outcome, the gaming system determines that the poker hand seed deterministic of the second generated poker hand is only suitable for a win or payout amount of one-thousand. Accordingly, the gaming system associates the poker hand seed which is deterministic of the second generated poker hand with the payout amount of one-thousand.

In another example, the gaming system determines that the generated poker hand of the queen of clubs, the queen of hearts, the two of diamonds, the three of spades and the eight of clubs could yield, based on the auto-hold strategy recommendation to hold the queen of clubs and the queen of hearts, any of a plurality of possible poker game outcomes including a pair of jacks or better, two-pair, three-of-a-kind, a full house or four-of-a-kind. In this example, any of these possible poker game outcomes may be selected to result in win or payout amounts of five, seven, nine, eleven, thirty-five and eighty-seven (in addition to other payout amounts not illustrated).

As described above, these determinations yield a table or database, as illustrated in FIG. 11, which includes each possible poker hand from the list or set of possible poker hands (represented as poker hand seeds) and each of the different payout amounts which, according to an auto-hold strategy, are possible based on that poker hand. As illustrated in FIG. 11, one or more poker game seeds may be associated with a plurality of different win or payout amounts. For example, as described above, the poker game seed which is deterministic of the poker hand of the queen of clubs, the queen of hearts, the two of diamonds, the three of spades and the eight of clubs is associated with a plurality of different win or payout amounts. In one embodiment, the entries in the table or database may be adjusted for each win or payout amount (i.e., duplicating certain entries and/or eliminating certain entries) to produce the desired frequencies of occurrence for each win or payout amount.

In one embodiment, each gaming device in the gaming system stores this generated table and when an individual gaming device is provided a predetermining game outcome, such gaming device utilizes this table or database to select the cards which will initially be dealt or displayed to a player. In one embodiment, the central controller of the gaming system stores this generated table and communicates or downloads different entries or portions of the table to one or more gaming devices as necessary. In another embodiment, the entire table of all possible initial hands and all possible pay amounts for that initial hand is not stored. In this embodiment, only a selected sample of these initial hands is stored. For example, for a two credit payout, the gaming system may determine that over a million different initial poker hands exist which each lead to a two credit payout being possible in a five-play poker game. In this example, rather than storing each of the over one-million different initial poker hands, the gaming system may store around one-hundred of these different initial poker hands.

Game Play

After determining which poker hand seeds may be utilized for which win or payout amounts, the gaming system is adapted for game play of a multi-hand poker game. In one embodiment, a player selects a number of simultaneous poker hands to play (i.e., from one poker hand to a designated number, such as one-hundred poker hands) and an amount to wager on each simultaneously played hand. In this embodiment, upon a player making such a wager, a predetermined game outcome is selected. The selected predetermined game outcome represents the outcome which will ultimately be provided to the player. It should be appreciated that the payout or value associated with the selected predetermined game outcome must be provided to the player over the selected number of simultaneously played poker hands while taking into account the amount wagered on (and thus the applicable paytable) each of the simultaneously played poker hands.

Each predetermined game outcome includes an outcome component, such as a win, a lose, a secondary game triggering or other suitable outcome, with an associated predetermined payout amount. In one embodiment, each predetermined game outcome also includes or is otherwise associated with a poker hand seed. As described above, each poker hand seed is deterministic of the playing cards which will be initially dealt or displayed to the player for that game outcome. It should be appreciated that the payout amount a poker hand seed is associated with corresponds with or is otherwise based on the predetermined payout amount associated with the predetermined game outcome. For example, a win game outcome associated with a payout of $1,250 may correspond to a multi-hand poker game wherein, according to an appropriate paytable, five simultaneously played poker hands are each associated with a payout of $250.

In one embodiment, the predetermined game outcome is selected by the central server, central controller or remote host 12 and provided to the player at the gaming device 14. In this embodiment, each of a plurality of such gaming devices are in communication with the central server or controller. Upon a player initiating game play at one of the gaming devices, the initiated gaming device communicates a game outcome request to the central server or controller. Upon receiving the game outcome request, the central controller independently selects a game outcome (or game outcome seed deterministic of a game outcome) from a set or pool of game outcomes (or game outcome seeds) and flags or marks the selected game outcome (or game outcome seed) as used. Once a game outcome (or game outcome seed) is flagged as used, it is prevented from further selection from the set or pool and cannot be selected by the central controller upon another wager. The selected game outcome (or game outcome seed) is communicated to the individual gaming device to be utilized in the poker game. In another embodiment, the gaming device selects one of the predetermined outcomes (or game outcome seeds) stored in a memory device of the gaming device. In another embodiment, the gaming device generates a predetermined game outcome and sends the generated predetermined game outcome to a central controller for verification. If the central controller does not verify that the generated predetermined game may be used, the gaming device generates another predetermined game outcome for verification.

In one embodiment, the central controller maintains at least one predetermined set or pool of predetermined game outcomes or game outcome seeds for each type of game provided on the gaming terminals. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming terminals. In another embodiment, the central controller maintains at least one predetermined set or pool of predetermined game outcome seeds. Each game outcome seed is deterministic of a predetermined game outcome. Other methods for storing the pool or set of predetermined game outcomes may be employed.

In one embodiment, each set or pool of predetermined game outcomes may include a plurality of each type of predetermined game outcome. For example, a pool of one thousand game outcomes may include hundreds of a lower range payout (i.e., a win $1 game outcome) and one or few of the highest payout (i.e., a win $1250 game outcome). In one embodiment, a plurality of the game outcomes in the predetermined set or pool are different. In another embodiment, all of the game outcomes in the set or pool are different.

In an alternative embodiment, the predetermined game outcome includes an outcome component but not an associated poker hand seed. In this embodiment, after selecting a predetermined game outcome, the gaming device selects one of the poker hand seeds (i.e., possible poker hands) which is associated with the payout amount of the predetermined game outcome. In this embodiment, the gaming device accesses the table or database of which poker hand seeds (i.e. possible poker hand) can yield which payout amounts to select one of the poker hand seeds which is associated with the payout amount of the selected predetermined game outcome. It should be appreciated that if a plurality of poker hand seeds each yield payout amounts equal to the payout amount of the selected predetermined game outcome, the gaming device can randomly or otherwise select one of the poker hand seeds.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the interactive game.

In these embodiments, as each gaming device is enrolled in a bingo (or keno or lottery) game, such as upon an appropriate wager or engaging an input device, the enrolled gaming device is provided a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, the wagered on gaming device enrolls in a bingo game. In this embodiment, a bingo server calls the bingo balls that result in a specific outcome and a specific pay amount for the gaming machine. The gaming device contains a list of seeds and win amounts, very similar to the pool of predetermined game outcomes described above. Given the Bingo game's pay amount, the gaming device finds a seed which is associated with the pay amount. It should be appreciated that any suitable manner of selecting or generating a predetermined game outcome may be implemented with the gaming system disclosed herein.

As described above, one or more poker hand seeds may be associated with more than one possible pay amounts. Accordingly, in one embodiment, each predetermined game outcome is previously associated with a pay amount and an appropriate poker hand seed. In this embodiment, the selected or determined predetermined game outcome will be associated with an appropriate poker hand seed. It should be appreciated that in this embodiment, one poker hand seed may be included in the set or pool of game outcomes multiple times to compensate for the different possible pay amounts associated with that seed. In another embodiment, the central controller selects a predetermined pay amount and then select one of the poker hand seeds which is associated with the selected predetermined pay amount.

Figure 12:
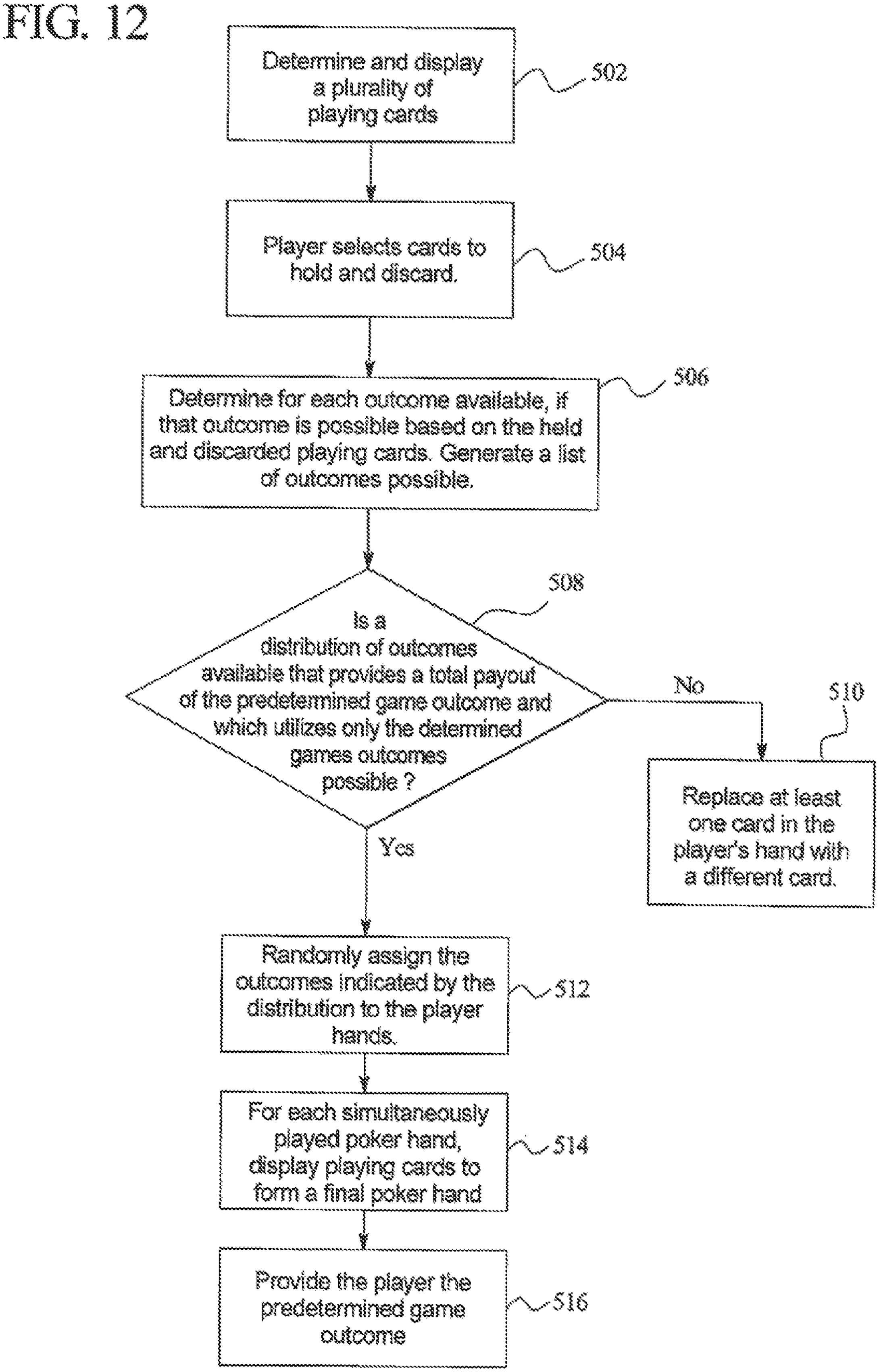
FIG. 12 is a flowchart of one embodiment disclosed herein illustrating a play of the multi-hand poker game wherein the gaming device determines, based on the predetermined payout amount, a distribution of poker game outcomes (and associated payout amounts) for each of the simultaneously played poker hands to result in a total payout equal to the predetermined payout amount.

Referring to FIG. 12, in one embodiment, after selecting, determining or receiving the predetermined game outcome (i.e., along with an associated poker game seed), the gaming device determines and displays a plurality of playing cards as indicated in block 502, wherein the displayed playing cards are based on the poker game seed of the predetermined game outcome. In this embodiment, the gaming device applies the selected poker game seed through one or more selected deterministic random number generating algorithms to determine and display the plurality of playing cards determined by or otherwise associated with the selected poker game seed.

In one embodiment, the plurality of provided playing cards form an initial primary poker hand. In addition to the initial primary poker hand, the gaming device simultaneously displays at least one and preferably a plurality of poker hands. In one embodiment, the simultaneously displayed poker hands each include the same playing cards as the initial primary poker hand. In another embodiment, the simultaneously displayed poker hands do not initially include any playing cards. In this embodiment, the gaming device enables the player to simultaneously play a plurality of poker hands wherein the held cards from the primary poker hand are held or carried over into each of the other simultaneously played poker hands as described below.

Figure 13A:
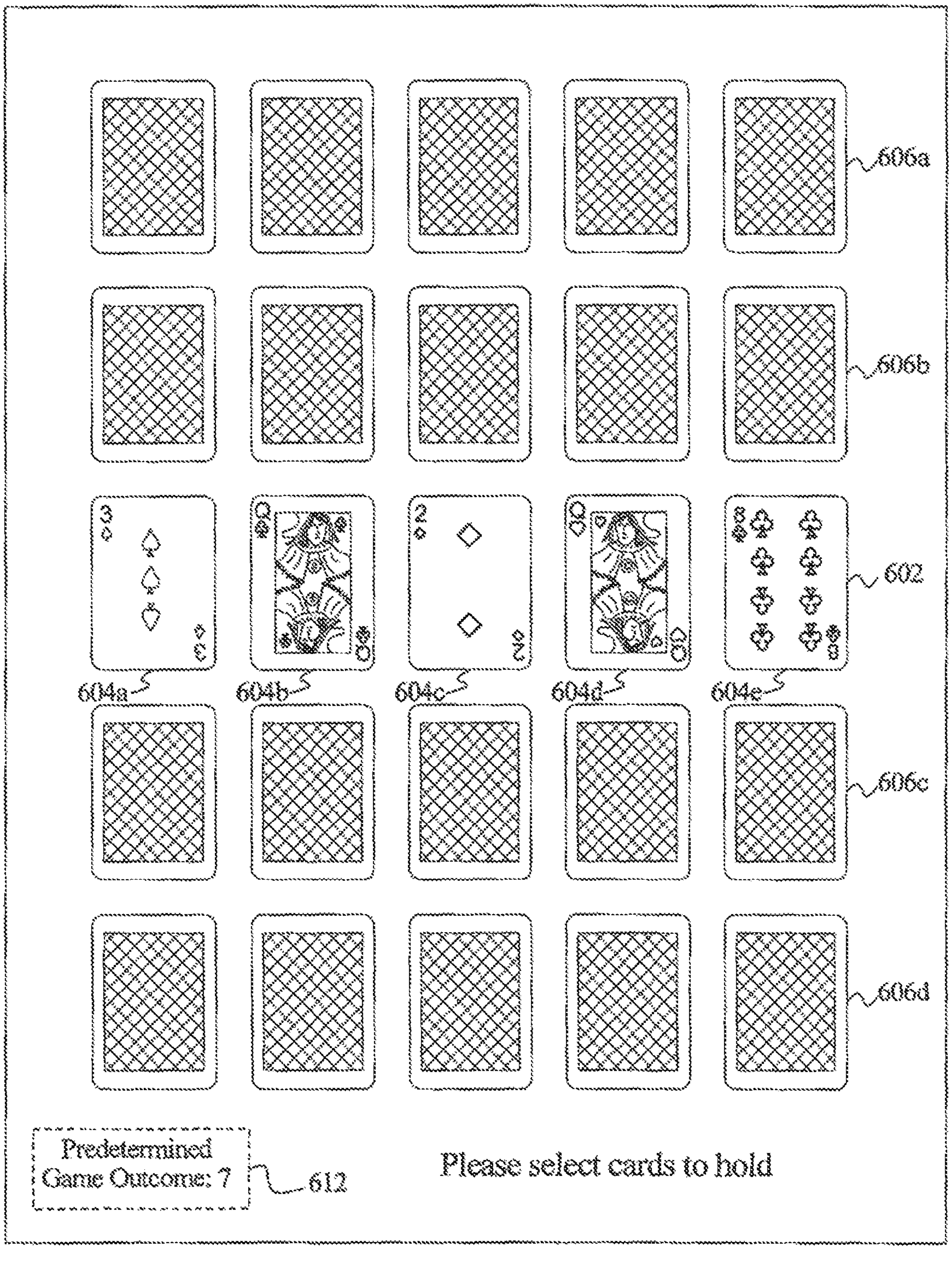
FIGS. 13A, 13B, 13C and 13D are top plan views of one embodiment disclosed herein illustrating one multi-hand poker game sequence wherein the gaming device utilizes a distribution of poker game outcomes (and associated payout amounts) for each of the simultaneously played poker hands to result in a total payout equal to the predetermined payout amount.

For example, if the selected predetermined game outcome includes a payout amount of seven and is associated with seed number 2097814389 from FIG. 11, the gaming device applies the selected poker game seed through one or more selected deterministic random number generating algorithms to determine the plurality of playing cards initially dealt or displayed to the player. As seen in FIG. 13A, the gaming device displays the determined plurality of playing cards, in this case the three of spades 604*a*, the queen of clubs 604*b*, the two of diamonds 604*c*, the queen of hearts 604*d*, and the eight of clubs 604*e* to the player as an initial poker hand 602. In this example, in addition to the initial displayed poker hand, the gaming device simultaneously displays four additional poker hands, 606*a*, 606*b*, 606*c* and 606*d* wherein each of the simultaneously displayed poker hands do not initially display any playing cards. It should be appreciated that the selected predetermined game outcome 612 is displayed for illustration purposes and would not be displayed to the player. It should be further appreciated that the simultaneously played poker hands may be displayed above the initial primary poker hand, below the initial primary poker hand, to the left of the initial primary poker hand or to the right of the initial primary poker hand or any combination thereof.

In one embodiment, the playing cards are dealt from a single fifty-two playing card deck. In another embodiment, the playing cards are dealt from a plurality of fifty-two playing card decks. In another embodiment, the playing cards are selected from a predetermined set of playing cards. In another embodiment, the playing cards are selected from a deck of more than fifty-two playing cards, such as a deck including one or more "joker" or wild playing cards. In this embodiment, as a joker or wild playing card may substitute for any other playing card or a limited number of playing cards, the number of playing cards which need to be determined using is reduced for each provided joker playing card.

In one embodiment, the number of playing cards in each initial poker hand and each second or final poker hand (i.e., the poker hands after the draw) is the same. In another embodiment, the number of playing cards in each of the initial poker hands and in each of the second poker hands are different. In one embodiment, the second or final poker hands have fewer playing cards than the initial poker hands. In another embodiment, the second or final poker hands have more playing cards than the initial poker hands. For example, each initial poker hand may include four playing cards and each of the second poker hands may include five playing cards. In this embodiment, the player is enabled to hold or discard zero to four of the initially dealt playing cards and the gaming device replaces/draws the number of playing cards that the player requested plus one additional playing card. This additional playing card provides that the player's second poker hand is provided an outcome based on the player's five-card second poker hand.

In another embodiment, the set of playing cards to draw from is the same initial set of playing cards from which the initial poker hand was selected from. In another embodiment, the set of playing cards to draw from is the initial set of playing cards with the previously dealt playing cards removed. For example, if the poker game is played with a fifty-two playing card deck, then the set of playing cards to draw from is the forty-seven playing cards remaining after the five initial playing cards are provided to the player. In another embodiment, the set of playing cards is a randomly chosen subset of playing cards. In another embodiment, the set of playing cards to draw from may be merged with other sets of playing cards, such as the playing cards the player designated to hold, the playing cards the player designated to discard, a randomly selected subset of playing cards or any other suitable set of playing cards.

Figure 13B:
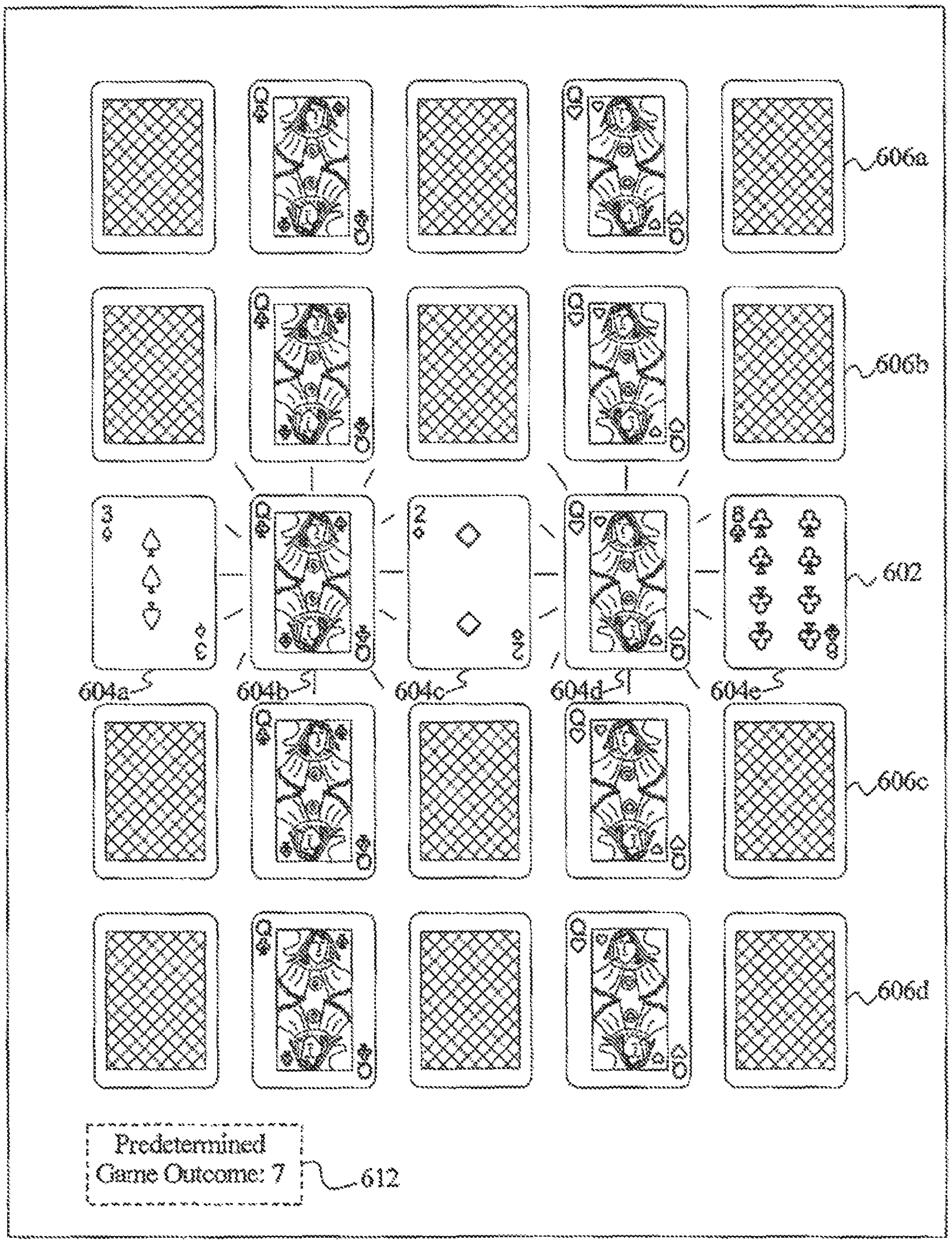

After the player is provided an initial poker hand, the player is enabled, using one or more input devices, to select one or more of the initially dealt playing cards in the primary poker hand to hold or to discard as indicted in block 504 of FIG. 12. As described above, the held playing cards in the primary hand are also held in one, more or each of the other simultaneously displayed hands of playing cards. It should be appreciated that even though zero, one or more playing cards may be carried over from one or more simultaneously played poker hands, each simultaneously played poker hand is played apparently independent of the remaining simultaneously played poker hands. For example, as seen in FIG. 13B, the player selects to hold the queen of clubs 604*b* and the queen of hearts 604*d* and thus the two held cards are replicated, carried over or otherwise displayed in each of the other simultaneously displayed poker hands. Appropriate messages such as "PLEASE SELECT CARDS TO HOLD" may be provided to the player visually, or through suitable audio or audiovisual displays.

The gaming device evaluates the set of playing cards selected by the player to hold and discard and determines which poker game outcomes are possible based on the held playing cards and the remaining playing cards in the deck. In one embodiment, as indicated in block 506 of FIG. 12, the gaming device determines for each outcome available (according to an appropriate paytable) if that outcome is possible based on the held playing cards, the discarded playing cards and the remaining playing cards in the deck. The gaming device generates a list of each of the determined outcomes possible.

For example, based on the player selecting to hold the queen of clubs and the queen of hearts and discarding the three of spades, the two of diamonds and the eight of clubs, the gaming device determines that, as seen in FIG. 6, a jacks or better poker game outcome, a two pair poker game outcome, a three-of-a-kind poker game outcome, a full house poker game outcome and a four-of-a-kind poker game outcome are all possible based on the two playing cards the player selected to hold and the three playing cards the player selected to discard.

After determining which poker game outcomes are available based on the held playing cards and the remaining playing cards in the deck, the gaming device utilizes the stored table of different distributions of poker game outcomes which would result in each payout amount and the previous determination regarding which poker game outcomes are possible based on the player's held playing cards to determine if a distribution of outcomes is available that provides a total payout equal to the payout of the predetermined game outcome and which also utilizes only the determined game outcomes possible as indicated in diamond 508 of FIG. 12. The selected distribution designates the outcomes and payouts which each of the played hands of poker must result in to provide a total payout equal to the payout of the predetermined game outcome. It should be appreciated that although the gaming device determines if one distribution of outcomes that provides a total payout equal to the payout of the predetermined game outcome and which also utilizes only the determined game outcomes possible is compatible, a plurality of distributions of outcomes may be compatible that provide a total payout equal to the payout of the predetermined game outcome and which also utilizes only the determined game outcomes possible for the held playing cards. In one embodiment, the gaming device may randomly choose one of a plurality of compatible distributions of outcomes. In another embodiment, the gaming device assigns a weight to each entry in the distribution table and the gaming device will choose one of the entries, using the entries' weights.

For example, the gaming device compares the determined poker game outcomes possible for the player's initial poker hand (i.e., the jacks or better poker game outcome, the two pair poker game outcome, the three-of-a-kind poker game outcome, the full house poker game outcome and the four-of-a-kind poker game outcome determined based on the player's held and discarded playing cards) with the different outcome configurations possible for the selected predetermined payout amount of seven to determine a distribution of outcomes that provides a total payout equal of seven and which also utilizes only the outcomes selected from the list of determined game outcomes possible based on the two playing cards the player selected to hold and the three playing cards the player selected to discard.

If the gaming device is unable to determine a compatible distribution utilizing the stored table of different distributions of poker game outcomes which would result in each payout amount and the poker game outcomes possible based on the player's held playing cards, the gaming device replaces one or more of the player's held playing cards with different playing cards as indicated in block 510 of FIG. 12. In different embodiments, the replaced playing cards are better playing cards, worse playing cards, predetermined, randomly determined, determined based on the player's wager, determined based on the player's status (e.g., determined through a player tracking system), or determined based on any other suitable method. After replacing one or more of the player's held playing cards with one or more different playing cards, the gaming device returns to block 506 and repeats the process described above.

If the gaming device is able to determine a compatible distribution utilizing the stored table of different distributions of poker game outcomes which would result in each payout amount and the poker game outcomes possible based on the player's held playing cards, the gaming device randomly assigns the outcomes indicated by the compatible distribution to the plurality of simultaneously played poker hands as indicated in block 512 of FIG. 12. It should be appreciated that because the outcome configuration table and the association of the seeds with different payout amounts are each based on the auto-hold strategy, if the player follows the auto-hold strategy with the initially dealt or displayed playing cards, the distribution table will contain (i.e., be compatible with) a distribution which awards the player the selected predetermined game outcome. Moreover, the generation of the distribution table guarantees that even if the player doesn't follow the auto-hold strategy with the initially dealt or displayed playing cards, if a compatible distribution solution is possible, it will be found and utilized by the gaming device.

In the example described above, as seen in FIG. 8, the gaming device determines that a plurality of distributions exist which are each associated with a payout of seven and only utilize the outcomes selected from the list of a jacks or better poker game outcome, a two pair poker game outcome, a three-of-a-kind poker game outcome, a full house poker game outcome and a four-of-a-kind poker game outcome. Specifically, the gaming device determines that three different outcome configurations are compatible and one of these three outcome configurations includes three different distribution configurations. Accordingly, the gaming device selects the compatible distribution which includes three jacks or better poker game outcomes, one two-pair poker game outcome and one three-of-a-kind poker game outcome. This selected distribution requires that the gaming device must determine the cards provided after the draw such that three of the simultaneously played poker hands must each yield jacks or better poker game outcomes, one of the simultaneously played poker hands must yield a two-pair poker game outcome and one of the simultaneously played poker hands must yield a three-of-a-kind poker game outcome.

Figure 13C:
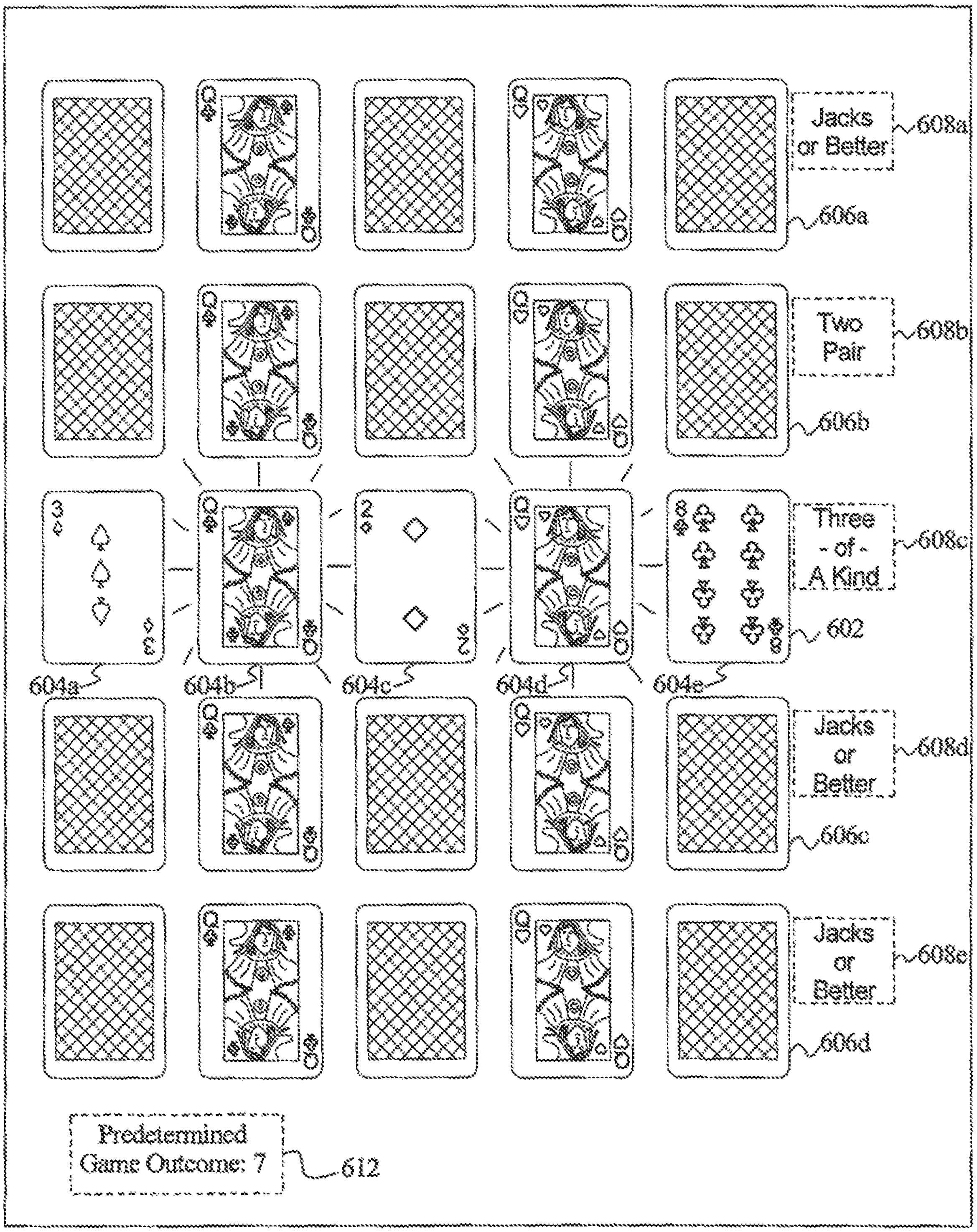

Accordingly, as illustrated in FIG. 13C, the gaming device randomly assigns the outcomes indicated by the compatible distribution to the plurality of simultaneously played poker hands. In this example, the gaming device assigned a jacks or better poker game outcome to poker hands 606*a*, 606*c* and 606*d*. The gaming device also assigned a two-pair poker game outcome to poker hand 606*b* and a three-of-a-kind poker game outcome to poker hand 602. It should be appreciated that the assigned poker game outcomes are displayed for illustration purposes and would not be displayed to the player. It should be further appreciated that any suitable manner of assigning poker game outcomes may be implemented in accordance with the present disclosure.

In another example (not shown), if the player selects to discard the two queens and hold the two of diamonds, the three of spades and the eight of clubs, then the gaming device would determine that, based on the held cards, the discarded cards and the remaining cards in the deck, that a losing poker game outcome is possible, a jacks or better poker game outcome is possible, a two-pair poker game outcome is possible and a three-of-a-kind poker game outcome is possible. Based on these possible poker game outcomes and the generated distribution table, the gaming device determines that these possible poker game outcomes may be provided to the player as two losing poker game outcomes (each associated with a payout of zero), one jacks or better poker game outcomes (associated with a payout of one) and two three-of-a-kind poker game outcome (each associated with a payout of three) to result in the predetermined payout amount of seven.

For each of the simultaneously played poker hands, the gaming device draws or displays one or more playing cards to form a final poker hand as indicated in block 514 of FIG. 12.

In this embodiment, the final poker hand displayed for each simultaneously played poker hand is associated with the same outcome as the outcome previously assigned to such poker hand. In different embodiments, which playing cards to display to the player to form the final poker hand may be determined as described in co-pending U.S. patent application Ser. No. 10/945,642 which is incorporated herein by reference, in U.S. Pat. No. 6,729,961 B1 which is incorporated herein by reference or in any other suitable manner.

It should be appreciated that when determining a compatible distribution for the plurality of simultaneously played poker hands, the gaming device accounts for the amount wagered on each simultaneously played poker hand. For example, if a player is simultaneously playing five poker hands and the player wagered one credit on four of the poker hands and two credits on one of the poker hands, then the poker hand with two credits wagered may provide an award of two credits for a pair of jacks or better while the poker hand with one credit wagered may provide an award of one credit for a pair of jacks or better.

As seen in FIG. 130, for one of the poker hands 606*a*, the gaming device deals the player the four of diamonds playing card, the jack of spades playing card and the seven of hearts playing card to form a final poker hand. This final poker hand correlates to a jacks or better poker game outcome. As described above, the gaming device determines and deals these playing cards for this poker hand to insure that this final poker hand correlates to the poker game outcome assigned to this poker hand. According to the paytable of FIG. 4, this final poker hand is associated with an award of one (as indicated in the partial award display 610*a* associated with this poker hand) which is provided to the player.

For another one of the poker hands 606*b*, the gaming device deals the player the seven of hearts playing card, the seven of clubs playing card and the five of diamonds playing card to form a final poker hand. This final poker hand correlates to a two-pair poker game outcome. The gaming device determines and deals these playing cards to insure that this final poker hand correlates to the poker game outcome assigned to this poker hand. According to the paytable of FIG. 4, this final poker hand is associated with an award of one (as indicated in the partial award display 610*b* associated with this poker hand) which is provided to the player. It should be appreciated that, as described above, the playing cards dealt to each of the simultaneously played poker hands is independent and from a separate deck of playing cards as the remaining simultaneously played poker hands and thus the two seven of hearts playing cards may be dealt in two different poker hands 606*a* and 606*b*.

For another one of the poker hands 602, the gaming device deals the player the ten of spades playing card, the three of clubs playing card and the queen of spades playing card to form a final poker hand. This final poker hand correlates to a three-of-a-kind poker game outcome (which was previously assigned to this poker hand). According to the paytable of FIG. 4, this final poker hand is associated with an award of one (as indicated in the partial award display 610*c* associated with this poker hand) which is provided to the player.

For another one of the poker hands 606*c*, the gaming device deals the player the nine of hearts playing card, the king of hearts playing card and the ace of diamonds playing to form a final poker hand. This final poker hand correlates to a jacks or better poker game outcome (which was previously assigned to this poker hand). According to the paytable of FIG. 4, this final poker hand is associated with an award of one (as indicated in the partial award display 610*d* associated with this poker hand) which is provided to the player.

For the last of the poker hands 606*d*, the gaming device deals the player the ten of diamonds playing card, the six of spades playing card and the four of clubs playing to form a final poker hand. This final poker hand correlates to a jacks or better poker game outcome. The gaming device determines and deals these playing cards in order to ensure that this final poker hand correlates to the poker game outcome assigned to this poker hand. According to the paytable of FIG. 4, this final poker hand is associated with an award of one (as indicated in the partial award display 610*e* associated with this poker hand) which is provided to the player.

Figure 13D:
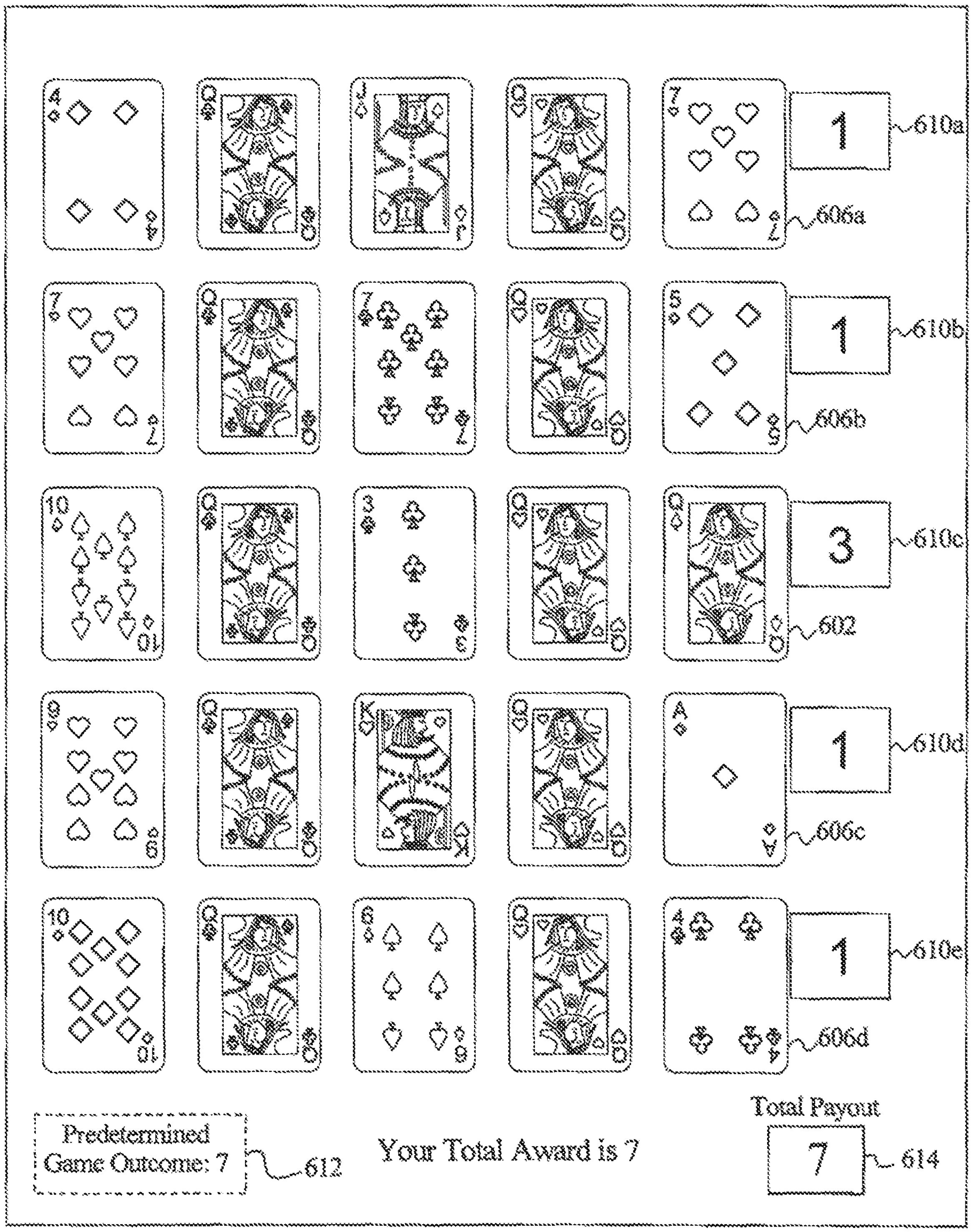

After displaying a final poker hand for each of the simultaneously played poker hands (wherein each formed final poker hand is associated with the same outcome as the outcome previously assigned to such poker hand), the gaming device provides the player the predetermined game outcome as indicated in block 516 of FIG. 12. It should be appreciated that as each of the simultaneously played hands provided the player has a payout equal to a portion of the payout associated with the selected predetermined game outcome, the total payout provided to the player equals the payout associated with the selected predetermined game outcome. For example, as illustrated in FIG. 13D, the sum of the payouts associated with each of the simultaneously played poker hands (as indicated in the total award display 614) equals the payout amount associated with the selected predetermined game outcome. Appropriate messages such as "YOUR TOTAL AWARD IS 7" may be provided to the player visually, or through suitable audio or audiovisual displays.

It should be appreciated that in the embodiment described above, the poker hands provided after the first draw are the final poker hands for the poker game. In another embodiment, at least one additional draw will occur and the poker hands after the first draw are not final poker hands but rather are intermediate poker hands.

Moreover, while the disclosed gaming device has been illustrated as a five card draw poker game, it should be appreciated that any type of poker game with any number of simultaneously played poker hands may be employed. As long as one or more predetermined game outcomes are provided to the player, the disclosed gaming system/gaming device may be employed with other suitable types of poker games, such as Texas Hold'em, as well as other suitable multi-play non-poker cards games, such as blackjack. Moreover, the disclosed gaming system/gaming device may be employed with other suitable multi-play non-card games which include a plurality of symbols which form a plurality of symbol combinations, such as a slot or reel game.

Alternative Embodiments

In an alternative embodiment, rather than discarding any poker hand seed which the auto-hold strategy recommends to alter from a winning poker hand to a losing poker hand, the gaming system analyzes each of the poker hand seeds in an attempt to retain one or more of the poker hand seeds which the auto-hold strategy recommended to discard.

Figure 14:
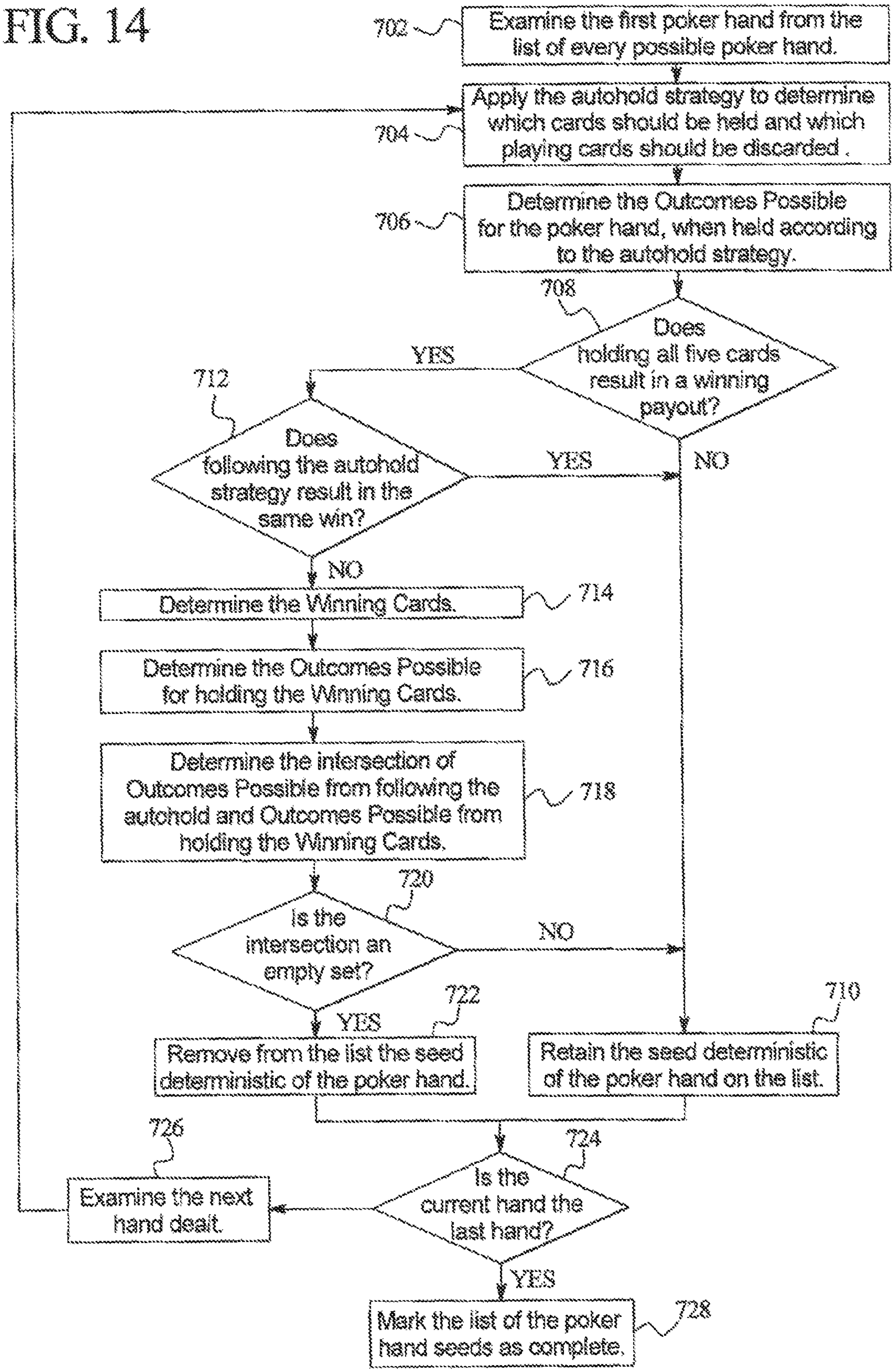
FIG. 14 is a flowchart of one alternative embodiment disclosed herein illustrating a modification of the list of available poker hand seeds.

In this embodiment, as illustrated in FIG. 14, the gaming system examines the first poker hand from the list of every possible poker hand as indicated in block 702. The gaming system then applies the auto-hold strategy to determine which playing cards should be held and which playing cards should be discarded as indicated in block 704. As described above, the gaming system's auto-hold strategy takes an appropriate paytable (as seen in FIG. 4) and the maximum long term average expected payout into account when determining which playing cards should be held and which playing cards should be discarded for each of the possible poker hands.

After determining which playing cards to hold for the examined poker hand, the gaming system determines the outcomes possible for the poker hand when the hand is held according to the auto-hold strategy as indicated in block 706. The gaming device then determines if holding all five playing cards results in a winning payout as indicated in diamond 708.

If holding all five playing cards results in a winning payout, the gaming system determines if following the auto-hold strategy results in the same win (i.e., the auto-hold strategy is to hold all five playing cards) as indicated in diamond 710. If holding all five playing cards does not result in a winning payout or if holding all five playing cards results in a winning payout but following the auto-hold strategy does not result in the same win, the gaming system retains the seed deterministic of the examined poker hand on the list of possible poker hands as indicated in block 712.

If holding all five playing cards does not result in the same win, the gaming system determines the winning playing cards as indicated in block 714. In this embodiment, the winning playing cards are those playing cards which must be held to produce the same win as holding all the playing cards. As described above, the gaming system determines the poker game outcomes possible for holding the winning playing cards and determines the intersection of the poker game outcomes possible from following the auto-hold strategy and the poker game outcomes possible from holding the winning playing cards as indicated in block 716 and 718.

Following determining any intersection between the poker game outcomes possible from following the auto-hold strategy and the poker game outcomes possible from holding the winning playing cards, the gaming system determines if the determined intersection is an empty set as indicated in diamond 720. If the intersection is an empty set, the gaming system removes the seed deterministic of the examined poker hand from the list of possible poker hands as indicated in block 722. If the intersection is not an empty set (i.e., one or more poker game outcomes are possible from following the auto-hold strategy and also from only holding the winning playing cards), the gaming system retains the seed deterministic of the examined poker hand on the list of possible poker hands as indicated in block 712.

After either removing or retaining the seed deterministic of the examined poker hand from the list of possible poker hands, the gaming system determines if the currently examined poker hand is the last poker hand on the list of possible poker hands as indicated in diamond 724. If the currently examined poker hand is not the last poker hand on the list of possible poker hands, as indicated in block 726, the gaming system examines the next poker hand from the list of possible poker hands and then proceeds to block 704 as described above. If the currently examined poker hand is the last poker hand on the list of possible poker hands, the gaming system marks the list of possible poker hands as complete as indicated in block 728.

For example, for the generated poker hand of the jack of clubs, the jack of hearts, the queen of hearts, the king of hearts and the two of clubs, since holding all five cards results in a winning payout (i.e., a pair of jacks), the gaming system determines if following the auto-hold strategy of holding the jack of hearts, the queen of hearts, the king of hearts and discarding the jack of clubs and the two of clubs results in the same win. In this example, as the auto-hold strategy does not result in the same win (i.e., a pair of jacks), the gaming system determines that the two jacks are the winning playing cards and that if the two jacks are held, it would be possible to draw a jacks or better poker game outcome, a two-pair poker game outcome, a three-of-a-kind poker game outcome, a full house poker game outcome and a four-of-a-kind poker game outcome.

The gaming system also determines based on the auto-hold strategy's recommendation of holding the jack of hearts, the queen of hearts and the king of hearts, it would be possible to draw a losing poker game outcome, a jacks or better poker game outcome, a two-pair poker game outcome, a three-of-a-kind poker game outcome, a straight poker game outcome, a flush poker game outcome, a straight flush poker game outcome and a royal flush poker game outcome.

In this example, the gaming system determines that the intersection of the poker game outcomes possible from following the auto-hold strategy and the poker game outcomes possible from holding the winning playing cards includes a jacks or better poker game outcome, a two pair poker game outcome, a three-of-a-kind poker game outcome. That is, whichever choice the player makes, it will be possible to draw a jacks or better poker game outcome, a two pair poker game outcome, a three-of-a-kind poker game outcome. Accordingly, by assigning these three poker game outcomes as the outcomes possible for this poker hand seed, the gaming system retains this poker hand seed.

In another alternative embodiment, rather than setting up the auto-hold algorithm to produce the best choice out of the thirty-two ways to hold a five-card dealt hand, the auto-hold algorithm may be set up to consider the best two or three ways to hold a five-card dealt hand. In this embodiment, the outcomes possible list may be constructed from those outcomes that are possible in all of the best two or three ways to hold the cards. This embodiment allows for a large margin of misplay or sub-optimal play on the player's part and greatly enhances the probability that the gaming system will be able to produce the required payout amount regardless of the player's choice.

In another alternative embodiment, the gaming system generates the table of distributions utilizing a bitfield approach. In this embodiment, the bitfield stores all possible distributions in a 2 dimensional bitfield, wherein the row correlates to the win amount and the column correlates to the number of poker hands played. As illustrated below, a 1 bit in an entry or cell indicates that it is possible to distribute that win amount across that number of hands. A 0 bit in an entry or cell indicates that it is not possible to distribute that win amount across that number of hands.

Figure 15:
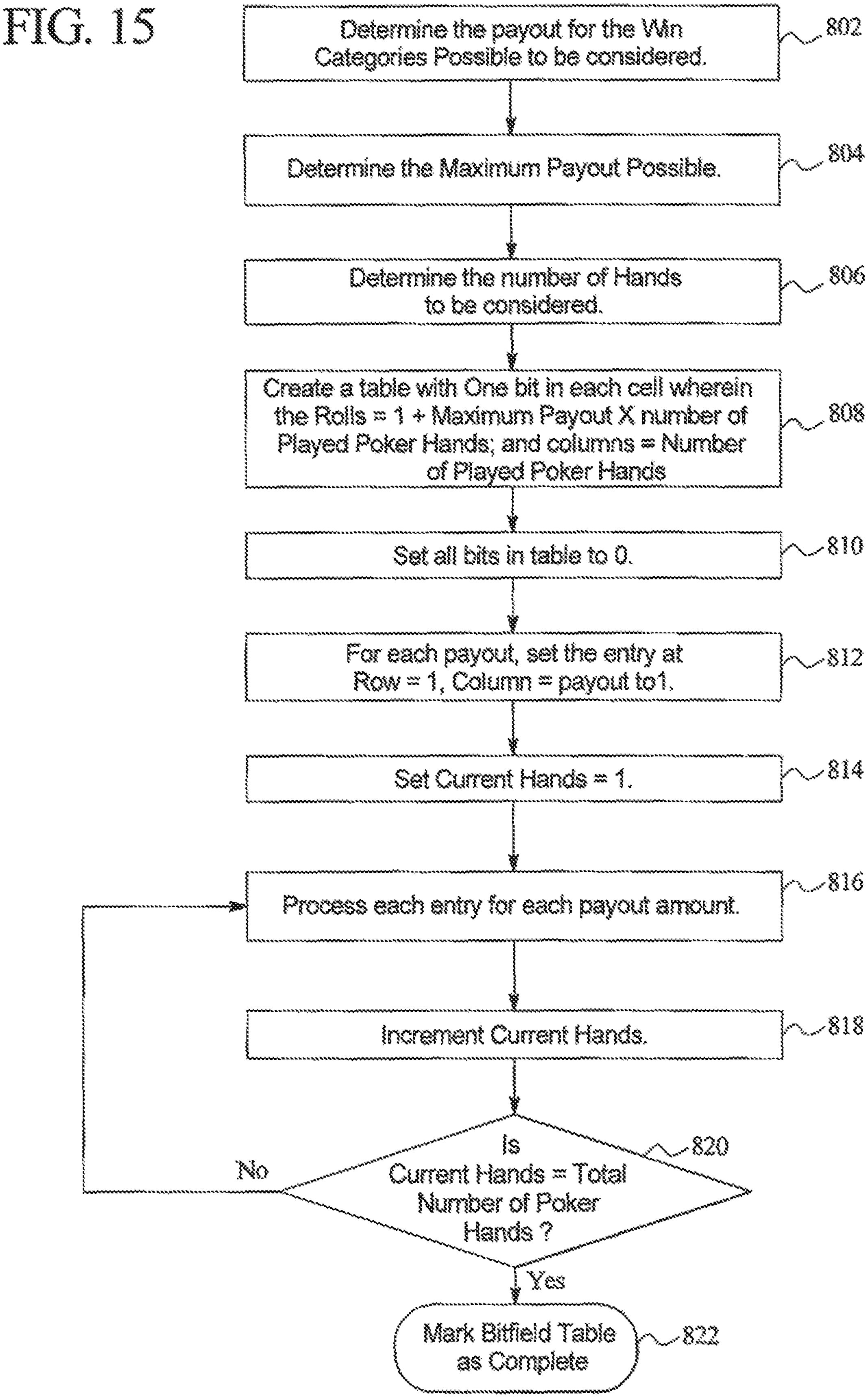
FIGS. 15 and 16 are flowcharts of one alternative embodiment disclosed herein illustrating the generation of a distribution table utilizing a generated bitfield.

In this alternative embodiment, as illustrated in FIG. 15, the gaming system initially determines the payouts for the different win categories (i.e., winning poker game outcomes) possible to be considered as indicated in block 802. That is, the gaming system determines the applicable paytable which will be utilized.

The gaming system determines the maximum payout possible and the number of hands to be considered as indicated in block 804 and 806. After determining the applicable paytable, the maximum payout possible and the maximum number of hands which may be simultaneously played, the gaming system creates a table with one bit in each entry or cell as indicated in block 808. In this embodiment, the number of columns is equal to the number of poker hands played ranging from one to the total number of possible poker hands played. The number of rows is equal to one plus the product of the maximum payout and the number of poker hands played, wherein each row is associated with a different payout amount from zero to the maximum payout amount.

All bits of the table are initially set to 0 bit as indicated in block 810. As described above, a bit set at 0 indicates that that it is not possible to distribute that win amount across that number of hands. The gaming system sets the entry for each payout amount (as determined by the applicable paytable) to a 1 bit as indicated in block 812. For example, utilizing the paytable illustrated in FIG. 4, for each column (i.e., each number of played poker hands), the gaming system sets the entry in rows 0, 1, 3, 7, 40, 200 and 250 with a 1 bit because these are the payout amounts which are possible regardless of the number of poker hands played.

The gaming system subsequently sets the current poker hands played at one as indicated in block 814 and proceeds to process each entry for each payout amount associated with the set number of poker hands played to determine if a 1 bit should be placed in such an entry as indicated in block 816. After processing each entry for the current number of poker hands played, the gaming device increments the current number of poker hands played (i.e., the gaming system proceeds to the next column of the table, if any) as indicated in block 818 and determines if the current number of poker hands played is equal to the total number of poker hands which may be played as indicated in diamond 820. If the current number of poker hands played is not equal to the total number of poker hands that may be played (i.e., not each column of the bitfield table has been analyzed), the gaming system returns to block 816 as described above. On the other hand, if the current number of poker hands played is equal to the total number of poker hands that may be played, the bitfield table is complete as indicated in block 822 and may be utilized to generate an appropriate distribution based on the predetermined payout amount.

Figure 16:
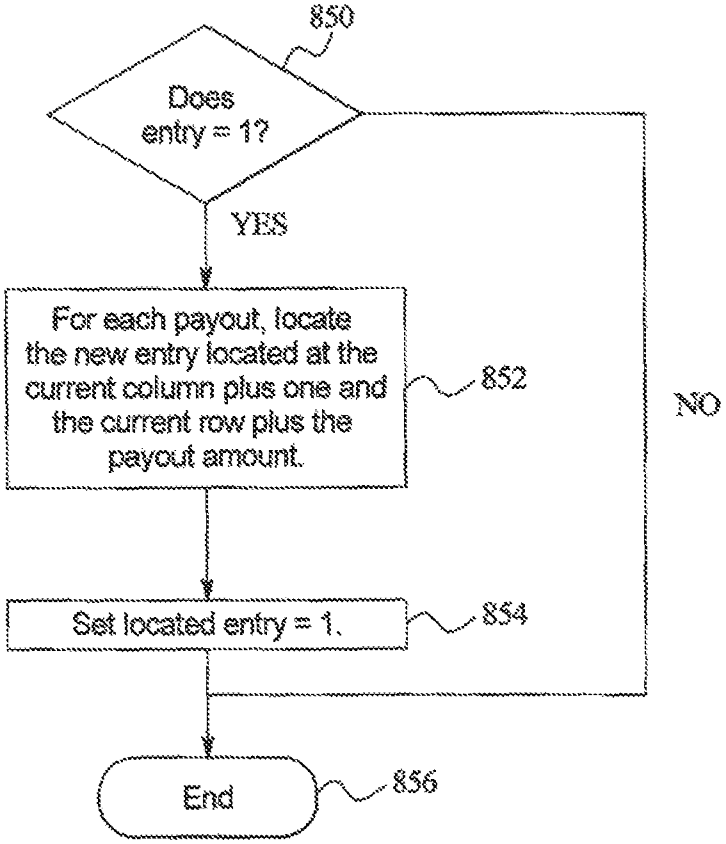

In one alternative embodiment, as illustrated in FIG. 16, the gaming system analyzes each entry for each payout amount associated with the first numbers of poker hands played to determine if a 1 bit should be placed in such an entry by determining if such entry equals a 1 bit as indicated in diamond 850. If that entry does not equal or include a 1 bit, no further analyzes is necessary for that entry as indicated in block 856. If that entry equals or includes a 1 bit, for each payout amount (i.e., each row), the gaming system locates the new entry located at the current column plus one and the current row plus the payout amount and sets the located entry to a 1 bit as indicated in blocks 852 and 854. In other words, the gaming system iterates through all columns from the first column to the maximum number of hands played minus one and sequentially fills out each column. The gaming system also iterates through all rows from a payout of zero to a payout equal to the product of the top award and the maximum number of hands played. If the entry found in a given column C and a given row R is a 1 bit, the gaming system iterates through all win or payout amounts, w, in the paytable and sets the entry at column=C+1 and row R+w to 1.

FIGS. 17 to 23 illustrate an example of the gaming system filling in an appropriate bitfield. In this example, the bitfield includes three poker hands which may be simultaneously played and the payout amounts are 0, 1, 3 or 7 credits. In this example, the gaming system begins with generating the corresponding bitfield which includes three columns (i.e., a maximum of three hands played) and twenty-two rows (i.e., a maximum payout of one plus the product of the maximum number of hands played of three and the maximum payout of seven). As illustrated in FIG. 17 the gaming system initializes all entries to 0. As illustrated in FIG. 18, the gaming system fills the first column by assigning a 1 to each row or payout amount corresponding to one of the possible payout amounts (i.e., 0, 1, 3, 7).

The gaming system traverses the first column, searching for entries set to 1. As column 1, row 0 contains a 1 bit, the gaming system sets the entries in the second column which correspond to adding one of the allowed payouts (0, 1, 3, 7) to a payout of zero (i.e., row 0). As illustrated in FIG. 19, this places a 1 bit in column 2, rows 0, 1, 3 and 7.

The gaming system next determines that column 1, row 1 contains a 1 bit. Thus, as illustrated in FIG. 20, the gaming system sets the entries in the second column which correspond to adding one of the allowed payouts (0, 1, 3, 7) to the payout of one (i.e. row 1) to a 1 bit. This places a 1 bit in column 2, rows 1, 2, 4 and 8.

The gaming system also determines that column 1, row 3 contains a 1 bit. Thus, as illustrated in FIG. 21, the gaming system sets the entries in the second column which correspond to adding one of the allowed payouts (0, 1, 3, 7) to the payout of three (i.e., row 3) to a 1 bit. This places a 1 bit in column 2, rows 3, 4, 6 and 10.

The gaming system also determines that column 1, row 7 contains a 1 bit. Thus, as illustrated in FIG. 22, the gaming system sets the entries in the second column which correspond to adding one of the allowed payouts (0, 1, 3, 7) to the payout of seven (i.e., row 7) to a 1 bit. This places a 1 bit in column 2, rows 7, 8, 10 and 14.

After analyzing the first column to determine which entries in the second column need to be modified, the gaming system traverses the second column searching for entries set to a 1 bit (rows 0, 1, 2, 3, 4, 6, 7, 8, 10, 14). As illustrated in FIG. 23, the gaming system sets the entries in the third column which correspond to adding one of the allowed payouts (0, 1, 3, 7) to the following payout amounts to result in a 1 bit placed in each of the following rows:

| | |
|---|---|
| Row 0 + payout 0 = Row 0 | Row 0 + payout 1 = Row 1 |
| Row 0 + payout 3 = Row 3 | Row 0 + payout 7 = Row 7 |
| Row 1 + payout 0 = Row 1 | Row 1 + payout 1 = Row 2 |
| Row 1 + payout 3 = Row 4 | Row 1 + payout 7 = Row 8 |
| Row 2 + payout 0 = Row 2 | Row 2 + payout 1 = Row 3 |
| Row 2 + payout 3 = Row 5 | Row 2 + payout 7 = Row 9 |
| Row 3 + payout 0 = Row 3 | Row 3 + payout 1 = Row 4 |
| Row 3 + payout 3 = Row 6 | Row 3 + payout 7 = Row 10 |
| Row 4 + payout 0 = Row 4 | Row 4 + payout 1 = Row 5 |
| Row 4 + payout 3 = Row 7 | Row 4 + payout 7 = Row 11 |
| Row 6 + payout 0 = Row 6 | Row 6 + payout 1 = Row 7 |
| Row 6 + payout 3 = Row 9 | Row 6 + payout 7 = Row 13 |
| Row 7 + payout 0 = Row 7 | Row 7 + payout 1 = Row 8 |
| Row 7 + payout 3 = Row 10 | Row 7 + payout 7 = Row 14 |
| Row 8 + payout 0 = Row 8 | Row 8 + payout 1 = Row 9 |
| Row 8 + payout 3 = Row 11 | Row 8 + payout 7 = Row 15 |
| Row 10 + payout 0 = Row 10 | Row 10 + payout 1 = Row 11 |
| Row 10 + payout 3 = Row 13 | Row 10 + payout 7 = Row 17 |
| Row 14 + payout 0 = Row 14 | Row 14 + payout 1 = Row 15 |
| Row 14 + payout 3 = Row 17 | Row 14 + payout 7 = Row 21 |

Figure 24:
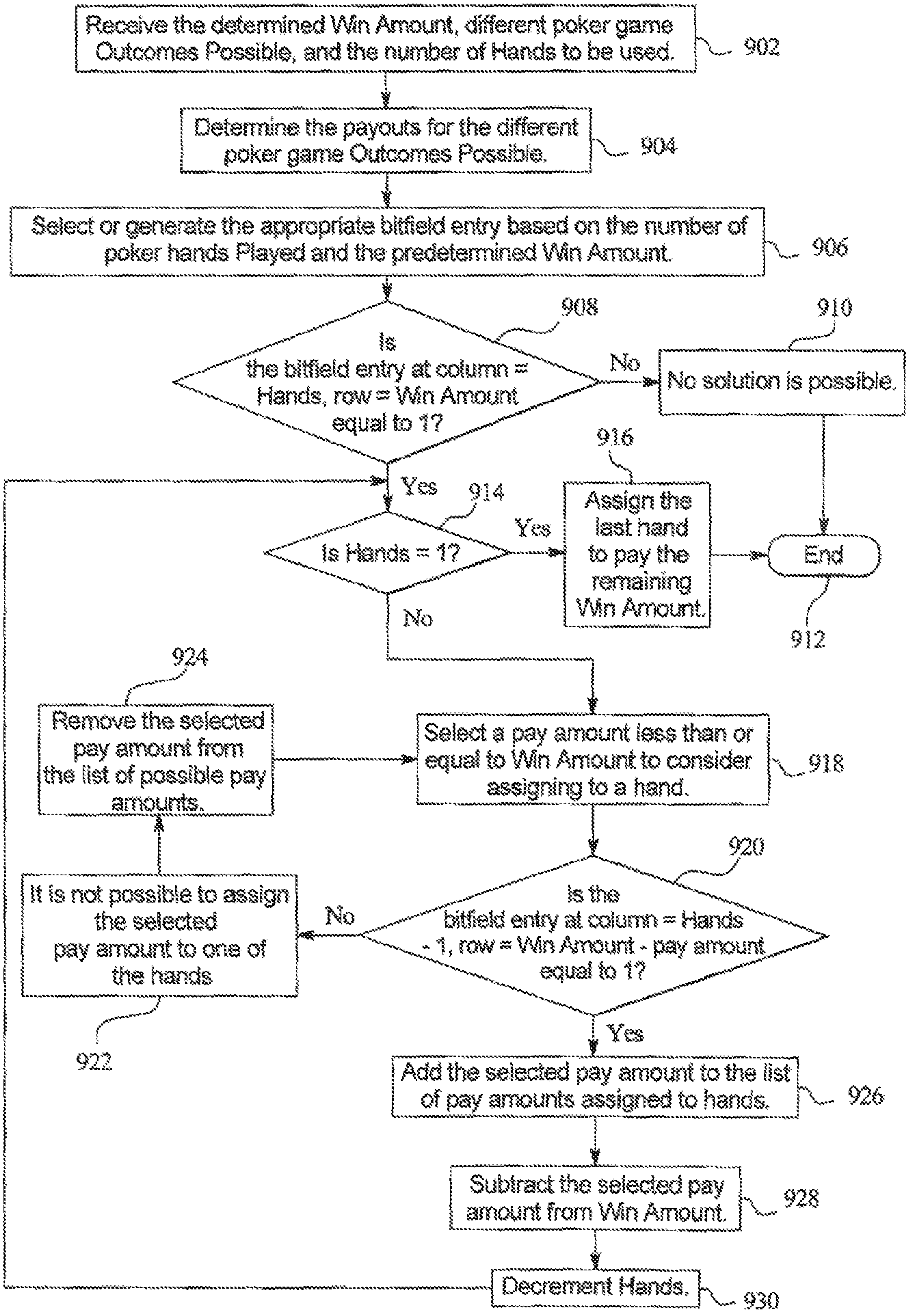
FIG. 24 is a flowchart of one alternative embodiment disclosed herein illustrating the use of the generated bitfield of FIGS. 17 to 23 to determine a poker game outcome distribution.

After generating the bitfield, in one embodiment, the gaming system utilizes the generated bitfield to determine a distribution of payout amounts over the plurality of simultaneously playing poker hands. In this embodiment, the gaming system selects or receives the predetermined win or payout amount, the different poker game outcomes possible (and their associated payouts as determined by the applicable paytable) and the number of hands being played as indicated in block 902 of FIG. 24. The gaming system also determines the payouts for the different poker game outcomes possible as indicated in block 904.

As indicated in block 906, the gaming system selects or generates the appropriate bitfield entry, wherein the selected entry is based on the number of poker hands simultaneously played and the predetermined payout amount. The gaming system next determines if a 1 is placed in the selected entry on the bitfield table as indicated in diamond 908. If a 1 is not placed in the selected entry on the bitfield table (i.e., a 0 is placed in the selected entry), then no solution or distribution of poker game outcomes is possible for the predetermined payout amount and this sequence ends as indicated in blocks 910 and 912. That is, this embodiment starts with the given win amount, A and number of hands played, H. If there is a 0 located in column H, row A, then no solution is possible. In this case, if no solution is possible or otherwise compatible, as described above, the gaming system must replace some or all of the player's held cards.

If a 1 is placed in the selected entry on the bitfield table (i.e., a solution or distribution is possible or otherwise compatible), the gaming system determines if the number of hands is equal to one as indicated in diamond 914. If the number of hands is equal to one, the gaming system assigns the last hand to pay the remaining payout amount and this sequence ends as indicated in blocks 916 and 912. That is, if the current column H=1, the gaming system finds an outcome O with an associated win amount W equal to A. The gaming system assigns a hand to outcome O and the distribution is complete.

If the number of hands does not equal one, the gaming system selects a payout amount less than or equal to the predetermined payout amount as indicated in block 918. In different embodiments, this selection may be sequential, random or based on weighted probabilities of the corresponding poker hands. The gaming system then determines if the bitfield entry located at column=H−1 and row=predetermined win amount−selected payout amount is equal to a 1 bit as indicated in diamond 920.

If the bitfield entry located at column=H−1; row=predetermined win amount−selected payout amount is not equal to a 1 bit, the gaming system determines it is not possible to assign the selected payout amount to one of the simultaneously played poker hands as indicated in block 922. The gaming device removes the selected payout amount from the list of possible payout amounts as indicated in block 924 and returns to block 918 as described above.

If the bitfield entry located at column=H−1; row=predetermined win amount−selected payout amount is equal to 1, the gaming system adds the selected payout amount to the list of payout amounts assigned to the simultaneously played poker hands as indicated in block 926. The gaming system thus subtracts the selected payout amount from the predetermined payout amount as indicated in block 928, decrements the number of hands as indicated in block 930 and return to diamond 914 as described above. It should be appreciated that this bitfield approach allows instantaneous access to all possible distributions.

For example, using this alternative bitfield approach to distribute a win or payout amount of ten across three hands, using only the payout amount 0, 1, 3 and 7, the gaming system lets H=3, for 3 hands to assign outcomes to and lets A=10, for 10 credits to award.

The gaming system/gaming device checks the entry for column H=3, row A=10 and sees that it's a 1 bit. As the third column, tenth row includes a 1 bit, a distribution solution is possible. Accordingly, the gaming system selects the first outcome. This includes starting with Outcome (O) of 0 and checking the entry for column H−1=2, row A−0=10. In this example, as illustrated in FIG. 23, the entry at column 2, row 10 is a 1 bit and thus an outcome of 0 can be used and still provide a complete solution. Thus the gaming system assigns a hand to outcome 0. The distribution so far is {0,}. The gaming system subtracts 0 from A, so A=10 and also subtracts 1 from H, so H=2.

After determining the first outcome, the gaming system selects the second outcome. The gaming system again starts with outcome (O)=0 and checks the entry for column H−1=1, row A−0=10. As illustrated in FIG. 23, the entry at column 1, row 10 is a 0 bit. Thus, it is not possible to select another outcome of 0. The gaming system then advances to the next outcome, tries an outcome O=1 and checks the entry for column H−1=1, row A−1=9. Again, the entry at column 1, row 9 is a 0 bit and thus is not possible to select an outcome of 1. The gaming system then advance to the next outcome, tries outcome an 0=3, and checks the entry for column H−1=1, row A−3=7. As the entry at column 1, row 7 is a 1 bit, outcome 3 can be used for the distribution and still provide a complete solution. Accordingly, the gaming system assigns a hand to outcome 3. The distribution so far is {0, 3,}. The gaming system then subtracts 3 from A, so A=7 and also subtracts 1 from H, so H=1.

After selecting the first two outcomes, the gaming system selects the third outcome. Since H=1, this is the last hand to be filled and the remaining amount of 7 must be assigned to the last hand. Thus, the final distribution is {0, 3, 7}, which meets all the criteria. After determining the poker game outcome distribution, the gaming system or gaming device may randomly order the outcomes on the screen to offer the player more variety in game play.

R should be appreciated that the present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 25A:
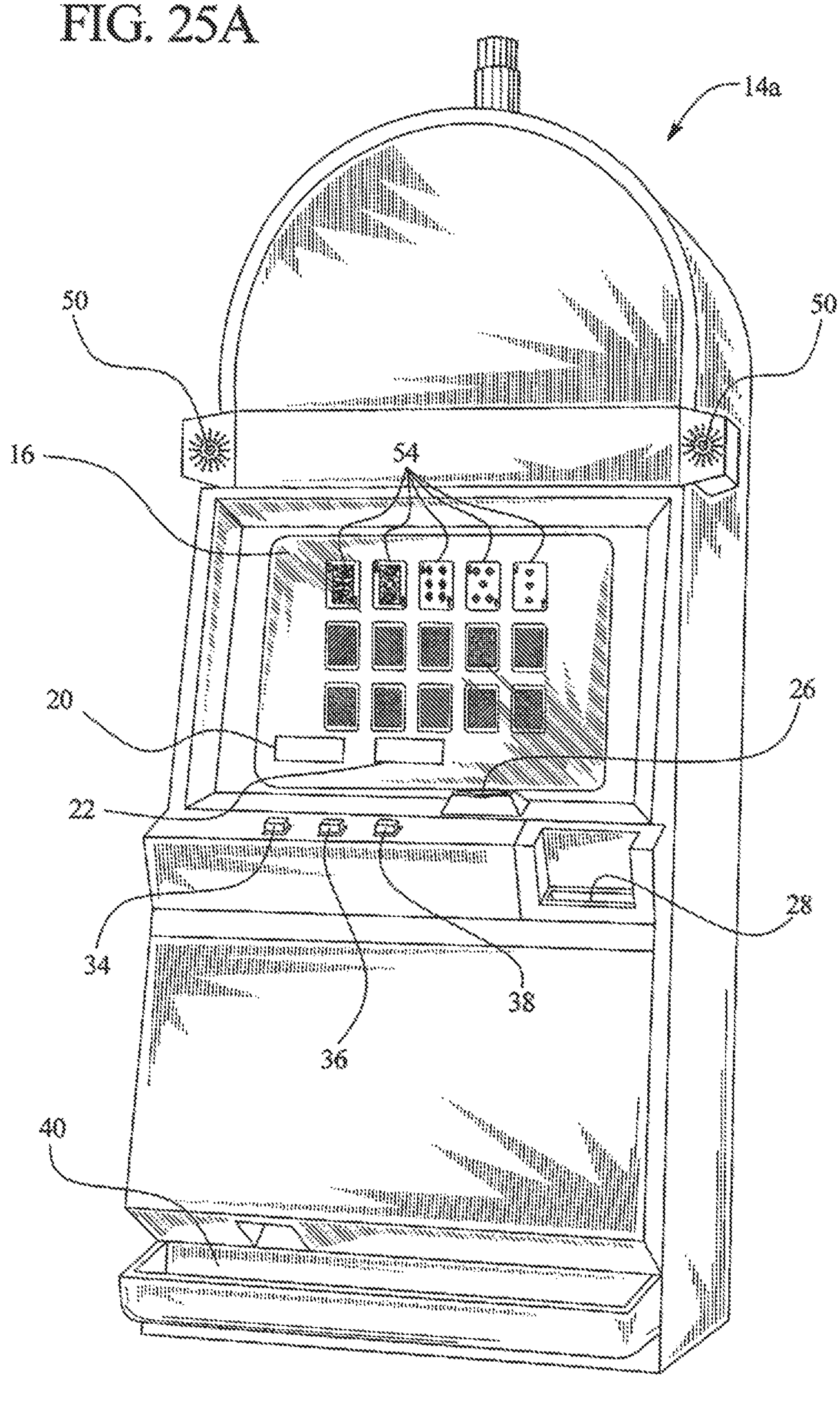
FIGS. 25A and 25B are perspective views of alternative embodiments of the gaming device disclosed herein.
Figure 25B:
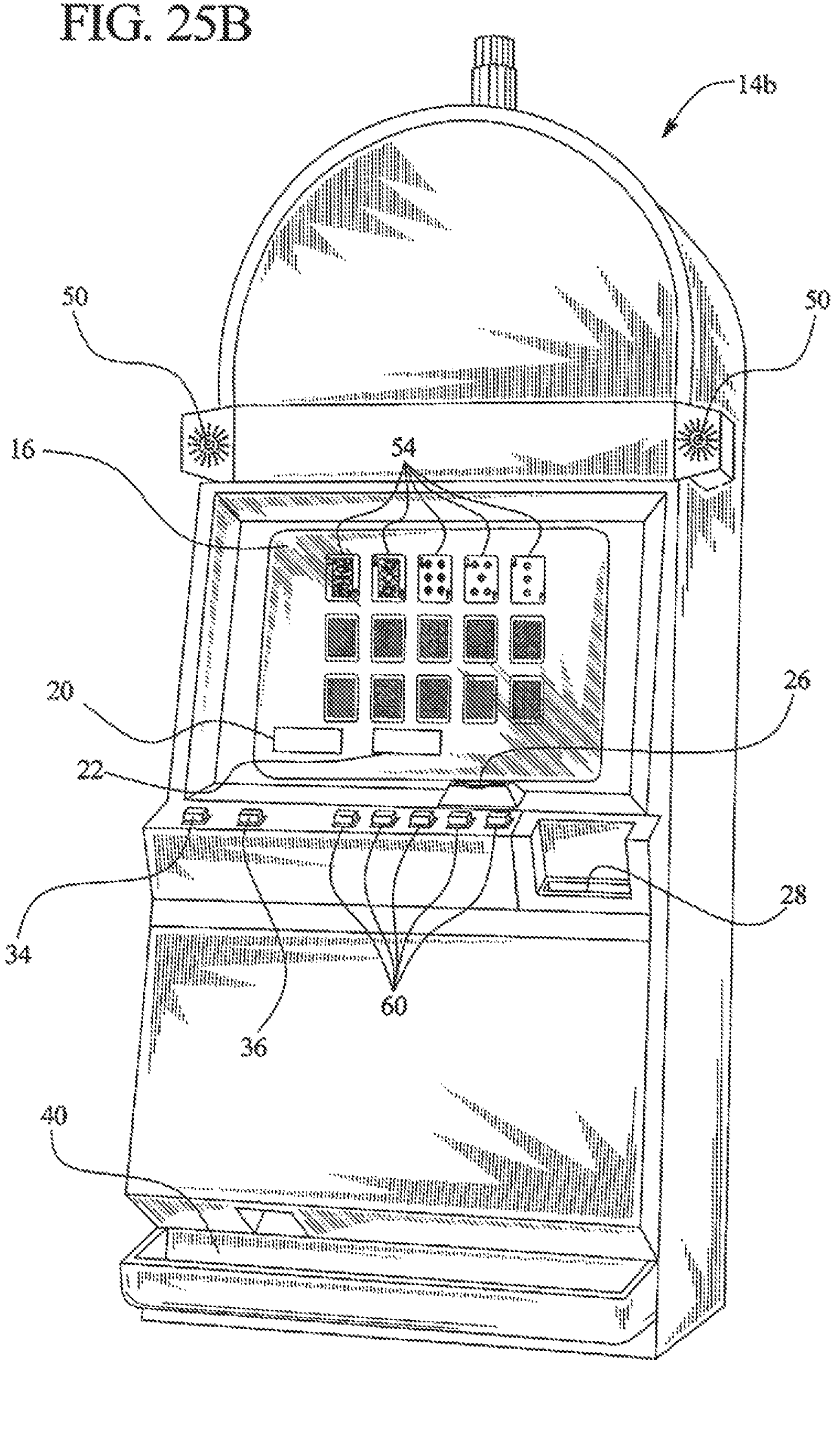

Two example alternative embodiments of the gaming device are illustrated in FIGS. 25A and 25B as gaming device

14*a* and gaming device 14*b*, respectively. Gaming device 14*a* and/or gaming device 14*b* are generally referred to herein as gaming device 14.

In the embodiments illustrated in FIGS. 25A and 25B, gaming device 14 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 25A and 25B, the gaming device can be constructed with varying cabinet and display configurations.

Figure 26:
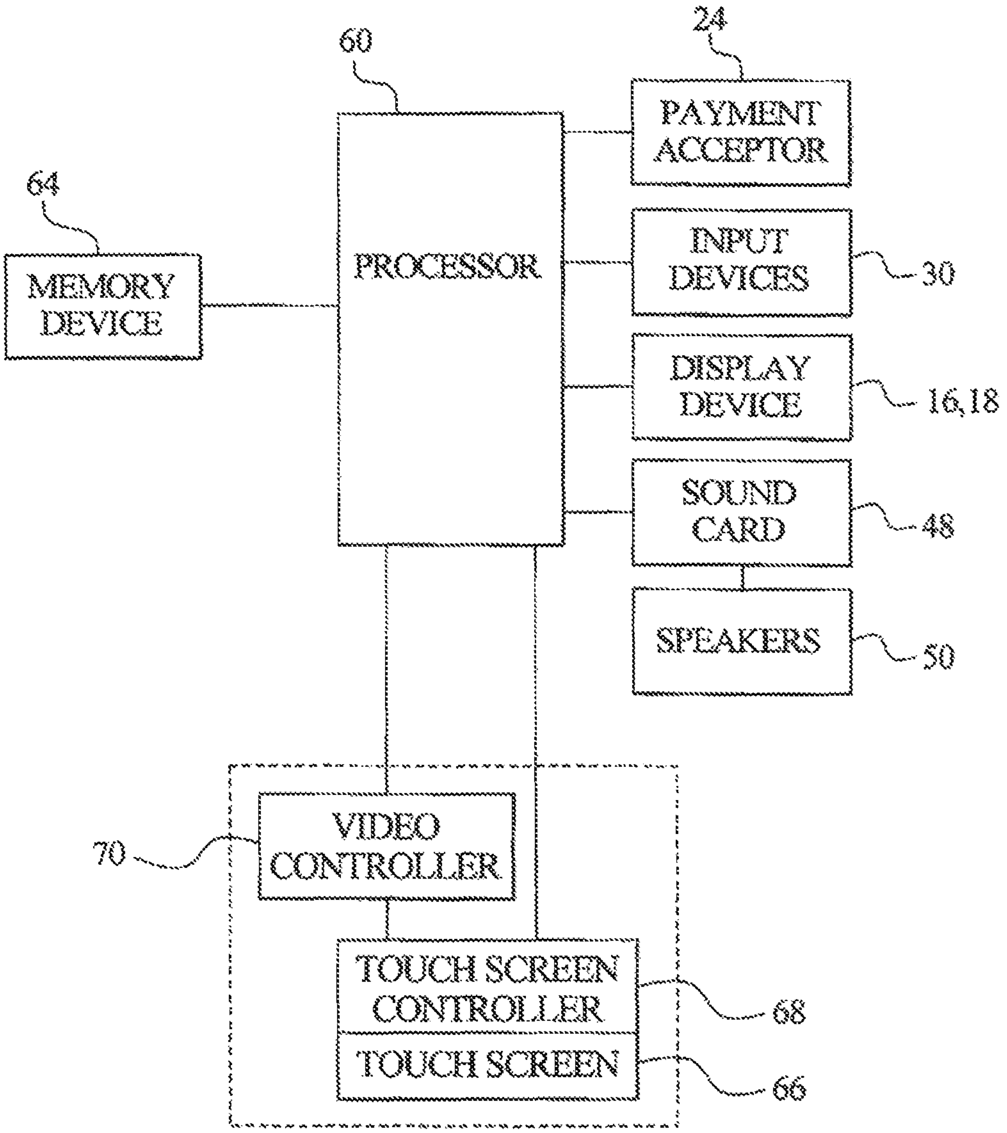
FIG. 26 is a schematic block diagram of an electronic configuration of one embodiment of the gaming device disclosed herein.

In one embodiment, as illustrated in FIG. 26, the gaming device preferably includes at least one processor 60, such as a microprocessor, a microcontroller-based platform, a suitable integrated circuit or one or more application-specific integrated circuits (ASIC's). The processor is in communication with or operable to access or to exchange signals with at least one data storage or memory device 64. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device stores a pool of predetermined outcomes which will be provided to the players during the play of the interactive poker game.

In one embodiment, as illustrated in FIG. 26, the gaming device preferably includes at least one processor 60, such as a microprocessor, a microcontroller-based platform, a suitable integrated circuit or one or more application-specific integrated circuits (ASIC's). The processor is in communication with or operable to access or to exchange signals with at least one data storage or memory device 64. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device.

In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (FDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer."

In one embodiment, as discussed in more detail above, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 26, the gaming device includes one or more display devices controlled by the processor. The display devices are preferably connected to or mounted to the cabinet of the gaming device. The embodiment shown in FIG. 25A includes a central display device 16 which displays a primary game. This display device may also display any suitable secondary game associated with the primary game as well as information relating to the primary or secondary game. The alternative embodiment shown in FIG. 25B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. In another embodiment, at least one display device may be a mobile display device, such as a PDA or tablet PC, that enables play of at least a portion of the primary or secondary game at a location remote from the gaming device. As seen in FIGS. 25A and 25B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and/or configuration, such as a square, a rectangle or an elongated rectangle.

The display devices of the gaming device are configured to display at least one and preferably a plurality of game or other suitable images 54, symbols, playing cards and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 26, in one embodiment, the gaming device includes at least one payment acceptor 24 in communication with the processor. As seen in FIGS. 25A and 25B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 25A, 25B and 26, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 25A and 25B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, shown in FIG. 25B, the gaming device also includes a plurality of hold/discard buttons 60. The player may designate each of the plurality of playing cards dealt to the player as either a hold or discard by using the hold/discard buttons. In one embodiment, the gaming device includes one hold/discard button for all of the playing cards. In another embodiment, the gaming device includes an individual hold/discard button for each of the dealt playing cards.

In one embodiment, as mentioned above and seen in FIG. 26, one input device is a touch-screen 66 coupled with a touch-screen controller 68 or some other touch-sensitive display overlay to allow for player interaction with the images on the display. The touch-screen and the touch-screen controller are connected to a video controller 70. A player can make decisions, such as which playing cards to hold or discard and input signals into the gaming device by touching touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 26, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g.; video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, all of the gaming terminals which are coupled to the central processor are configured to play the same type of game. In an alternative embodiment, a plurality of the gaming terminals are configured so that different gaming terminals may be used to play different types of games. That is, some gaming terminals may be used for playing a slot machine style game, others may be used for playing a poker style game, others may be used for playing a blackjack style game, and the like. In another embodiment, a plurality of gaming terminals may each be configured for playing a plurality of different games.

In another embodiment, one or more of the gaming devices are in communication with a central server or controller for monitoring purposes only. In this embodiment, each gaming device stores a pool of predetermined outcomes to be provided to the player in a memory and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, a plurality of the gaming devices are connected together and to a central controller through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet'intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on the selection of a predetermined game outcome associated with the progressive award. In alternative embodiments, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, the multi-play poker game may be employed as either a primary game or a base game. If the multi-play poker game is implemented as a secondary game, then the gaming device can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a predetermined outcome upon activation from a wager. That is, different primary wagering games, such as video poker games, video blackjack games, video Keno, video bingo or any other suitable primary or base game may be implemented.

In another embodiment, if the multi-play poker game is implemented as a primary game, then in addition to winning credits in the primary multi-play poker game, the gaming device may also give players the opportunity to win credits or awards in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor or central server randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

It should be appreciated that if the gaming device enables the player to play a secondary game in addition to the multi-play poker game, then regardless of how the game outcome is ultimately provided to the player, either as a value or payout from the primary or base game, as a value or payout from the secondary or bonus game, as a lose from the primary or base game, as a lose from the secondary or bonus game, or as a progressive award win, the game outcome is predetermined. For example, if the game outcome is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one memory device which stores:

(i) a first database including data representing a plurality of different card hands, each different card hand including a plurality of different playing cards, each different card hand associated with at least one card game outcome possible if said card hand is played according to an auto-hold strategy, (ii) a second database including data representing a plurality of payout amounts and at least one of any distributions of card game outcomes which would result in each of said payout amounts, and (iii) a set of predetermined game outcomes, each predetermined game outcome associated with a predetermined payout amount;

a central controller configured to communicate with the at least one memory device and programmed to select at least one of said predetermined game outcomes from the set of predetermined game outcomes; and a plurality of gaming machines, each gaming machine configured to operate under control of at least one gaming machine processor and configured to communicate with the central controller, each gaming machine including:

at least one display device;

at least one input device; and at least one gaming machine memory device which stores a plurality of instructions, which when executed by the at least one gaming machine processor, cause the at least one gaming machine processor to operate with said at least one display device and said at least one input device to:

(a) receive data representing said selected predetermined game outcome;

(b) display a plurality of said playing cards to form a primary card hand and at least one secondary card hand, said displayed playing cards based on said selected predetermined game outcome and different pluralities of said playing cards form a plurality of the different card hands that are each associated with one of the payout amounts;

(c) enable a player of said gaming machine to select at least one of said displayed playing cards in at least one of the card hands to hold or to discard;

(d) evaluate the playing cards selected by the player to hold in each card hand to identify a list of which card game outcomes are possible based on which playing cards the player designated to hold in said card hand;

(e) determine a distribution of card game outcomes that provides a total payout amount based on the predetermined payout amount of the selected predetermined game outcome, said determination based on the identified list, the first database and the second database;

(f) assign each one of the displayed card hands one of the payout amounts of the determined distribution;

(g) cause each of the card hands to display the playing cards which would result in the assigned payout amount for that card hand; and (h) provide the predetermined payout amount of the selected predetermined game outcome to the player.

2. The gaming system of claim 1, wherein for each of the gaming machines, when executed by said at least one gaming machine processor, the plurality of instructions cause said at least one gaming machine processor to determine the distribution of card game outcomes based on the identified list, the first database, the second database and a probability associated with at least one of the card game outcomes.

3. The gaming system of claim 1, wherein for each of the gaming machines, when executed by said at least one gaming machine processor, the plurality of instructions cause said at least one gaming machine processor to replace at least one of the playing cards the player designated to hold to determine the distribution of card game outcomes.

4. The gaming system of claim 1, wherein for each of the gaming machines, when executed by said at least one gaming machine processor, the plurality of instructions cause said at least one gaming machine processor to enable the player of said gaming machine to select at least a plurality of said displayed playing cards to hold or to discard.

5. The gaming system of claim 1, wherein one of the predetermined game outcomes is associated with a predetermined payout amount of zero.

6. The gaming system of claim 1, wherein the at least one gaming machine memory device of each gaming machine stores said first database.

7. The gaming system of claim 1, wherein the at least one gaming machine memory device of each gaming machine stores said second database.

8. The gaming system of claim 1, wherein the central controller is programmed to flag said selected predetermined game outcome, to output the selected predetermined game outcome and to prevent said selected game outcome from any subsequent selections.

9. The gaming system of claim 1, wherein the central controller is programmed to select at least one of said predetermined game outcomes based on the results of a game selected from the group consisting of a bingo game, a keno game and a lottery game.

10. The gaming system of claim 1, wherein for each of the gaming machines, when executed by said at least one gaming machine processor, the plurality of instructions cause said at least one gaming machine processor to enable the player of said gaming machine to select at least one of said displayed playing cards in the primary card hand to hold or to discard, said selected playing cards respectively held or discarded in each of the secondary card hands.

11. The gaming system of claim 1, wherein the auto-hold strategy is an optimal strategy, based on an applicable paytable, for which of said playing cards to hold and which of said playing cards to discard in said card hand.

12. The gaming system of claim 1, wherein the predetermined payout amount includes an amount of non-monetary credits.

13. A gaming system comprising;

at least one input device;

at least one display device;

at least one processor; and at least one memory device which stores a plurality of instructions, which when executed by the at least one processor, cause the at least one processor to operate with said at least one display device, and said at least one input device to;

(a) display a plurality of playing cards to form a primary card hand and at least one secondary card hand, said displayed playing cards based on a predetermined game outcome, said predetermined game outcome including a predetermined payout amount and different pluralities of said playing cards form a plurality of different card hands that are each associated with a payout amount;

(b) enable a player to select at least one of said displayed playing cards in at least one of the card hands to hold or to discard;

(c) evaluate the playing cards selected by the player to hold in each card hand to identify a list of which card game outcomes are possible based on which playing cards the player designated to hold in said card hand;

(d) determine a distribution of card game outcomes that provides a total payout amount equal to the predetermined payout amount of the predetermined game outcome, said determination based on the identified list and a predefined table which includes data representing a plurality of said payout amounts and the distributions of possible card game outcomes which correlate to each of the payout amounts;

(e) assign each one of the displayed card hands one of the payouts of the determined distribution;

(f) cause each of the card hands to display the playing cards which would result in the assigned payout amount for that card hand; and (g) provide the predetermined payout amount of the predetermined game outcome to the player.

14. The gaming system of claim 13, wherein when executed by the at least one processor, the plurality of instructions cause the at least one processor to determine the distribution of card game outcomes based on the identified list, the predefined table and a probability associated with at least one of the card game outcomes.

15. The gaming system of claim 13, wherein when executed by the at least one processor, the plurality of instructions cause the at least one processor to replace at least one of the playing cards the player designated to hold.

16. The gaming system of claim 13, wherein when executed by the at least one processor, the plurality of instructions cause the at least one processor to enable the player to select at least a plurality of said displayed playing cards to hold or to discard.

17. The gaming system of claim 13, wherein the predetermined payout amount of the predetermined game outcome has a value of zero.

18. The gaming system of claim 13, wherein said predetermined game outcome is selected from a plurality of different predetermined game outcomes.

19. The gaming system of claim 13, wherein said predetermined game outcome is stored in the at least one memory device.

20. The gaming system of claim 13, wherein said predetermined game outcome is received from a central controller.

21. The gaming system of claim 13, wherein the predefined table is stored in the at least one memory device.

22. The gaming system of claim 13, wherein when executed by the at least one processor, the plurality of instructions cause the at least one processor to enable the player to select at least one of said displayed playing cards in the primary card hand to hold or to discard, said selected playing cards respectively held or discarded in each of the secondary card hands.

23. The gaming system of claim 13, wherein the predetermined payout amount includes an amount of non-monetary credits.

24. A method of operating a gaming system, said method comprising:

(a) generating a first database including data representing a plurality of different card hands, each different card hand associated with at least one card game outcome possible if said card hand is played according to an auto-hold strategy;

(b) generating a second database including data representing a plurality of payout amounts and at least one of any distributions of card game outcomes which would result in each of said payout amounts;

(c) comparing the card game outcomes associated with each card hand from the first database to the determined different distributions of card game outcomes which would result in each payout amount from the second database to generate a predefined table which includes data representing each possible card hand from the first database and each of the different payout amounts from the second database which, according to the auto-hold strategy, are possible based on said card hand;

(d) causing at least one processor to execute a plurality of instructions to select a predetermined game outcome, the predetermined game outcome including a predetermined payout amount;

(e) causing at least one display device to display a plurality of playing cards to form a primary card hand and at least one secondary card hand, said displayed playing cards based on said selected predetermined game outcome;

(f) enabling a player to select at least one of said displayed playing cards in at least one of the card hands to hold or to discard;

(g) causing the at least one processor to execute the plurality of instructions to evaluate the playing cards selected by the player to hold in each card hand to identify a list of which card game outcomes are possible based on which playing cards the player designated to hold in said card hand;

(h) causing the at least one processor to execute the plurality of instructions to determine a distribution of card game outcomes that provides a total payout amount based on the predetermined payout amount of the predetermined game outcome, said determination based on the identified list and the generated predefined table;

(i) causing the at least one processor to execute the plurality of instructions to assign each one of the displayed card hands one of the payout amounts of the determined distribution;

(j) for each of the card hands, causing the least one display device to display the playing cards which would result in the assigned payout amount for that card hand; and (k) causing the at least one processor to execute the plurality of instructions to cause the predetermined payout amount of the predetermined game outcome to be provided to the player.

25. The method of claim 24, which includes causing the at least one processor to execute the plurality of instructions to determine the distribution of card game outcomes based on the identified list, the generated predefined table and a probability associated with at least one of the card game outcomes.

26. The method of claim 24, wherein causing the at least one processor to execute the plurality of instructions to determine the distribution of card game outcomes includes replacing at least one of the playing cards the player designated to hold.

27. The method of claim 24, which includes generating said predefined table by:

(1) selecting one of the payout amounts;

(2) selecting one of the card hands from the first database;

(3) determining if an entry in the second database exists which is associated with the selected payout amount and uses only the card game outcomes which are associated with the selected card hand;

(4) if said entry in the second database exists:

(A) associating the selected card hand with the selected payout amount, and (B) adding said selected card hand and the selected payout amount to the predefined table; and (5) if said entry in the second database does not exist, repeating (2) to (5) at least once.

28. The method of claim 24, which includes enabling the player to select at least a plurality of said displayed playing cards to hold or to discard.

29. The method of claim 24, wherein the predetermined payout amount of the predetermined game outcome has a value of zero.

30. The method of claim 24, which includes receiving said selected predetermined game outcome from a central controller.

31. The method of claim 24, which includes enabling the player to select at least one of said displayed playing cards in the primary card hand to hold or to discard, said selected playing cards respectively held or discarded in each of the secondary card hands.

32. The method of claim 24, wherein the auto-hold strategy is an optimal strategy, based on an applicable paytable, for which of said playing cards to hold and which of said playing cards to discard in said card hand.

33. The method of claim 24, wherein the predetermined payout amount includes an amount of non-monetary credits.

34. The method of claim 24, which is provided through a data network.

35. The method of claim 34, wherein the data network is an internet.

36. A method of operating a gaming system, said method comprising:

(a) causing at least one display device to display a plurality of playing cards to form a primary card hand and at least one secondary card hand, said displayed playing cards based on a predetermined game outcome which includes a predetermined payout amount;

(b) enabling a player to select at least one of said displayed playing cards in at least one of the card hand to hold or to discard;

(c) causing at least one processor to execute a plurality of instructions to evaluate the playing cards selected by the player to hold in each card hand to identify a list of which card game outcomes are possible based on which playing cards the player designated to hold in said card hand;

(d) causing the at least one processor to execute the plurality of instructions to determine a distribution of card game outcomes that provides a total payout amount based on the predetermined payout amount of the predetermined game outcome, said determination based on the identified list and a predefined table which includes data representing a plurality of different payout amounts and the distributions of possible card game outcomes which correlate to each of the payout amounts;

(e) causing the at least one processor to execute the plurality of instructions to assign each one of the displayed card hands one of the payouts of the determined distribution;

(f) for each of the card hands, causing the at least one display device to display the playing cards which would result in the assigned payout amount for that card hand; and (g) causing the at least one processor to execute the plurality of instructions to cause the predetermined payout amount of the predetermined game outcome to be provided to the player.

37. The method of claim 36, which includes causing the at least one processor to execute the plurality of instructions to determine the distribution of card game outcomes based on the identified list, the predefined table and a probability associated with at least one of the card game outcomes.

38. The method of claim 36, wherein causing the at least one processor to execute the plurality of instructions to determine the distribution of card game outcomes includes replacing at least one of the playing cards the player designated to hold.

39. The method of claim 36, which includes enabling the player to select at least a plurality of said displayed playing cards to hold or to discard.

40. The method of claim 36, wherein the predetermined payout amount of the predetermined game outcome has a value of zero.

41. The method of claim 36, wherein said predetermined game outcome is selected from a plurality of predetermined game outcomes.

42. The method of claim 36, which includes receiving said predetermined game outcome from a central controller.

43. The method of claim 36, which includes enabling the player to select at least one of said displayed playing cards in the primary card hand to hold or to discard, wherein said selected playing cards are respectively held or discarded in each of the secondary card hands.

44. The method of claim 36, wherein the predetermined payout amount includes an amount of non-monetary credits.

45. The method of claim 36, which is provided through a data network.

46. The method of claim 45, wherein the data network is an internet.

47. A method of operating a gaming system, said method comprising:

(a) generating a predefined table including data representing each of a plurality of possible card hands from a first database, each of a plurality of different payout amounts from a second database, and an association of at least one of said card hands with at least one of said payout amounts;

(b) causing at least one display device to display a plurality of playing cards to form a primary card hand and at least one secondary card hand, said displayed playing cards based on a predetermined game outcome which includes a predetermined payout amount;

(c) enabling a player to select at least one of said displayed playing cards in at least one of the card hands to hold or to discard;

(d) causing at least one processor to execute a plurality of instructions to evaluating the playing cards selected by the player to hold in each card hand to identify a list of which card game outcomes are possible based on which playing cards the player designated to hold in said card hand;

(e) causing the at least one processor to execute the plurality of instructions to determine a distribution of card game outcomes that provides a total payout amount based on the predetermined payout amount of the predetermined game outcome, said determination based on the identified list and the generated predefined table;

(f) causing the at least one processor to execute the plurality of instructions to assign each one of the displayed card hands one of the payouts of the determined distribution;

(g) for each of the card hands, causing the at least one display device to display the playing cards which would result in the assigned payout amount for that card hand; and (h) causing the at least one processor to execute the plurality of instructions to cause the predetermined payout amount of the predetermined game outcome to be provided to the player.

48. The method of claim 47, which includes causing the at least one processor to execute the plurality of instructions to determine the distribution of card game outcomes based on the identified list, the generated predefined table and a probability associated with at least one of the card game outcomes.

49. The method of claim 47, wherein causing the at least one processor to execute the plurality of instructions to determine the distribution of card game outcomes includes replacing at least one of the playing cards the player designated to hold.

50. The method of claim 47, which includes enabling the player to select at least plurality of said displayed playing cards to hold or to discard.

51. The method of claim 47, wherein the predetermined payout amount of the predetermined game outcome has a value of zero.

52. The method of claim 47, wherein said predetermined game outcome is selected from a plurality of predetermined game outcomes.

53. The method of claim 47, which includes receiving said predetermined game outcome from a central controller.

54. The method of claim 47, wherein the first database includes data representing a plurality of said different card hands each including a plurality of said playing cards, each different card hand associated with at least one of said card game outcomes possible if said card hand is played according to an auto-hold strategy.

55. The method of claim 47, wherein the second database includes data representing a plurality of said payout amounts and at least one of any distributions of said card game outcomes which would result in each of said payout amounts.

56. The method of claim 47, which includes generating said predefined table by:

(1) selecting one of the payout amounts;

(2) selecting one of the card hands from the first database;

(3) determining if an entry in the second database exists which is associated with the selected payout amount and uses only the card game outcomes which are associated with the selected card hand;

(4) if said entry in the second database exists:

(A) associating the selected card hand with the selected payout amount, and (B) adding said selected card hand and the selected payout amount to the predefined table; and (5) if said entry in the second database does not exist, repeating (2) to (5) at least once.

57. The method of claim 47, which includes enabling the player to select at least one of said displayed playing cards in the primary card hand to hold or to discard, said selected playing cards respectively held or discarded in each of the secondary card hands.

58. The method of claim 47, wherein the predetermined payout amount includes an amount of non-monetary credits.

59. The method of claim 47, which is provided through a data network.

60. The method of claim 59, wherein the data network is an internet.

* * * * *